US012404162B2

(12) United States Patent
Martin et al.

(10) Patent No.: US 12,404,162 B2
(45) **Date of Patent: *Sep. 2, 2025**

(54) HAND-HELD BEVERAGE DISPENSER

(71) Applicant: LANCER CORPORATION, San Antonio, TX (US)

(72) Inventors: Joseph Daniel Martin, Kaiserslautern (DE); Anthony Joseph Behe, Jr., Converse, TX (US); Ricardo Abugarade Rodriguez, Schertz, TX (US); John Dsouza, Live Oak, TX (US)

(73) Assignee: Lancer Corporation, San Antonio, TX (US)

( * ) Notice: Subject to any disclaimer, the term of this patent is extended or adjusted under 35 U.S.C. 154(b) by 116 days.

This patent is subject to a terminal disclaimer.

(21) Appl. No.: 18/209,686

(22) Filed: Jun. 14, 2023

(65) Prior Publication Data

US 2023/0399220 A1 Dec. 14, 2023

Related U.S. Application Data

(63) Continuation-in-part of application No. 18/126,410, filed on Mar. 25, 2023, now Pat. No. 12,157,659, which is a continuation of application No. 17/737,469, filed on May 5, 2022, now Pat. No. 11,643,318, which is a continuation of application No. 17/339,917, filed on Jun. 4, 2021, now Pat. No. 11,345,584.

(Continued)

(51) Int. Cl.
*B67D 1/00* (2006.01)
*B67D 1/14* (2006.01)

(52) U.S. Cl.
CPC ......... *B67D 1/0084* (2013.01); *B67D 1/1438* (2013.01); *B67D 2001/0094* (2013.01)

(58) Field of Classification Search
CPC ................ B67D 1/0084; B67D 1/1438; B67D 2001/0094; B67D 1/0046
See application file for complete search history.

(56) References Cited

U.S. PATENT DOCUMENTS

| | | | | |
|---|---|---|---|---|
| 3,144,967 A * | 8/1964 | McClain | B67D 1/0084 239/416.1 |
| 3,863,810 A * | 2/1975 | Hanson | B67D 1/0084 D7/398 |

(Continued)

*Primary Examiner* — Donnell A Long
(74) *Attorney, Agent, or Firm* — Christopher L. Makay

(57) ABSTRACT

A hand-held beverage dispenser includes a handle body, within which multiple valve units are contained. Two sets of fluid flow paths are provided into the handle body. The sets of fluid flow paths are mutually exclusive one to the other. Each flow path of the first set is in fluid communication with each valve unit, whereas only a predetermined one of the second set of fluid flow paths is in fluid communication with each valve unit. Each valve unit includes a flow control valve and a selector valve. The selector valve determines on an ad hoc basis which of the first set of flow paths will be utilized at any given time, while the flow control valve provides single action simultaneous ON-OFF control of fluid flows through both the selected flow path and the predetermined flow path. A failsafe ensures correct operation of the selector valve of each valve unit.

12 Claims, 61 Drawing Sheets

Related U.S. Application Data

(60) Provisional application No. 63/353,806, filed on Jun. 20, 2022, provisional application No. 63/129,380, filed on Dec. 22, 2020, provisional application No. 63/034,762, filed on Jun. 4, 2020.

(56) References Cited

U.S. PATENT DOCUMENTS

| | | | | | |
|---|---|---|---|---|---|
| 4,076,148 | A | * | 2/1978 | Carse | B67D 1/1416 222/144.5 |
| 4,619,378 | A | * | 10/1986 | de Man | B67D 1/0084 137/884 |
| 4,673,108 | A | * | 6/1987 | de Man | B67D 1/0084 439/43 |
| 4,921,140 | A | * | 5/1990 | Belcham | B67D 1/0084 200/332.2 |
| 4,986,449 | A | * | 1/1991 | Valiyee | B67D 1/0084 222/144.5 |
| 5,056,686 | A | * | 10/1991 | Jarrett | B67D 1/0084 222/144.5 |
| 5,152,429 | A | * | 10/1992 | Billings | B67D 1/10 222/144.5 |

* cited by examiner

HAND-HELD BEVERAGE DISPENSER

BACKGROUND OF THE INVENTION

1. Field of the Invention

The present invention relates to post-mix drink dispensing, and, more particularly, but not by way of limitation, to hand-held beverage dispensers for delivering post-mix beverages.

2. Description of the Related Art

Post-mix type hand-held beverage dispensers, such as are often referred to as bar guns or soda guns are well-known conveniences in the food and bar service industries, enabling beverages to be prepared as they are dispensed by mixing together a beverage product, such as, for example, a syrup or like concentrate, and a diluent, such as, for example, carbonated water or plain water. Although each of the variously utilized diluents is typically appropriate for use with a great variety of beverage products, any one beverage product will generally only be compatible with a particular diluent. Unfortunately, this presents a problem for currently available hand-held beverage dispensers implemented according to the current state of the art. In particular, the currently available hand-held beverage dispensers are simply not capable of readily changing the diluent to be utilized with respect to any particular fluid flow path through the dispenser.

Accordingly, a hand-held post-mix type drink dispenser readily configurable to dispense any available diluent in connection with any beverage product flow path will create, and meet, new demand in the drink dispensing industry.

SUMMARY OF THE INVENTION

A valve arrangement for selectively establishing beverage fluid flow paths through a hand-held beverage dispenser, for selectively dispensing a demanded one of a plurality of post-mix beverages, generally comprises a selector valve and a flow control valve, each of which is substantially contained within a hand-held beverage dispenser; and a plurality of flow paths from without the hand-held beverage dispenser to the selector valve. The selector valve is adapted to establish passage therethrough of a user selectable one of the plurality of flow paths, while blocking passage therethrough of each of the plurality of flow paths other than the user selected flow path. The flow control valve, which is functionally independent of the selector valve, is adapted, upon actuation, to enable fluid discharge from the selected one flow path to without the hand-held beverage dispenser. The flow control valve and the said selector valve are preferably formed about a single valve body, and most preferably the flow control valve is integrally formed with said selector valve within the single valve body.

The valve arrangement for selectively establishing beverage fluid flow paths through a hand-held beverage dispenser preferably includes a plurality of selector valves substantially contained within the hand-held beverage dispenser. In this case, each flow path of the plurality of flow paths from without the hand-held beverage dispenser runs to each selector valve of the plurality of selector valves. Likewise, the valve arrangement comprises a corresponding flow control valve substantially contained within said hand-held beverage dispenser for each selector valve, each selector valve being functionally independent of the corresponding flow control valve. Actuation of a flow control valve thus enables fluid discharge from the corresponding one of the plurality of flow paths to without the hand-held beverage dispenser.

The valve arrangement for selectively establishing beverage fluid flow paths through a hand-held beverage dispenser most preferably comprises an additional plurality of flow paths, which are mutually exclusive of the first plurality of flow paths. A predetermined corresponding one of the additional plurality of flow paths is provided from without the hand-held beverage dispenser to each of the plurality of flow control valves. Each flow control valve is thus further adapted, upon actuation, to enable fluid discharge from the corresponding one of the additional plurality of flow paths to without the hand-held beverage dispenser.

In use of the most preferred embodiment of the valve arrangement for selectively establishing beverage fluid flow paths through a hand-held beverage dispenser, for selectively dispensing a demanded one of a plurality of post-mix beverages, each selection valve determines, on an ad hoc basis, which of the first plurality of flow paths will be utilized at any given time, while the flow control valve provides single action simultaneous ON-OFF control of fluid flows through both the selected flow path from the selector valve and the predetermined flow path to the flow control valve.

In at least some implementations of the valve arrangement for selectively establishing beverage fluid flow paths through a hand-held beverage dispenser, the selector valve is rotationally operated. In at least this case, the valve arrangement preferably further comprises a configuration lock adapted to maintain each selector valve in a respective operable state, as opposed to being inadvertently left in a transitional state between operable states. In the preferred implementation of the present invention, the configuration lock not only prevents inadvertent transition out of an operable state, but also precludes final assembly for use if any one of the selector valves is not in an operable state.

BRIEF DESCRIPTION OF THE DRAWINGS

FIG. 1 is a top rear end isometric view;

FIG. 2 is a right side elevational view; and

FIG. 3 is a bottom rear end isometric view.

FIG. 4 is a partially exploded bottom front end isometric view; and

FIG. 5 is a partially exploded top front end isometric view.

FIG. 7 is an exploded top rear end isometric view; and

FIG. 8 is an exploded bottom front end isometric view.

FIG. 9 is a top rear end isometric view;

FIG. 10 is a bottom front end isometric view;

FIG. 11 is a rear end elevational view; and

FIG. 12 is a bottom plan view.

FIG. 13 is a top front end isometric view;

FIG. 14 is a bottom rear end isometric view;

FIG. 15 is a top plan view; and

FIG. 16 is a cross-sectional elevational view taken along lines 16-16 of FIG. 15.

FIG. 18 is a top rear end isometric view; and

FIG. 19 is a cross-sectional elevational view taken along lines 19-19 of FIG. 18.

FIG. 20 is a top rear end isometric view;

FIG. 21 is a bottom front end isometric view;

FIG. 22 is a right side elevational view;

FIG. 23 is a top plan view;

FIG. 24 is a rear end elevational view;

FIG. 25 is a front end elevational view;

FIG. 26 is a cross-sectional elevational view taken along lines 26-26 of FIG. 23;

FIG. 27 is a cross-sectional elevational view taken along lines 27-27 of FIG. 23; and FIG. 28 is a cross-sectional elevational view taken along lines 28-28 of FIG. 23.

FIG. 30A is a first a detail view taken from FIG. 29;

FIG. 30B is a second detail view taken from FIG. 29;

FIG. 30C is a third detail view taken from FIG. 29; and

FIG. 30D is a fourth detail view taken from FIG. 29.

FIG. 31 is a top isometric view;

FIG. 32 is a bottom isometric view;

FIG. 33 is a side elevational view;

FIG. 34 is a top plan view;

FIG. 35 is a cross-sectional elevational view taken along lines 35-35 of FIG. 34; and FIG. 36 is cross-sectional elevational view taken along lines 36-36 of FIG. 34.

FIG. 37 is a top isometric view;

FIG. 38 is a side elevational view;

FIG. 39 is a top plan view; and

FIG. 40 is a cross-sectional elevational view taken along lines 40-40 of FIG. 39.

FIG. 41 is a top isometric view;

FIG. 42 is a side elevational view; and

FIG. 43 is a cross-sectional elevational view taken along lines 43-43 of FIG. 42.

FIG. 44 is a top isometric view; and

FIG. 45 is a bottom isometric view.

FIG. 46A is a top isometric view; and

FIG. 46B is a cross-sectional elevational view taken along lines 46B-46B of FIG. 46A.

FIG. 47A is a top isometric view; and

FIG. 47B is a cross-sectional elevational view taken along lines 47B-47B of FIG. 47A.

FIG. 48 is an exploded bottom front end isometric view of the handle body and a multiplicity of connector tubes and rods; and FIG. 49 is a bottom front end isometric view of the handle body and the multiplicity of connector tubes and rods.

FIG. 50 is a top isometric view;

FIG. 51 is a bottom isometric view;

FIG. 52 is a side elevational view;

FIG. 53 is a cross-sectional elevational view taken along lines 53-53 of FIG. 52.

FIG. 54 is a partially exploded top rear end isometric view;

FIG. 55 is a top rear end isometric view;

FIG. 56 is a cross-sectional elevational view taken along lines 56-56 of FIG. 55; and FIG. 57 is a top rear end isometric view, including the upper seal of each valve unit.

FIG. 58 is a partially exploded top rear end isometric view;

FIG. 59 is a bottom front end isometric view; and

FIG. 60 is a bottom front end isometric view, including the flow control valve trim assembly of each valve unit.

FIG. 61 is a partially exploded top rear end isometric view;

FIG. 62 is a top rear end isometric view; and

FIG. 63 is top plan view, including the selector valve trim assembly of each valve unit.

FIG. 64 is a top rear end isometric view; and

FIG. 65 is a bottom plan view.

FIG. 66 is a partially exploded top rear end isometric view; and

FIG. 67 is a top rear end isometric view.

FIG. 68A depicts the selector valve trim assembly in a first operative state; and FIG. 68B depicts the selector valve trim assembly in a second operative state.

FIG. 69A is a bottom plan view;

FIG. 69B is a bottom rear end isometric view;

FIG. 69C is a bottom front end isometric view;

FIG. 69D is a right side elevational view; and

FIG. 69E is a top plan view.

FIG. 70A is a bottom plan view;

FIG. 70B is a bottom rear end isometric view;

FIG. 70C is a bottom front end isometric view;

FIG. 70D is a right side elevational view; and

FIG. 70E is a top plan view.

FIG. 71 is a top front end isometric view;

FIG. 72 is a bottom rear end isometric view;

FIG. 73 is a right side elevational view;

FIG. 74 is a top plan view;

FIG. 75 is a cross-sectional elevational view taken along lines 75-75 of FIG. 74; and FIG. 76 is a top rear end view.

FIG. 79 is a top rear end view;

FIG. 80 is a rear end elevational view; and

FIG. 81 is a cross-sectional bottom plan view taken along lines 81-81 of FIG. 80.

FIG. 82A is a bottom rear end isometric view from the right side; and

FIG. 82B is a top front end isometric view from the left side.

FIG. 83A is a top isometric view;

FIG. 83B is a bottom plan view; and

FIG. 83C is a cross-sectional elevational view taken along lines 83C-83C of FIG. 83A.

FIGS. 84A-84C illustrate a second exemplary button cap of the hand-held beverage dispenser, where:

FIG. 84A is a top isometric view;

FIG. 84B is a bottom plan view; and

FIG. 84C is a cross-sectional elevational view taken along lines 84C-84C of FIG. 84A.

FIGS. 85-87 illustrate a fifth stage of assembly of the preferred embodiment of the hand-held beverage dispenser wherein a button cap is provided for operation of the flow control valve trim assembly of the representative one valve unit, and where:

FIG. 85 is a partially exploded top rear end isometric view;

FIG. 86 is a top rear end isometric view; and

FIG. 87 is a top rear end isometric view, including the button cap for the flow control valve trim assembly of each valve unit.

FIGS. 88-89 illustrate attachment of a post-mix type drink dispenser assembly to the handle body, in a sixth stage of assembly of the hand-held beverage dispenser, where:

FIG. 88 is a partially exploded top front end isometric view; and

Figure 89:
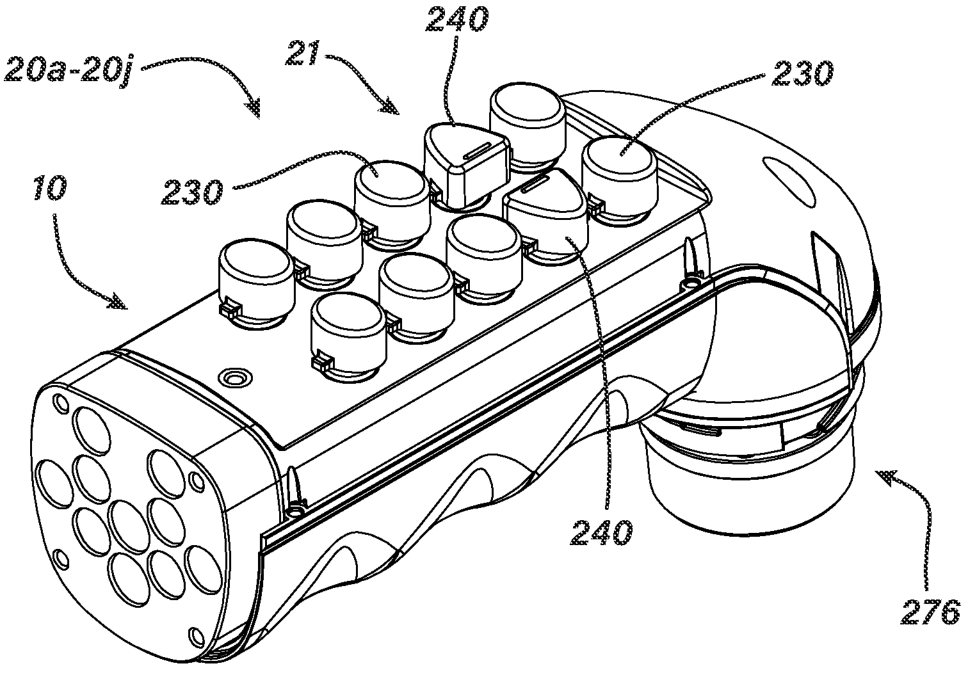

FIG. 89 is a top rear end isometric view.

Figure 90:
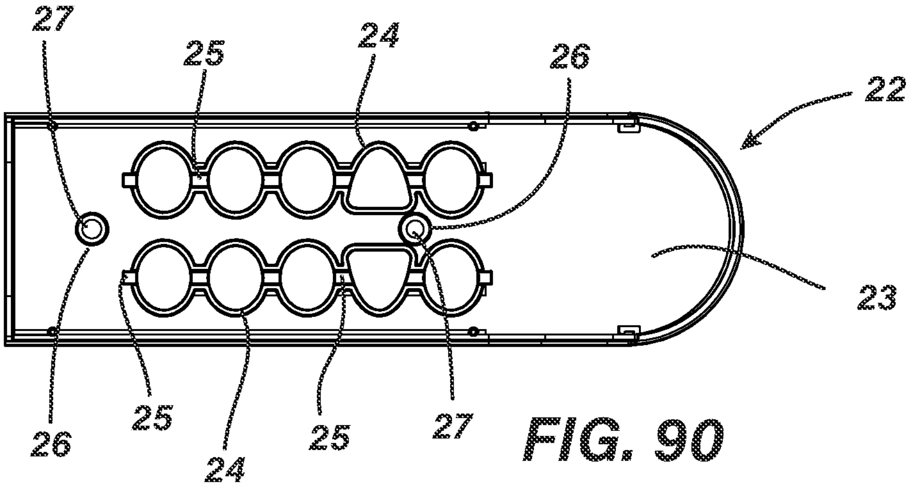
Figure 91:
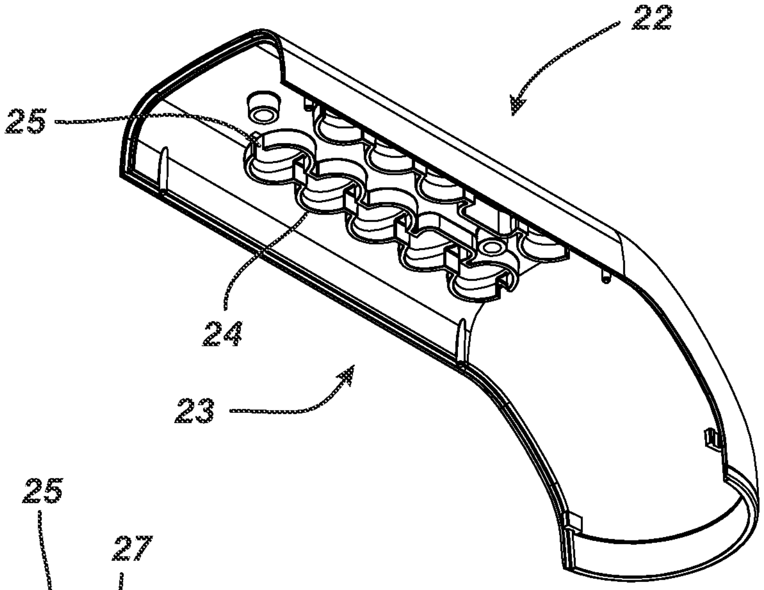
Figure 92:
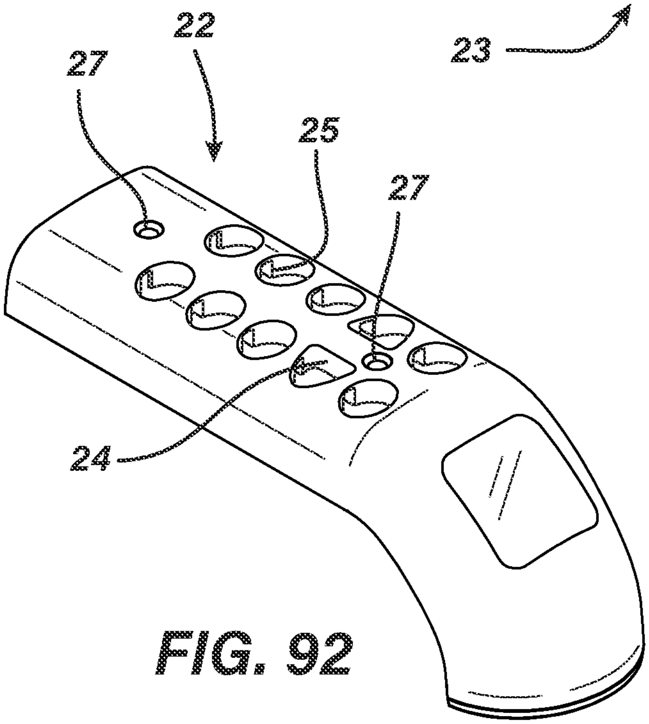

FIGS. 90-92 illustrate various aspects of a top enclosure member of the preferred embodiment of the hand-held beverage dispenser, where:

FIG. 90 is a bottom plan view;

FIG. 91 is a bottom rear end isometric view; and

FIG. 92 is a top front end isometric view.

Figure 93:
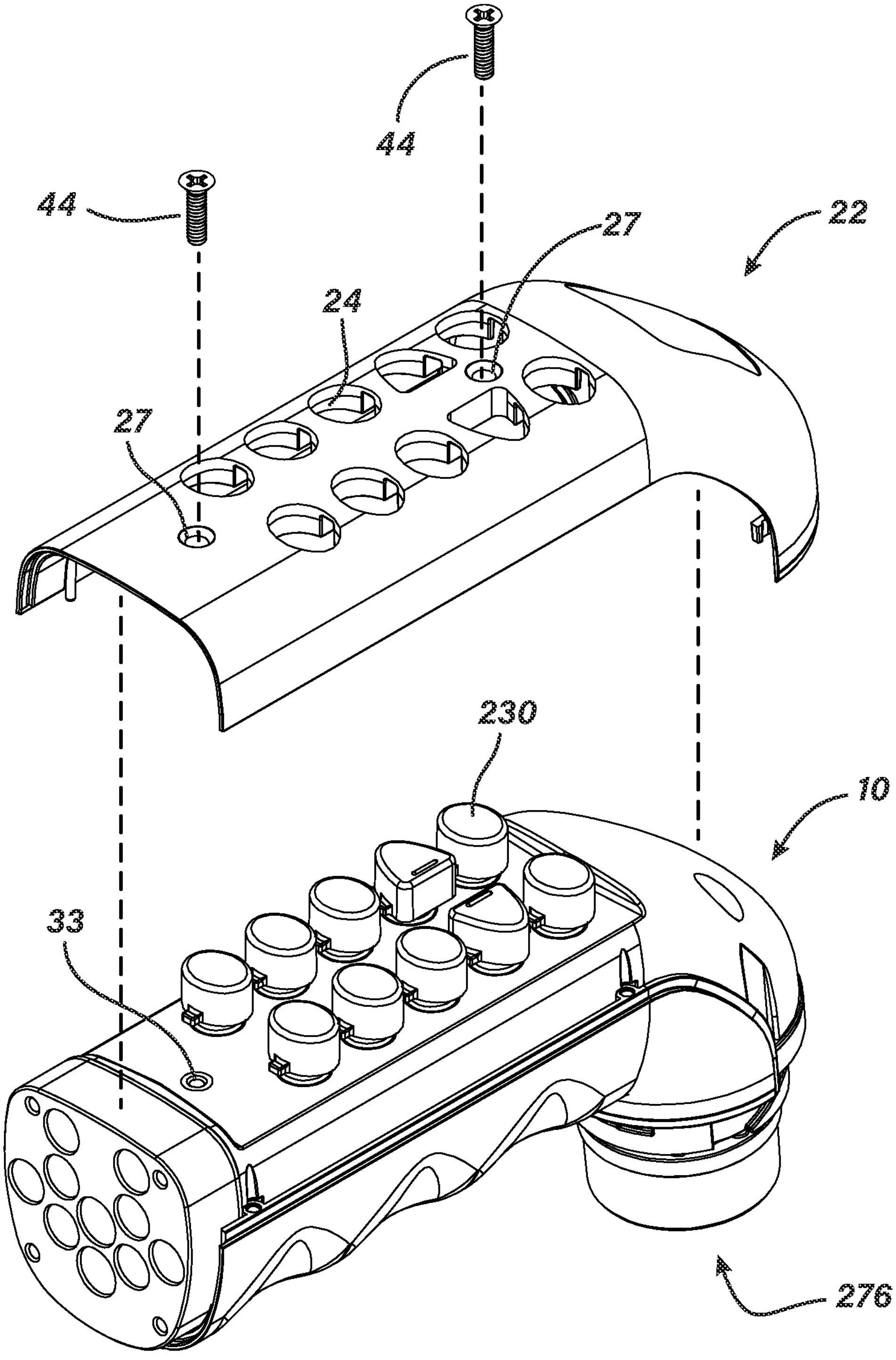

FIG. 93 is a partially exploded top rear end isometric view illustrating attachment of the top enclosure member to the handle body a seventh stage of assembly of the hand-held beverage dispenser.

Figure 94A:
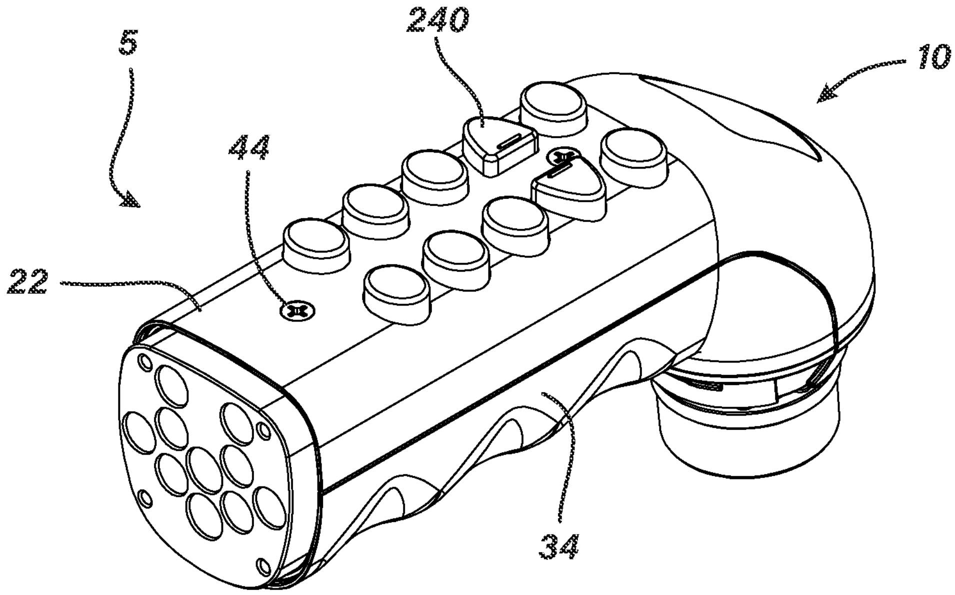
Figure 94B:
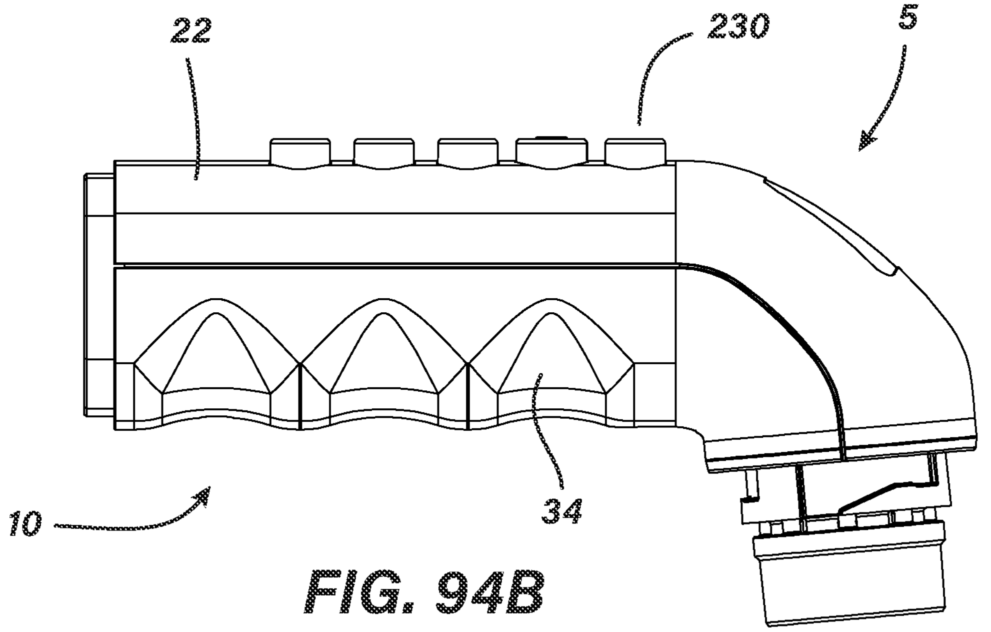

FIGS. 94A-94B illustrate various aspects of the assembled hand-held beverage dispenser, where:

FIG. 94A is a top rear end isometric view; and

FIG. 94B is a right side elevational view.

Figure 95A:
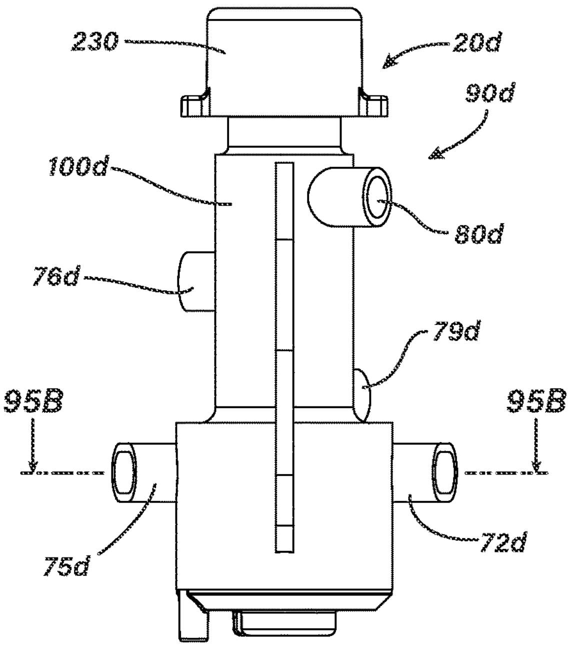
Figure 95D:
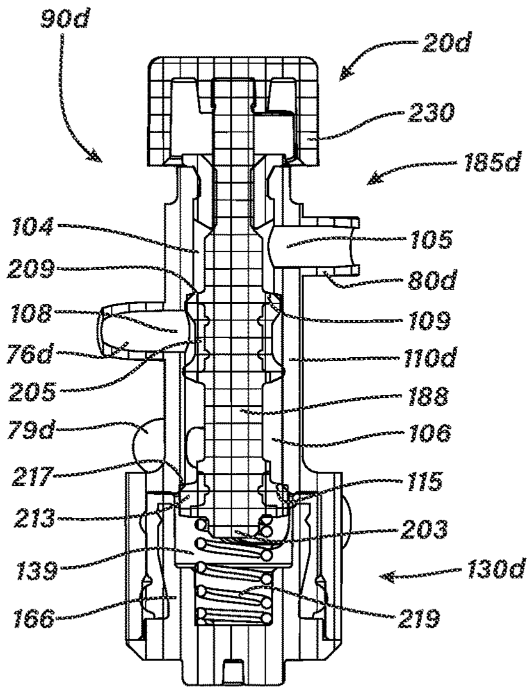
Figure 95C:
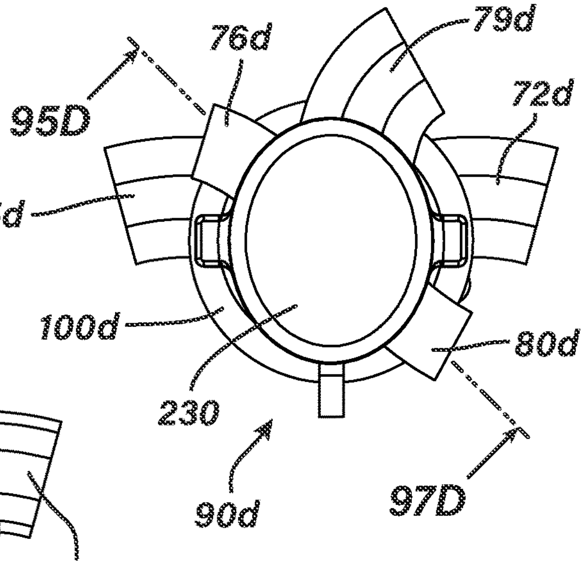
Figure 95B:
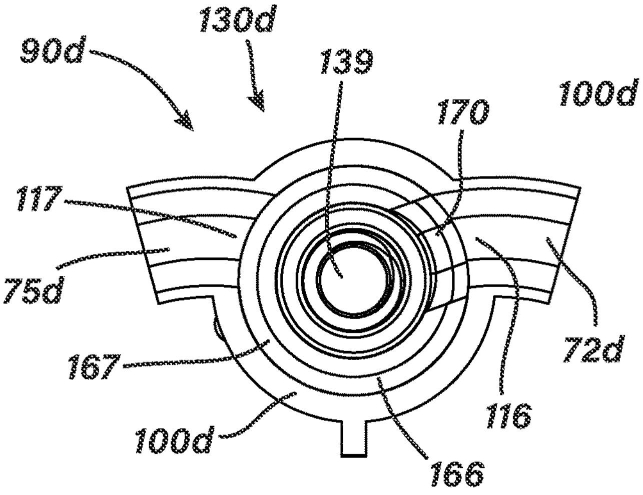

FIGS. 95A-95E are partially cut away views generally corresponding to the partially cut away views of FIGS. 20-28, and illustrating the representative one valve unit of the preferred embodiment of the hand-held beverage dispenser in a first operative state, where:

FIG. 95A is a right side elevational view;

FIG. 95B is a cross-sectional top plan view taken along lines 95B-95B of FIG. 95A;

FIG. 95C is a top plan view; and

FIG. 95D is a cross-sectional elevational view taken along lines 95D-95D of FIG. 95C.

Figure 95E:
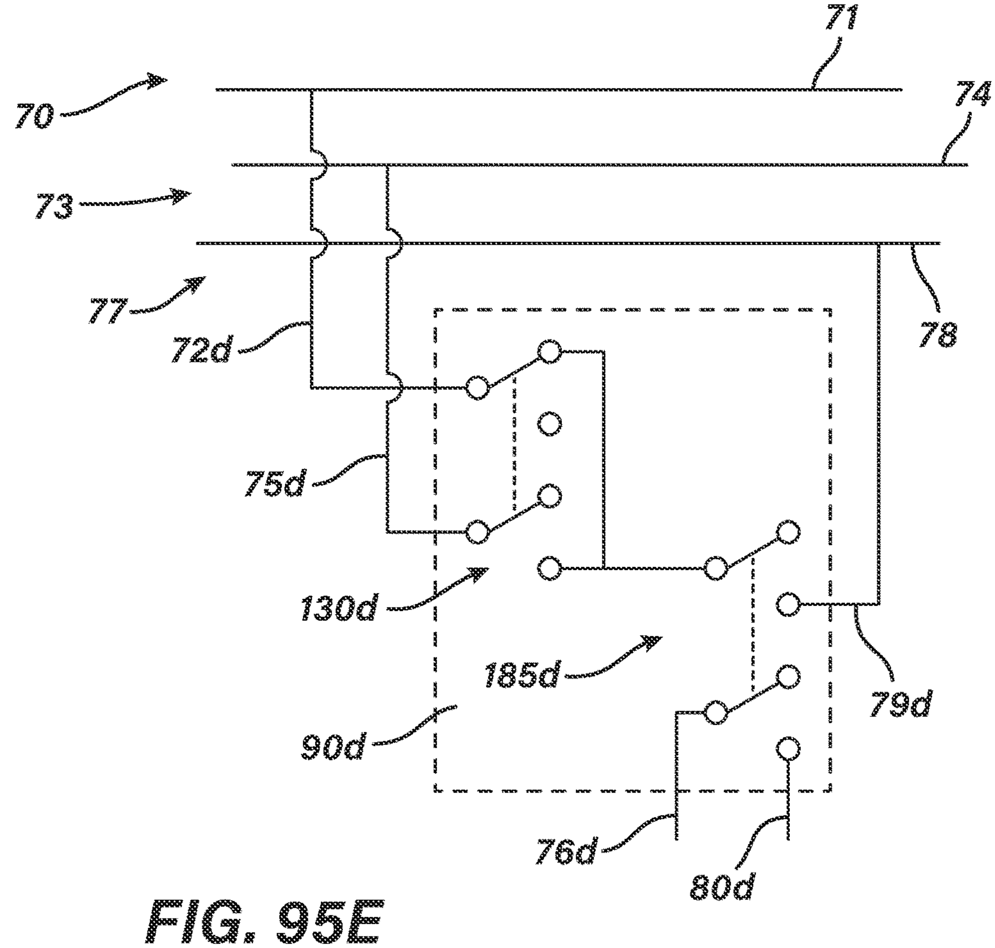

FIG. 95E is a schematic piping diagram corresponding to the views of FIGS. 95A-95D.

Figure 96A:
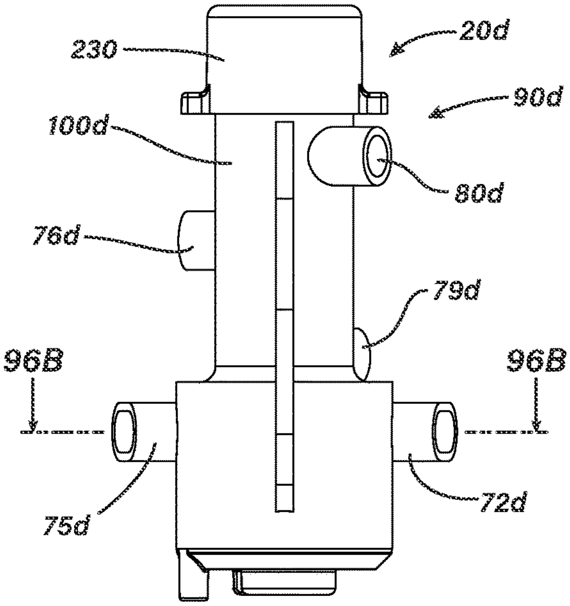
Figure 96D:
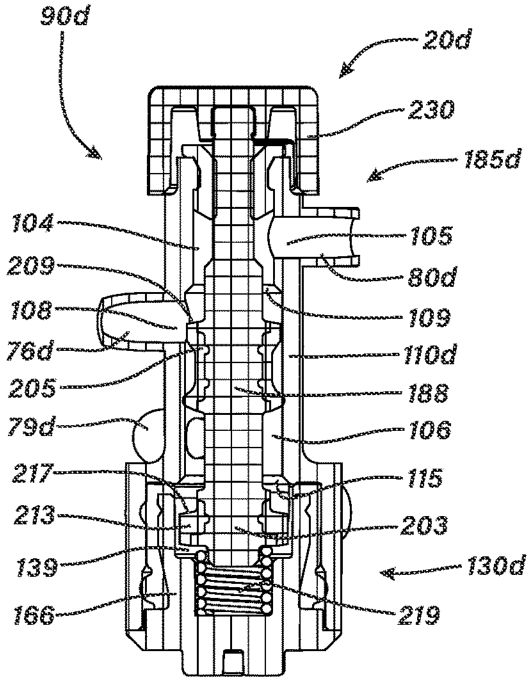
Figure 96C:
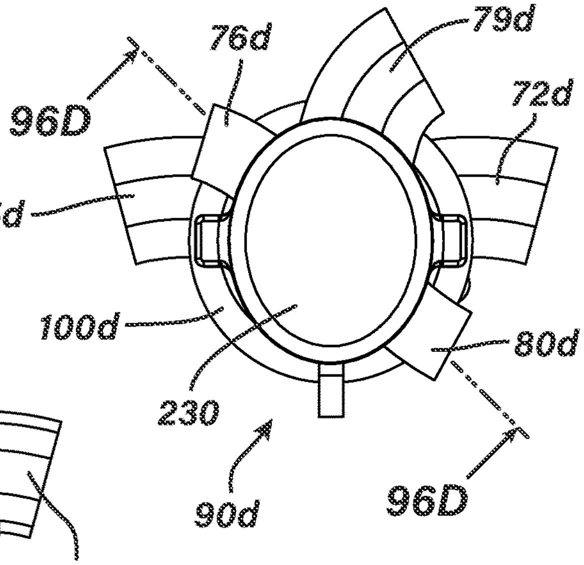
Figure 96B:
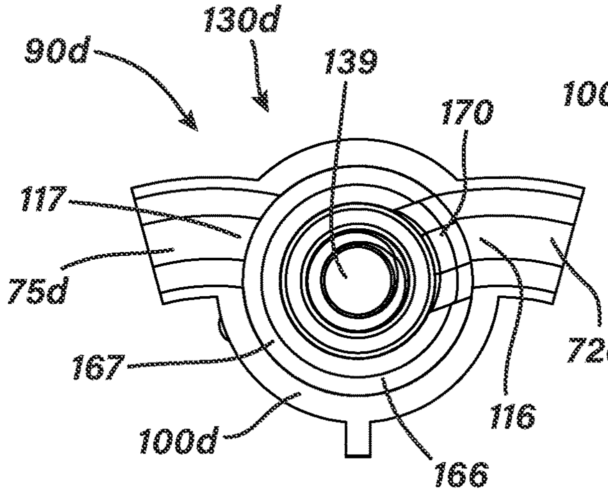

FIGS. 96A-96D are partially cut away views generally corresponding to the partially cut away views of FIGS. 20-28, and illustrating the representative one valve unit of the preferred embodiment of the hand-held beverage dispenser in a second operative state, where:

FIG. 96A is a right side elevational view;

FIG. 96B is a cross-sectional top plan view taken along lines 96B-96B of FIG. 96A;

FIG. 96C is a top plan view; and

FIG. 96D is a cross-sectional elevational view taken along lines 96D-96D of FIG. 96C.

Figure 96E:
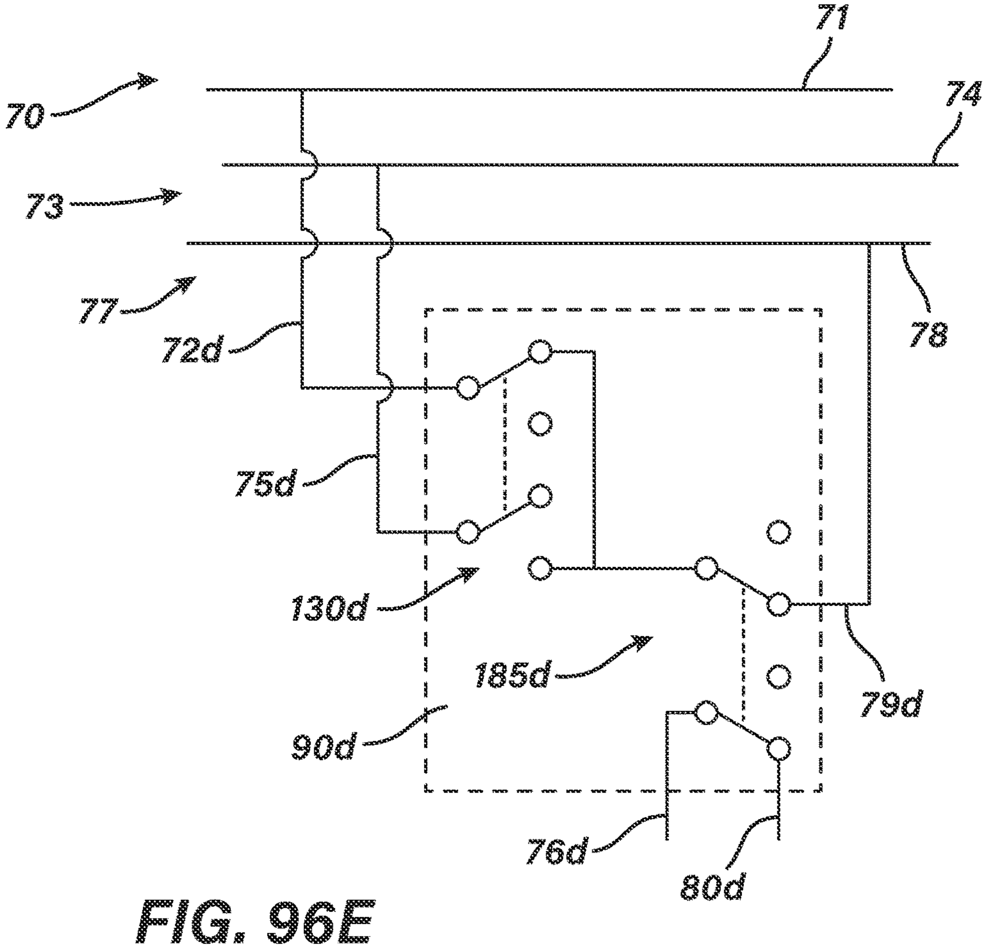

FIG. 96E is a schematic piping diagram corresponding to the views of FIGS. 96A-96D.

Figure 97A:
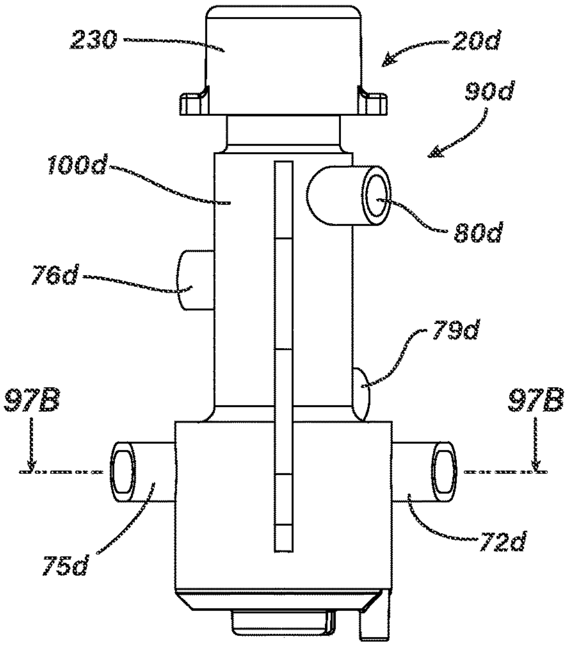
Figure 97D:
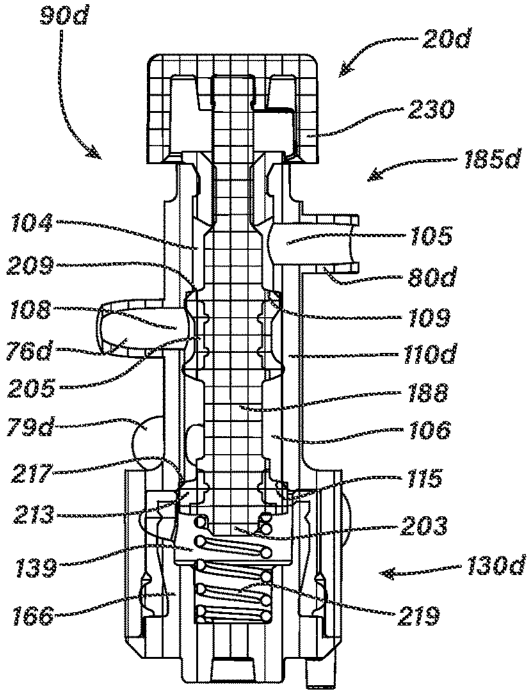
Figure 97C:
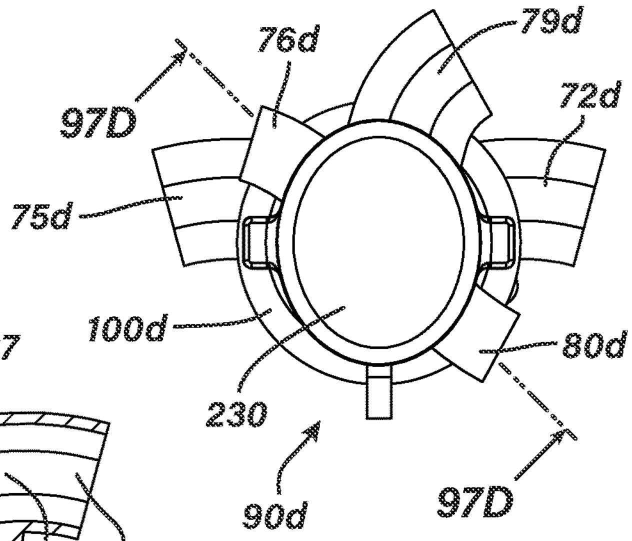
Figure 97B:
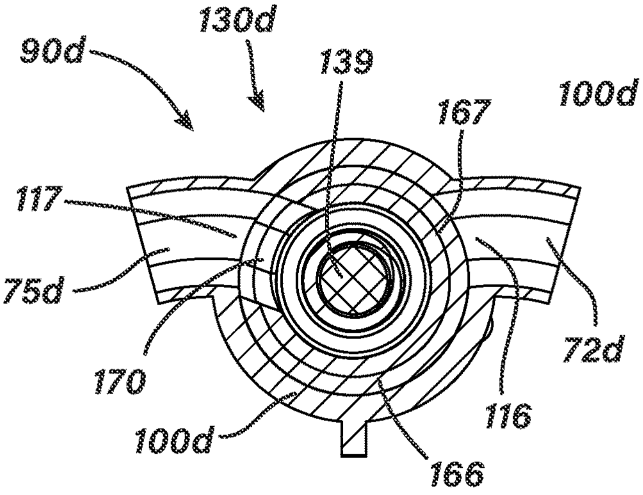

FIGS. 97A-97D are partially cut away views generally corresponding to the partially cut away views of FIGS. 20-28, and illustrating the representative one valve unit of the preferred embodiment of the hand-held beverage dispenser in a third operative state, where:

FIG. 97A is a right side elevational view;

FIG. 97B is a cross-sectional top plan view taken along lines 97B-97B of FIG. 97A;

FIG. 97C is a top plan view; and

FIG. 97D is a cross-sectional elevational view taken along lines 97D-97D of FIG. 97C.

Figure 97E:
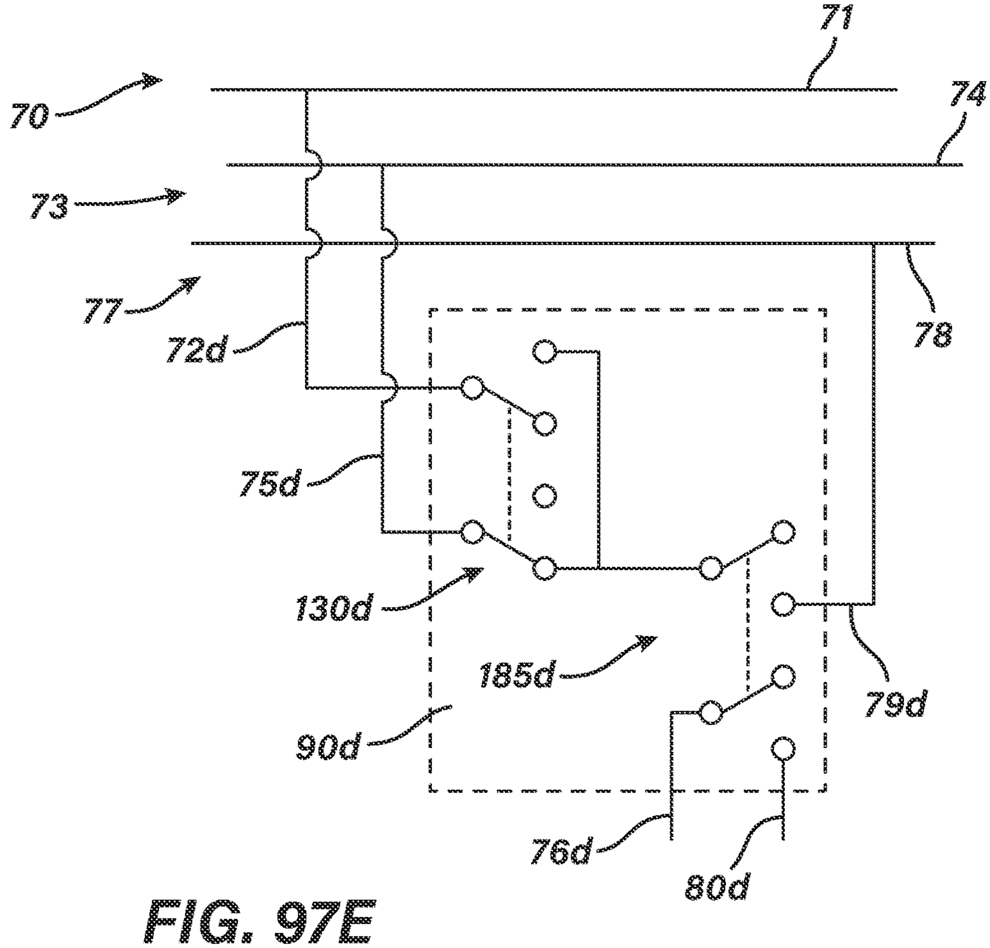

FIG. 97E is a schematic piping diagram corresponding to the views of FIGS. 97A-97D.

Figure 98A:
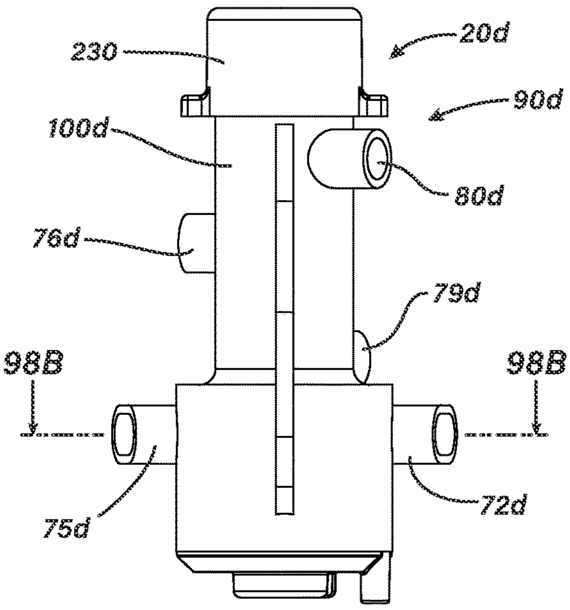
Figure 98D:
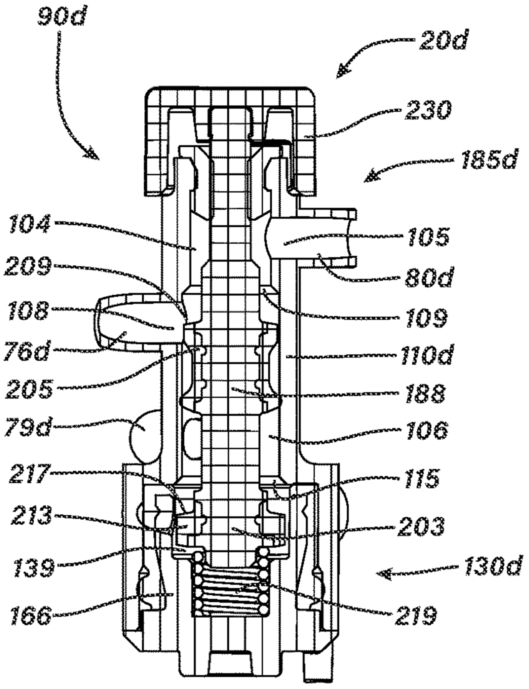
Figure 98C:
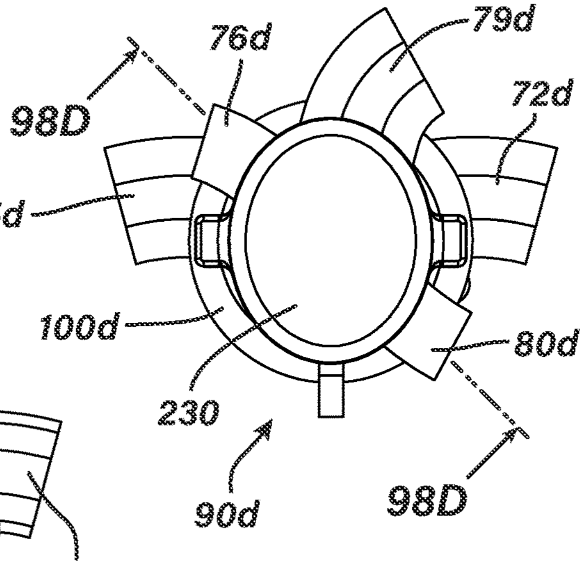
Figure 98B:
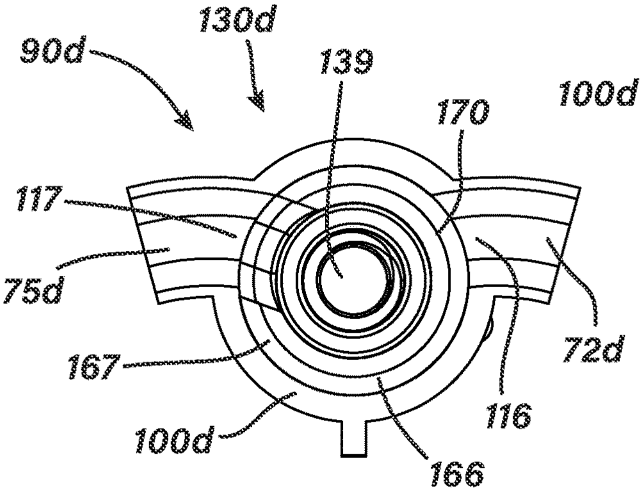

FIGS. 98A-98D are partially cut away views generally corresponding to the partially cut away views of FIGS. 20-28, and illustrating the representative one valve unit of the preferred embodiment of the hand-held beverage dispenser in a fourth operative state, where:

FIG. 98A is a right side elevational view;

FIG. 98B is a cross-sectional top plan view taken along lines 98B-98B of FIG. 98A;

FIG. 98C is a top plan view; and

FIG. 98D is a cross-sectional elevational view taken along lines 98D-98D of FIG. 98C.

Figure 98E:
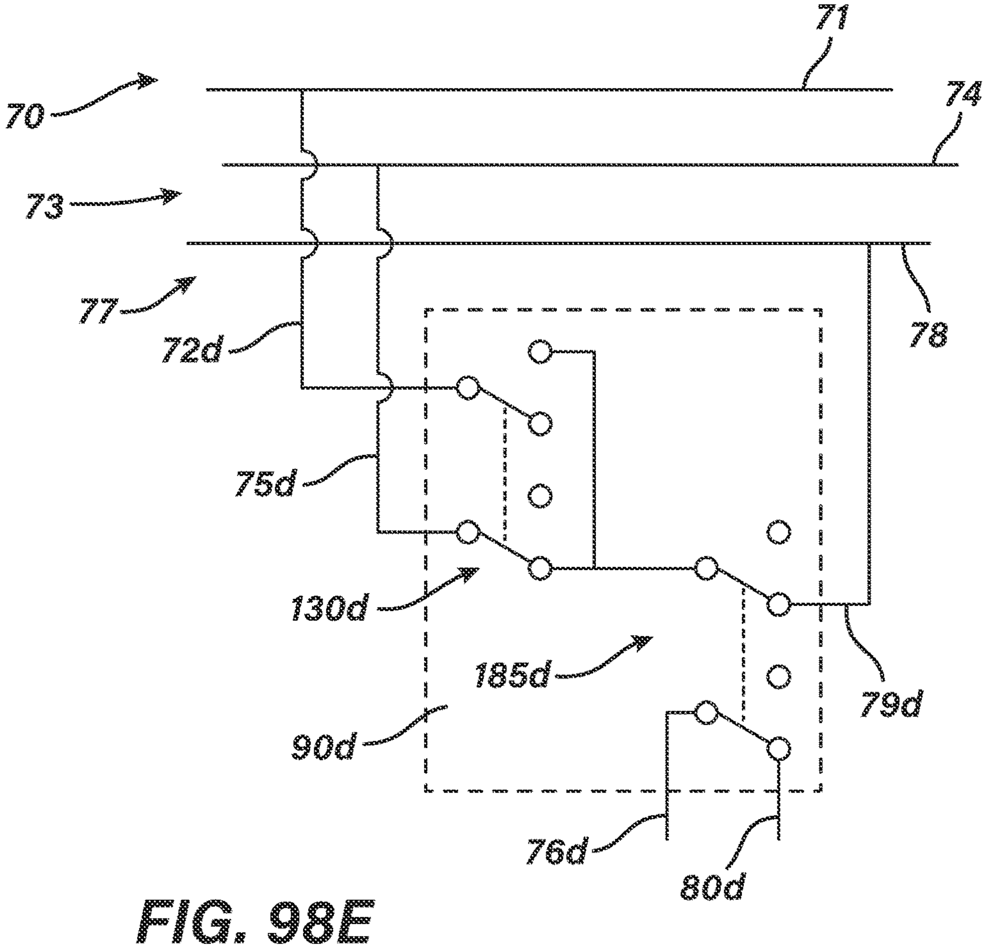

FIG. 98E is a schematic piping diagram corresponding to the views of FIGS. 98A-98D.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Figures are not necessarily to scale, and some features may be exaggerated to show details of particular components or steps.

Expressly Defined Terminology

Distinct

In referring to various valves, whether in describing or claiming any of the present invention or inventions, the term "distinct" means that each one of a plurality of referred to valves performs mutually exclusive functions, e.g., a first valve turning a flow on or off and a second valve selecting a single source from a plurality of sources when neither valve is provided with the capability to perform the function of the other.

Functionally Independent

In referring to various valves, whether in describing or claiming any of the present invention or inventions, the term "functionally independent" means that each one of a plurality of referred to valves may be actuated, deactivated, operated or otherwise used in its normal function without regard to the state of any other such valve, and that actuation, deactivation, operation or other use of any such valve does not cause any change in state of any other such valve.

State

In referring to referring to various valves or valve units, whether in describing or claiming any of the present invention or inventions, the term "state" means one configuration of a plurality of unique configurations of a single referred to valve, or one composite configuration of a plurality of unique composite configurations of a plurality of referred to valves operating together, in combination or otherwise cooperatively as a single unit.

Substantially Within

In referring to the extents of a handle body of a hand-held beverage dispenser, whether in describing or claiming any of the present invention or inventions, the term "substantially within" means that a subject feature is within the outer extents of the handle body, which includes any portion of the feature that also forms any aspect of the outer extents of the handle body. The term expressly excludes any aspect of the feature that protrudes beyond the normal grip of the handle body, or interferes with control of the hand-held beverage dispenser, but includes any aspect of the feature that extends beyond the outer extents of the handle to form or interface with a control, or to form or interface with an inlet or outlet to or from the handle body, or is contained within a cover or the like that is ordinarily in place about the handle body in use of the hand-held beverage dispenser for dispensing a beverage product.

Figure 1:
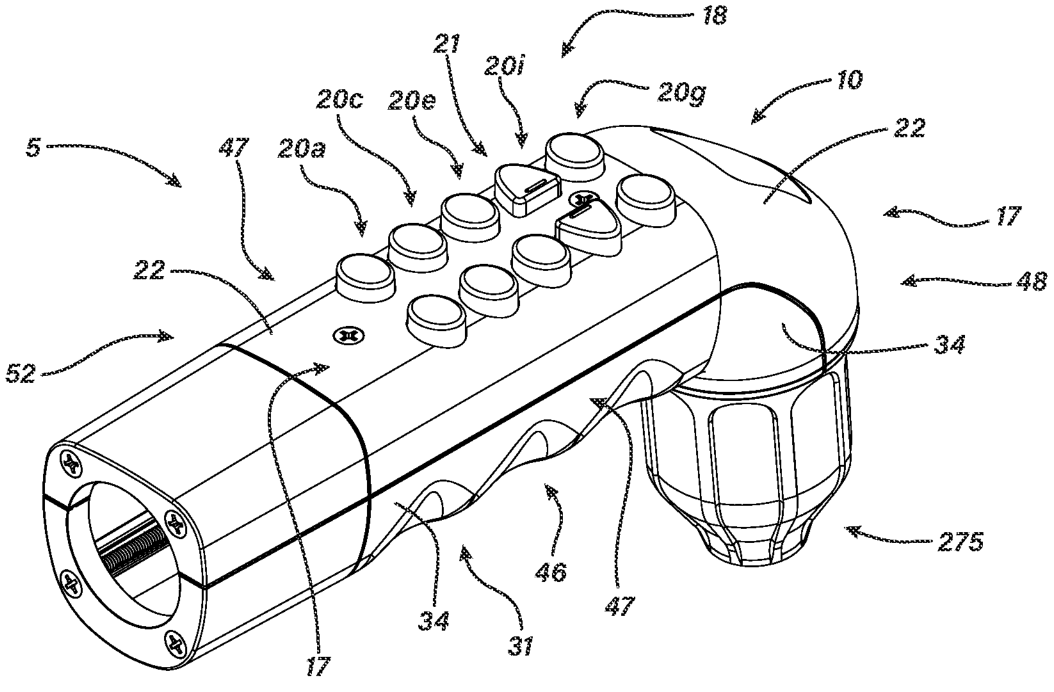
FIGS. 1-3 illustrate a hand-held beverage dispenser according to a preferred embodiment, where.
Figure 2:
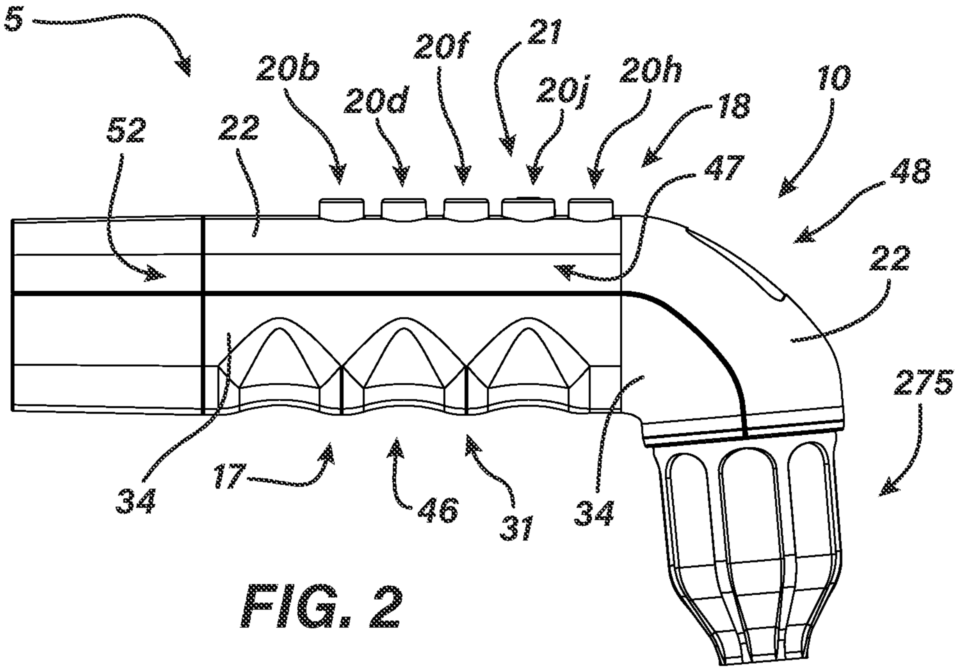
Figure 3:
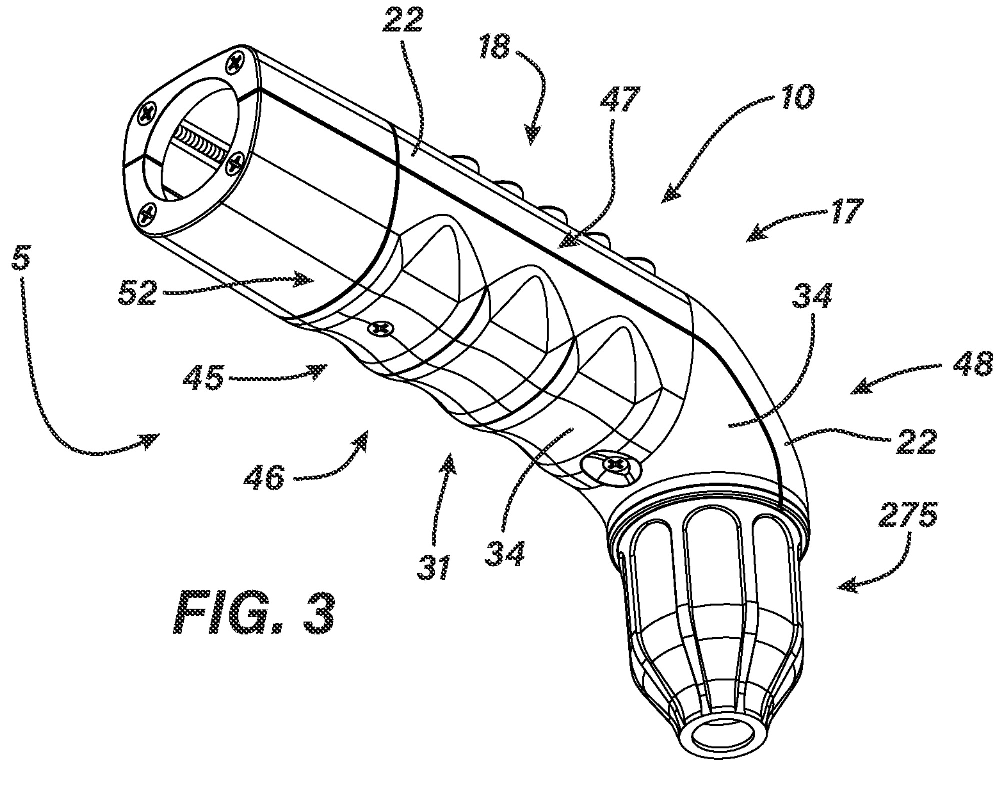

Referring now to FIGS. 1-3 in particular, a preferred embodiment according to the present invention of a hand-held beverage dispenser 5 is shown to generally comprise a handle body 10 and a post-mix type drink dispenser assembly 275. As will be better understood further herein, the preferred embodiment of the hand-held beverage dispenser 5 further generally comprises a novel piping system 65, which is housed within the extents of the handle body 10. As shown in FIGS. 1-3, the handle body 10 has a top 18, a bottom 31, sides 47, and forward and rear ends 48, 52. A clamshell type housing assembly 17 includes an upper enclosure member 22 and a lower enclosure member 34, which together cover the handle body 10, and also present the outermost shape and appearance of a substantial portion of the handle body 10, including the forward end 48 thereof. As will be readily appreciated by those of ordinary skill in the relevant arts, the depicted hand-held beverage dispenser 5 is of the well-known class of beverage dispensers often referred to as bar guns or soda guns. Like other beverage dispensers of its class, the hand-held beverage dispenser 5 of the present invention is used for on demand dispensing of a selected one of a variety of post-mix beverages.

As is well known to those of ordinary skill in the relevant arts, such post-mix beverages are prepared as they are dispensed from a bar gun by mixing together a beverage product and a diluent for the beverage product. The beverage product is typically beverage syrup or other concentrate, and the diluent for the concentrate is most often carbonated water or plain water. The present invention, however, is not limited in any fashion to or by these particular exemplary only beverage fluids, despite their typicality. In any case, a typical beverage diluent is generally appropriate for use with a great variety of beverage products. Conversely, a typical beverage product is generally only compatible with a particular diluent. Consequently, every beverage dispenser of the bar gun class must be formed, configured or otherwise adapted to deliver an appropriate diluent for any selected beverage product, together with that selected beverage product, to the post-mix type drink dispenser assembly—in whatever manner the post-mix type drink dispenser assembly is implemented in connection with the particular hand-held beverage dispenser. As will be better understood further herein, the novel piping system 65 of the present invention is specially formed, configured and otherwise adapted to greatly facilitate matching an appropriate diluent with any particular beverage product as may be mixed together and dispensed from the hand-held beverage dispenser 5 of the present invention.

In addition to implementing ad hoc selection of a diluent to be mixed with a particular beverage product, the novel piping system 65 of the present invention furthers other of Applicant's objects in providing the hand-held beverage dispenser 5 with functionally independent, single action, ON-OFF control of the flow of each post-mix beverage dispensed from the hand-held beverage dispenser 5. As will be familiar to countless service industry employees worldwide, a plurality of ON-OFF flow controls 20*a*-20*j* is accessible at the top 18 of the handle body 10 of the hand-held beverage dispenser 5, as shown in FIGS. 1-3.

Each functionally independent ON-OFF flow control 20*a*-20*j* for a corresponding post-mix beverage is actuated through the simple act of depressing the ON-OFF flow control 20*a*-20*j* inward toward the handle body 10 of the hand-held beverage dispenser 5. This single action in turn causes both the corresponding beverage product and the appropriate diluent for the beverage product to be mixed together and dispensed—as the desired post-mix beverage—from the post-mix type drink dispenser assembly 275 of the hand-held beverage dispenser 5. Cooperating in the provision of such simple end-user control, the handle body 10 is most preferably ergonomically contoured about the sides 47 and bottom 31 to provide a secure, ambidextrous grip 46 for the end user of the hand-held beverage dispenser 5. The resultant comfort in hand, and the ease of use of the simple ON-OFF flow controls 20*a*-20*j*, enable the end user to effortlessly hold the post-mix type drink dispenser assembly 275 steady over a beverage vessel while any of the ON-OFF flow controls 20*a*-20*j* is actuated—typically by thumb press.

Figure 4:
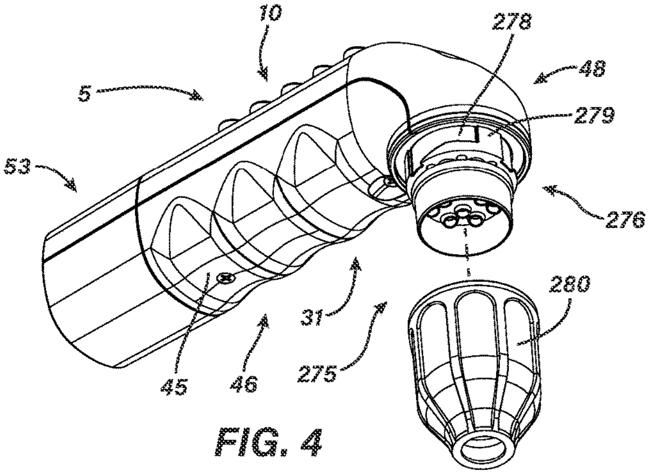
FIGS. 4-5 illustrate the provision and selective removability of a nozzle housing of the hand-held beverage dispenser, where.
Figure 5:
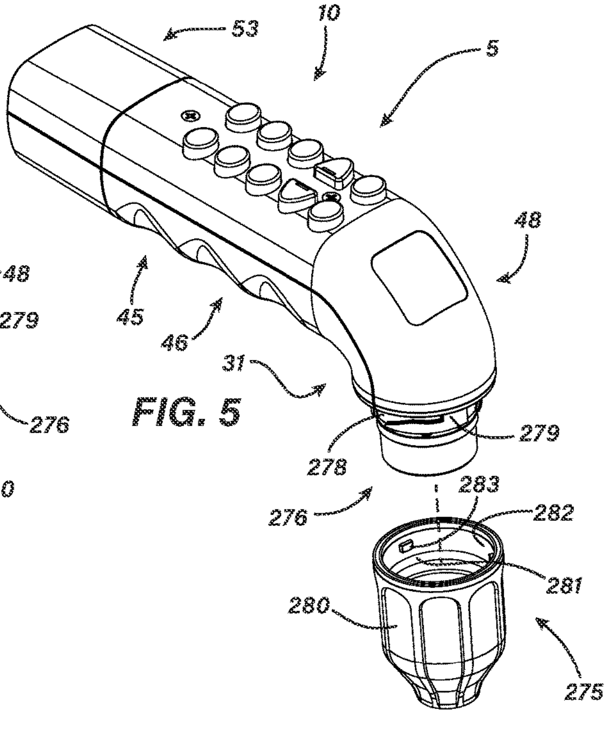

As shown in FIGS. 4-5, the post-mix type drink dispenser assembly 275 of the hand-held beverage dispenser 5 is dependently coupled to the bottom 31 of the handle body 10 at a location adjacent the forward end 48 of the handle body 10, and includes a mixer subassembly 276 in addition to the previously depicted nozzle housing 280. The preferred embodiment of the hand-held beverage dispenser 5 of the present invention contemplates the provision of a universal handle body 10 and piping system 65 in an arrangement suitable for implementation and/or use with any of a wide range of post-mix type drink dispenser assemblies. Nonetheless, details of a post-mix type drink dispenser assembly, which operates in a manner consistent with the present invention for the provision of post-mix beverages, are shown and described in U.S. Pat. No. 11,208,313 B1 issued to Applicant on Dec. 28, 2021 for METHODS AND APPARATUS FOR POST-MIX DRINK DISPENSING. By this reference, U.S. Pat. No. 11,208,313 B1 is incorporated herein as though now set forth in its entirety. Although the nozzle housing 280 and the mixer subassembly 276 of the post-mix type drink dispenser assembly 275, as configured in the general nature of the exemplary assembly, are both necessary components for properly mixing beverage fluids, the nozzle housing 280 is nonetheless adapted with the mixer subassembly 276 to be readily removable from the post-mix type drink dispenser assembly 275, as implemented in the preferred embodiment of the hand-held beverage dispenser 5.

Integrating a post-mix type drink dispenser assembly 275 having a readily removable nozzle housing 280 into the preferred embodiment of the hand-held beverage dispenser 5 facilitates periodic cleaning of the post-mix type drink dispenser assembly 275, in accordance with Applicant's object to provide the present inventions through an exemplary hand-held beverage dispenser 5 that nonetheless also includes such basic handling and maintenance features as typically expected by end users. In furtherance of these objects, the readily removable nozzle housing 280 includes a plurality of locking tabs 283 about an upper portion 282 of the inner surface 281 of nozzle housing 280, as particularly shown in FIG. 5. The locking tabs are cooperatively adapted to operably engage mating nozzle housing locking members 279 provided about a lower portion 278 of the mixer subassembly 276, as also shown in FIG. 5. As will be familiar to those of ordinary skill in the relevant arts as well as to service industry employees in general, the nozzle housing 280 locks in place with a partial twist in the clockwise direction about the mixer subassembly 276, and is similarly released with a partial twist in the counterclockwise direction about the mixer 276, as viewed from the bottom side 31 of the handle body 10.

As broadly compared to other types of post-mix beverage dispensers, beverage dispensers of the bar gun class are implemented with relatively limited functionality. For example, such beverage dispensers generally, if not universally, have no provision for adjustment or regulation of the flow rates therethrough of dispensed beverage fluids. However, as the beverage fluids pass through the implemented post-mix type drink dispenser assembly, at least the relative flow rates of a beverage product and its corresponding appropriate diluent are generally considered critical for obtaining the intended flavor, viscosity or other characteristics of a post-mix beverage. Accordingly, post-mix type beverage dispensers of the bar gun class rely on a discrete source, such as one of many readily commercially available flow control assemblies, to establish and regulate flow rates of provided beverage fluids. Like other beverage dispensers of the bar gun class the hand-held beverage dispenser 5 according to the present invention relies on an externally provided flow control assembly for the provision of appropriately regulated flows of beverage fluids. The details of such flow control assemblies, including details of the operation thereof, are well known to those of ordinary skill in the relevant arts.

Figure 6:
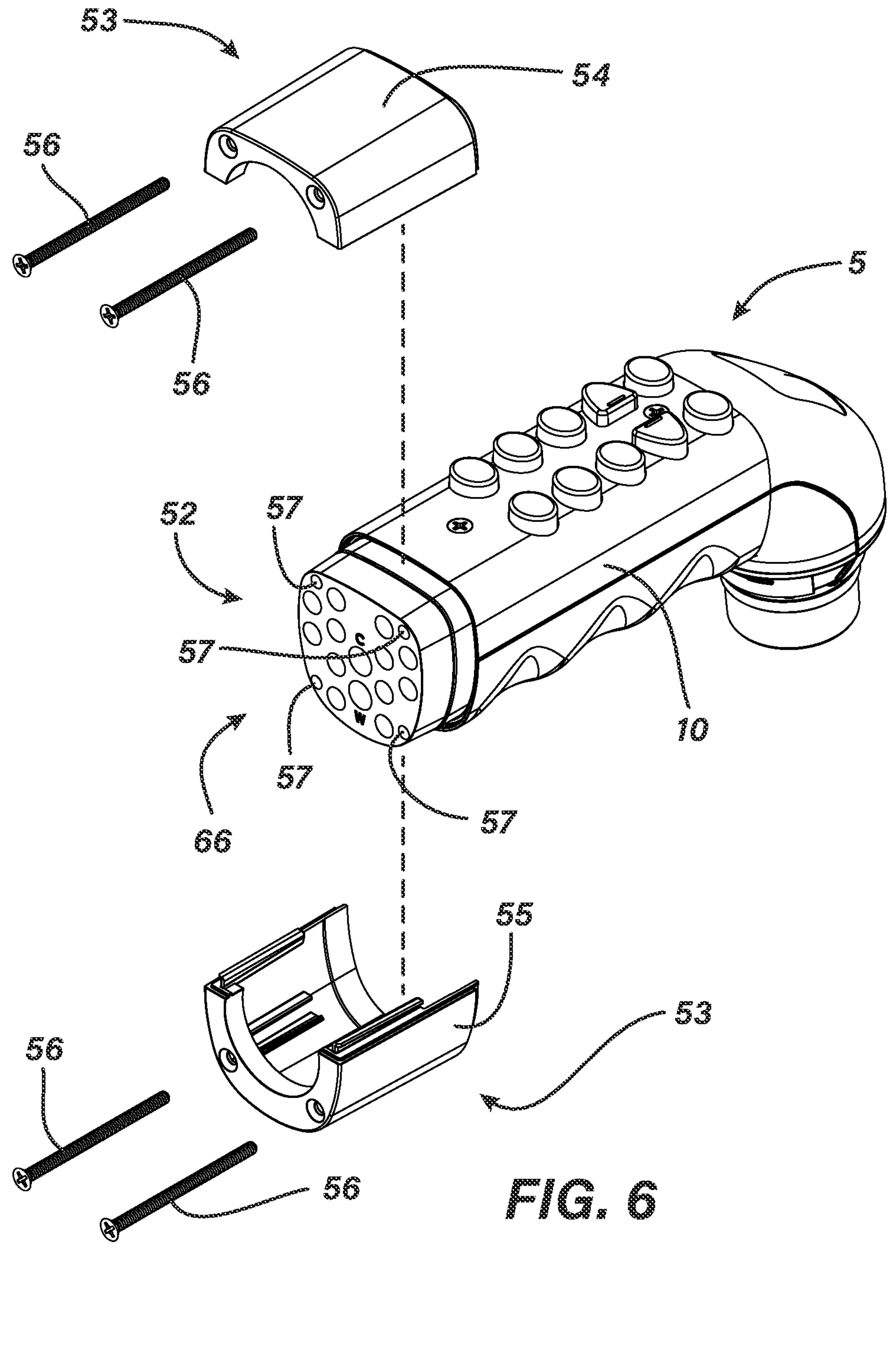
FIG. 6 is a partially exploded top rear end isometric view illustrating the provision and selective removability of an aesthetic cover of the hand-held beverage dispenser.

As is generally conventional in the relevant arts, a selected suitable flow control assembly is connected to the hand-held beverage dispenser 5 through a multiplicity of individual fluid lines, each of which is connected to, and in fluid communication with, one of a corresponding multiplicity of fluid inlets 66 provided at the rear end 52 of the handle body 10, as particularly shown in FIG. 6. In turn, desired beverage fluids from the selected suitable flow control assembly may be introduced to each connected one of the multiplicity of fluid inlets 66 of the hand-held beverage dispenser 5 through the individual fluid lines. The multiplicity of individual fluid lines from the selected flow control assembly are most often collected together in a generally elongate, typically sheathed fluid line assembly. As is well known to those of ordinary skill in the relevant arts, the individual fluid lines typically terminate with connectors that are sized, shaped and otherwise adapted to provide fluid-tight interfaces between the individual fluid lines and the multiplicity of fluid inlets 66 of the hand-held beverage dispenser 5. As also will be appreciated by those of ordinary skill in the relevant arts, any additional connector hardware or the like as may be required or otherwise desired to establish, and preferably secure, each of the individual fluid lines in fluid tight communication with a respective one of the fluid inlets 66 is readily provided within the level of ordinary skill in the relevant arts.

The preferred embodiment of the hand-held beverage dispenser 5 of the present invention includes an easily removable, interlocking rear housing assembly 53, such as may comprise an upper housing member 54 and a lower housing member 55 as shown in FIG. 6. As particularly shown in FIGS. 1 and 3, the rear housing assembly 53 provides an aesthetically pleasing enclosure for and about the connections between the individual fluid lines from a selected suitable flow control assembly and the multiplicity of fluid inlets 66 of the hand-held beverage dispenser 5, and any additional connector hardware as may be implemented. The rear housing assembly 53 may also facilitate establishing or securing an operable connection between the fluid line assembly and the preferred embodiment of the hand-held beverage dispenser of the present invention as required or otherwise desired. The details of any additional connector hardware that may in any particular deployment be required, including details of the utilization thereof, and also details of the operation or utilization of the rear housing assembly 53 or an alternative therefor, are well known to those of ordinary skill in the relevant arts. It is particularly noted, however, it is also possible that either or both of these features may be inventively provided beyond the scope of the present invention. In any case, and as also particularly shown in FIGS. 1 and 3, the rear housing assembly 53 is readily attached to the rear end 52 of the handle body 10 with, for example, machine screws 56 or other conventional mounting hardware. Correspondingly, threaded holes 57, which are sized, positioned and otherwise adapted to matingly receive the machine screws 56 or other conventional mounting hardware, are provided at the rear end 52 of the handle body 10 as particularly shown in FIG. 6.

Figure 7:
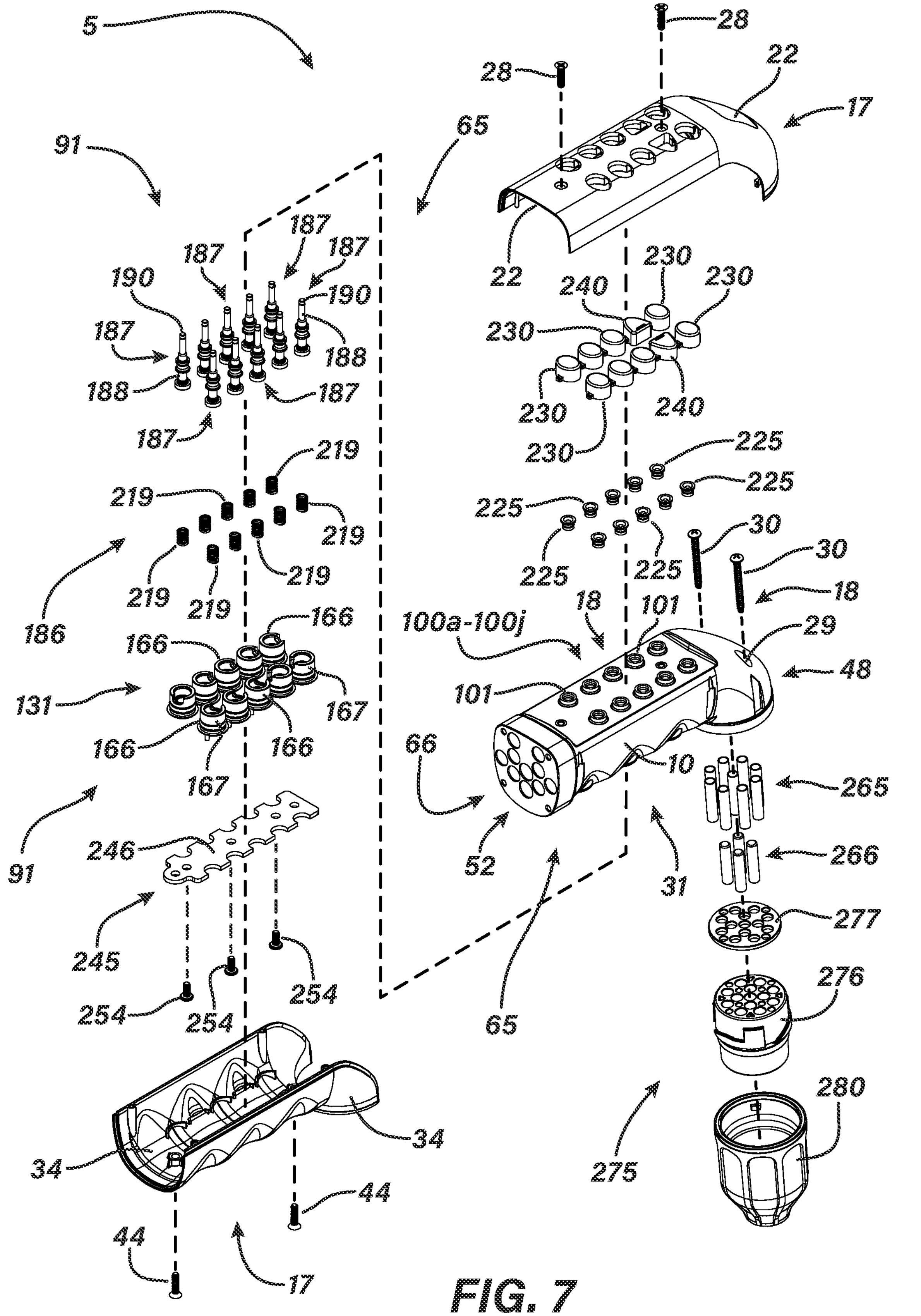
FIGS. 7-8 illustrate various aspects of the constituent components of the hand-held beverage dispenser, where.
Figure 8:
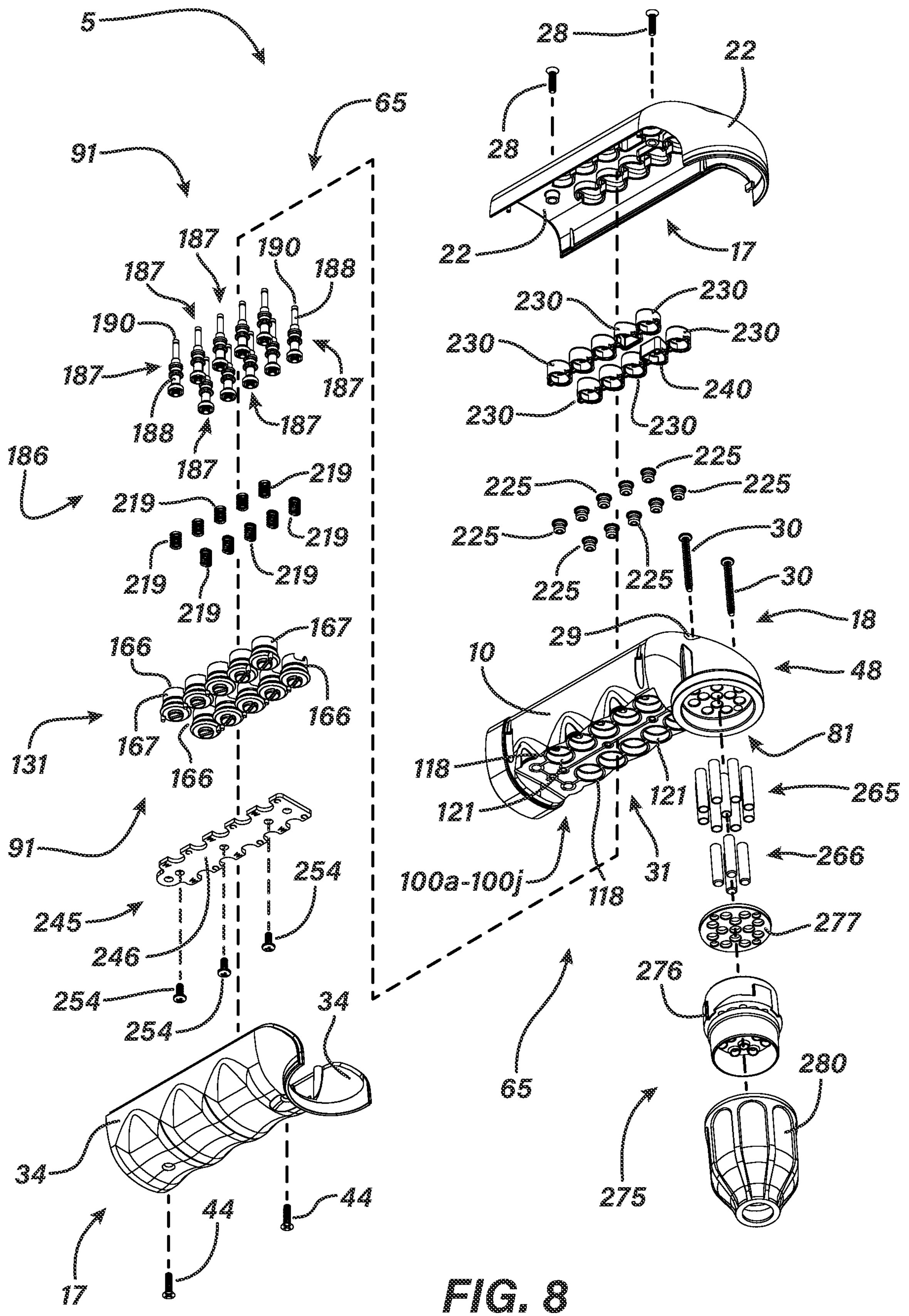

Through a set of corresponding, fully exploded views, FIGS. 7-8 illustrate various aspects of the constituent components of the exemplary hand-held beverage dispenser 5 as implemented in accordance with the present invention. In order to facilitate better understanding of the innovations implemented in the preferred embodiment of the hand-held beverage dispenser 5, an overview of the features, assemblies and subassemblies of the hand-held beverage dispenser 5, including various aspects of their functional relationships, is now provided with reference to FIGS. 7-8. In particular, aspects of the novel piping system 65 of the hand-held beverage dispenser 5 as innovatively implement the capability to select a diluent to be mixed with any particular beverage product are identified. Additionally, other aspects of the hand-held beverage dispenser 5 as facilitate maintainability of the hand-held beverage dispenser 5 or end-user use of the diluent selection capability of the hand-held beverage dispenser 5 are identified. In any case, and with the aid of this overview, all of these and other aspects of the hand-held beverage dispenser 5 are more particularly set forth in the detailed discussions to follow.

As shown in FIGS. 7-8, the preferred embodiment of the hand-held beverage dispenser 5 is assembled about the previously discussed handle body 10, which, as will be better understood further herein, includes many fluid conduits and like passages of the piping system 65 of the hand-held beverage dispenser 5. In addition to the previously identified multiplicity of fluid inlets 66 provided at the rear end 52 of the handle body 10, the handle body 10 also includes a multiplicity of fluid outlets 81 at the bottom 31 of the handle body 10 in a location adjacent the forward 48 end of the handle body 10, as best shown in FIG. 8. Each of the many fluid conduits and like passages of the piping system 10 is formed and fully defined by at least a segment of one or more fluid flow paths provided substantially within the extents of the handle body 10, and running through the handle body 10 from one of the multiplicity of fluid inlets 66 to one of the multiplicity of fluid outlets 81. The piping system 65 of the hand-held beverage dispenser 5 further includes a plurality of valve bodies 100*a*-100*j* within the extents of the handle body 10. Each of the plurality of valve bodies 100*a*-100*j* runs through the handle body 10 between the bottom 31 of the handle body 10, as particularly shown in FIG. 8, and the top 18 of the handle body 10, as particularly shown in FIG. 7. Each of the plurality of valve bodies 100*a*-100*j* is an integral component of the piping system 65 of the hand-held beverage dispenser 5, and each of the previously identified fluid flow paths through the handle body 10, from one of the multiplicity of fluid inlets 66 to one of the multiplicity of fluid outlets 81, runs through one of the plurality of valve bodies 100*a*-100*j*.

In the preferred embodiment of the hand-held beverage dispenser 5, each of the plurality of valve bodies 100*a*-100*j* is populated with an inventive composite valve trim arrangement 91, which as shown in FIGS. 7-8 includes a fully integral selector valve trim assembly 131, for implementation of diluent selector valves 130*a*-130*j*, and a flow control valve trim assembly 186, for implementation of flow control valves 185*a*-185*j*. As shown in the figures, each fully integral selector valve trim assembly 131 includes an open-topped cup 166, which as will be better understood further herein implements an independently inventive multi-port, cylindrically formed gate valve, which is formed within a compact volume about a novel cylindrical valve gate 167 and capable of approximately ⅜ turn or less operation.

Each open-topped cup 166 of the diluent selector valves 130*a*-130*j* inventively implements aspects of the flow control valves 185*a*-185*j* in a cooperative arrangement of the diluent selector valves 130*a*-130*j* with the flow control valves 185*a*-185*j*. Notwithstanding this cooperative arrangement, however, the flow control valves 185*a*-185*j* are both distinct and functionally independent with respect to the diluent selector valves 130*a*-130*j*. For clarity, it is also now emphasized that each of the provided plurality of diluent selector valves 130*a*-130*j* is functionally independent with respect to all other provided diluent selector valves 130*a*-130*j*, and likewise each of the provided plurality of flow control valves 185*a*-185*j* is functionally independent with respect to all other provided flow control valves 185*a*-185*j*.

As shown in the figures, each flow control valve trim assembly 186 includes an integral valve stem assembly 187 and a poppet spring 219. As will be better understood further herein each integral valve stem assembly 187 integrates a first flow control closure element 207, a second flow control closure element 215 and a wiping seal 211, which are implemented by overmolded reciprocating sealing members 205, 213. At this juncture, the highly integrated character of otherwise separate valve components, in addition to integration of disparate valves, should be emphasized as providing easier maintainability, as well as lessening the parts count potentially in the hands of end users. Finally, it is now emphasized that each valve body 100*a*-100*j* is populated with a composite valve trim arrangement 91 including both a fully integral selector valve trim assembly 131 and a flow control valve trim assembly 186, thereby implementing both a diluent selector valve 130*a*-130*j* and a flow control valve 185*a*-185*j* within each valve body 100*a*-100*j* as a fully integral valve unit 90*a*-90*j*.

As particularly shown in FIG. 8, each valve body is 100*a*-100*j* is populated through a circular open end 121 at the bottom 118 of the valve body 100*a*-100*j*, each of which is readily accessible as necessary from the bottom 31 of handle body 10. In use, however, each composite valve trim arrangement 91 is secured in place within its respective valve body 100*a*-100*j* by a composite valve trim retaining member 245, which is preferably provided as a rigid plate 246, as shown in FIGS. 7-8. As will be better understood further herein, the composite valve trim retaining member 245 not only secures each composite valve trim arrangement 91 operably in place, but also constrains the range of movement in operation of the diluent selector valves 130*a*-130*j*, thereby greatly simplifying use of the diluent selector valves 130*a*-130*j* by end users. As will be more fully described herein, the lower enclosure member 34 of the preferably provided clamshell type housing assembly 17 covers and encases both the lowermost portions of the composite valve trim arrangement 91, and especially the diluent selector valves 130*a*-130*j*, and the composite valve trim retaining member 245 during normal use of the hand-held beverage dispenser 5 of the present invention. The lower enclosure member 34 is also cooperatively adapted with the composite valve trim retaining member 245 to implement a failsafe for the diluent selector valves 130*a*-130*j*, whereby the hand-held beverage dispenser 5 cannot be placed in normal use unless each diluent selector valve 130*a*-130*j* is in a proper, even if incorrect, operable configuration. Further still, the cooperatively adapted lower enclosure member 34 and composite valve trim retaining member 245 implement a configuration lock, whereby once the hand-held beverage dispense 5 is placed in normal use each diluent selector valve 130*a*-130*j* is restrained in the configuration selected at deployment. These and other aspects of the operation of the inventive diluent selector valves 130*a*-130*j* will be better understood in the detailed discussions to follow.

FIGS. 7-8 also show aspects of the previously discussed simple ON-OFF flow controls 20*a*-20*j* that enable end users to effortlessly hold the post-mix type drink dispenser assembly 275 steady over a beverage vessel while any of the ON-OFF flow controls 20*a*-20*j* is actuated. As also shown in the figures, a subset 21 of flow controls 20*i*-20*j* such as, for example, a subset 21 dedicated to dispensing only end-user selectable diluents, may include an alternatively shaped or otherwise configured button cap 240 to make the ON-OFF flow control 20*i*-20*j* readily distinguishable from other ON-OFF flow controls 20*a*-20*h* including a principal button cap 230. In any case, each of the ON-OFF flow controls 20*a*-20*j* is operably integrated with the flow control valve trim assembly 186 of a corresponding one of the flow control valves 185*a*-185*j*. In particular, each ON-OFF flow control 20*a*-20*j* for the exemplary implementation of the hand-held beverage dispenser 5 includes an operable integration of a corresponding button cap 230, 240, a valve stem 188 and a poppet spring 219, to form an actuator button as more fully described herein. To this end, an upper seal 225 for each valve unit 90*a*-90*j* is provided to enable fluid tight passage of the top end 190 of a valve stem 188 through the top 101 of each corresponding valve body 100*a*-100*i* from within to without the valve body 100*a*-100*j*.

FIGS. 7-8 show various details of the provision and arrangement of a post-mix type drink dispenser assembly 275, including a readily removable nozzle housing 280 as previously noted to be a feature generally expected by end users. FIGS. 7-8 also show how various connector tubes 265 and rods 266, together with a rubber or like material seal 277, may be utilized as necessary or otherwise desired for attachment in fluid communication with the through the fluid outlets 81 from the handle body 10 of a particular post-mix type drink dispenser assembly 275. Additionally, the figures show the provision of mounting holes 29 through the top 18 of the handle body 10, at its forward end 48, for receiving conventional mounting hardware 30, such as the depicted machine screws, for attachment of a mixer subassembly 276 of a utilized 275 post-mix type drink dispenser assembly 275.

The hand-held beverage dispenser 5 according to the present invention, as implements the novel piping system 65 of the present invention, is formed about and substantially within the extents of an inventive handle body 10, as is particularly shown in FIGS. 9-12. Not unlike many hand-held beverage dispensers 5 of the bar gun class, the hand-held beverage dispenser 5 according to the present invention comprises a multiplicity of fluid inlets 66, as particularly shown in FIGS. 9 and 11, a multiplicity of fluid outlets 81, as particularly shown in FIGS. 10 and 12, and plurality of flow controls 20*a*-20*j*, such as buttons or like actuators as previously discussed, for example with reference to FIGS. 1 and 7-8. As will be appreciated by those of ordinary skill in the relevant arts, the provided flow controls 20*a*-20*j* actuate various beverage fluid flows or combinations of fluid flows from the multiplicity of fluid inlets 66 to the multiplicity of fluid outlets 81, where the actuated beverage fluid flows are directed to a post-mix type drink dispenser assembly 275 for mixing together as a desired beverage product, if required, and dispensing from the hand-held beverage dispenser 5.

Figure 11:
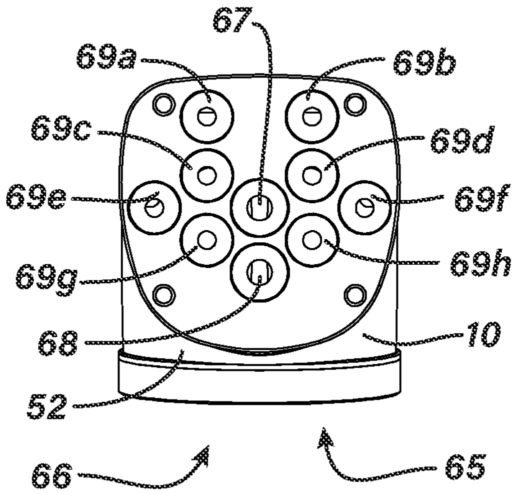
Figure 13:
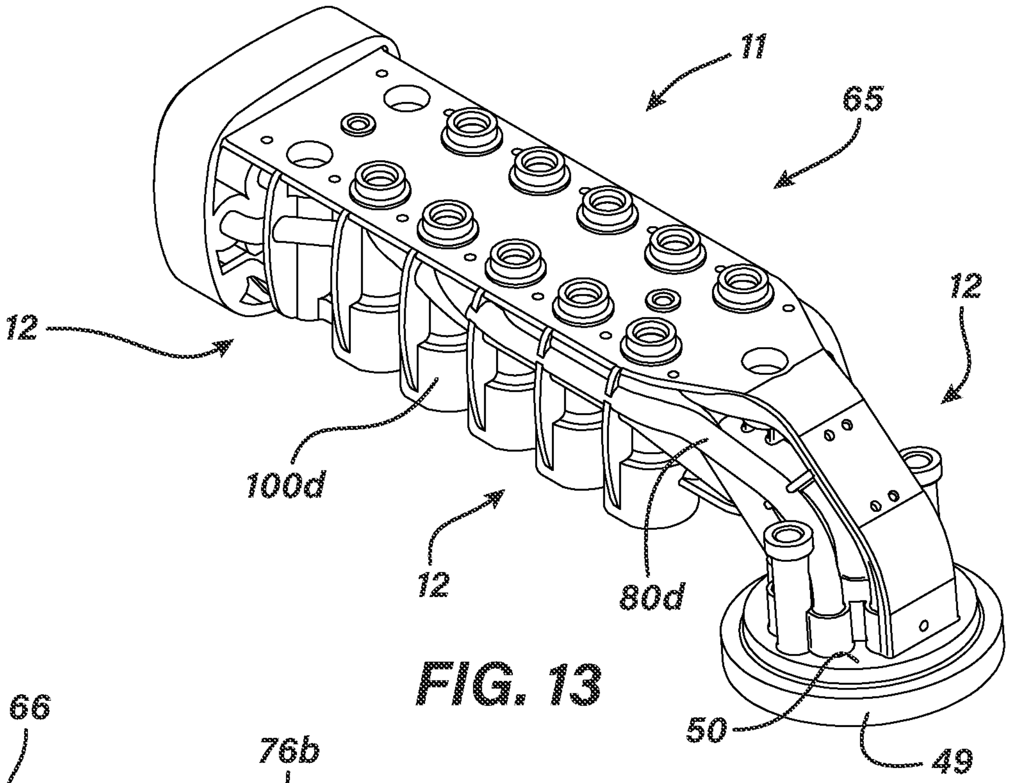
FIGS. 13-16 illustrate various aspects of a piping system of the hand-held beverage dispenser, about which the handle body is formed, where.
Figure 14:
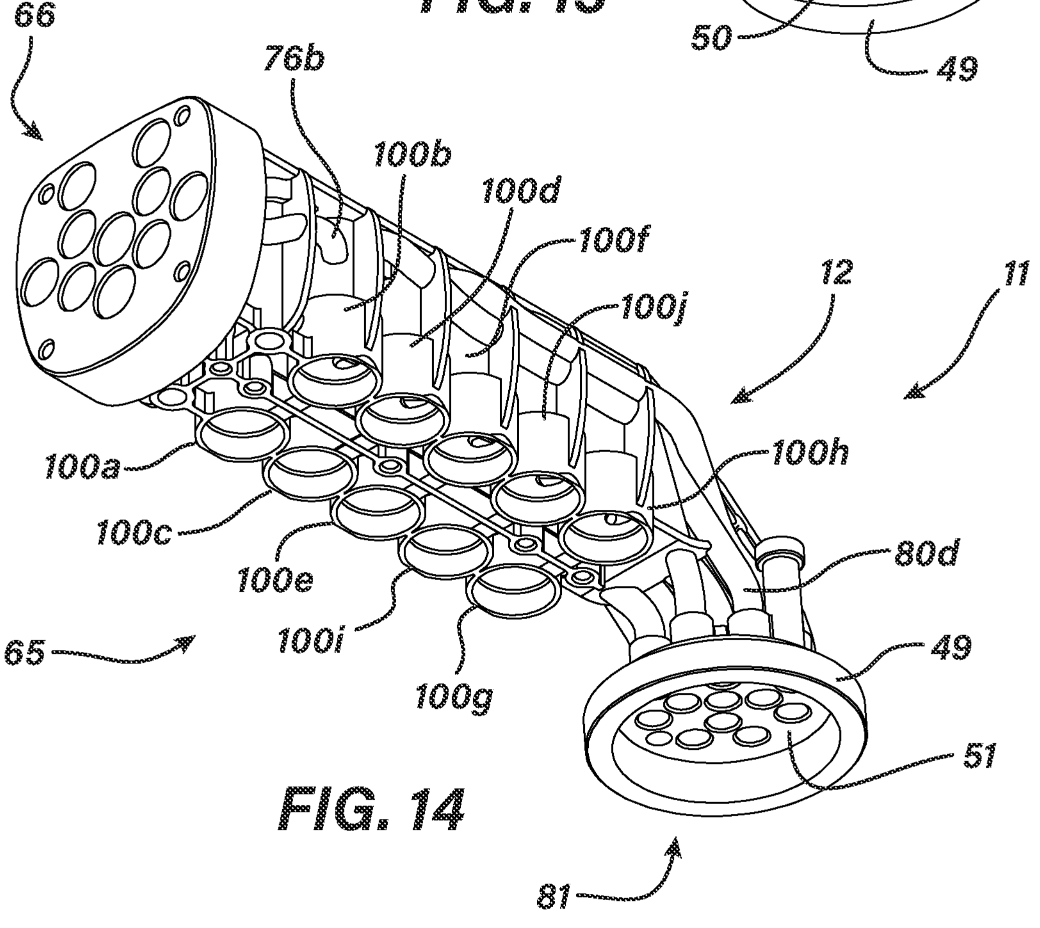
Figure 15:
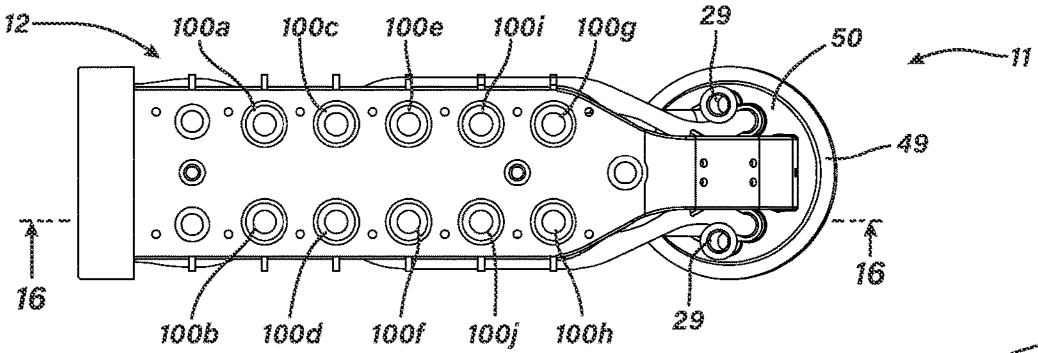

As particularly shown in FIG. 11, the multiplicity of fluid inlets 66 as provided in accordance with the depicted preferred implementation of the hand-held beverage dispenser 5 includes at least a first diluent inlet 67 and a second diluent inlet 68, and a plurality of beverage product inlets 69*a*-69*h*, there being provided one beverage product inlet for each beverage product to be dispensed. Similarly, and as particularly shown in FIG. 12, the multiplicity of fluid outlets 81 as provided in accordance with the depicted preferred implementation of the hand-held beverage dispenser 5 includes an equal plurality of beverage product outlets 83*a*-83*h* as are provided beverage product inlets 69*a*-69*h*. On the other hand, the preferred implementation of the hand-held beverage dispenser 5 of the present invention includes a single, common diluents outlet 82, as is generally conventional, although more could be provided.

In a leap forward for the relevant arts, however, the novel piping system 65 of the present invention provides various flow paths through the hand-held beverage dispenser 5 between the multiplicity of fluid inlets 66 to the piping system 65 and the multiplicity of fluid outlets 81 from the piping system 65, wherein at least some of the flow paths are selectively established. In particular and as will be better understood in the details set forth further herein, the novel piping system 65 of the present invention is adapted to enable, for each of a plurality of provided beverage products, end-user selection of any one of a plurality of provided diluents, whereafter the selected diluent is dispensed concurrently with the beverage product for which the selection has been made. To this end, and as previously discussed in the overview provided with particular reference to FIGS. 7-8, each fluid flow path through the handle body 10 of the hand-held beverage dispenser 5, as implemented according to the preferred embodiment of the present invention, runs through one of the plurality of valve bodies 100*a*-100*j*, about which a corresponding valve unit 90*a*-90*j* is implemented to include a diluent selector valve 130*a*-130*j* and a flow control valve 185*a*-185*j*.

Figure 12:
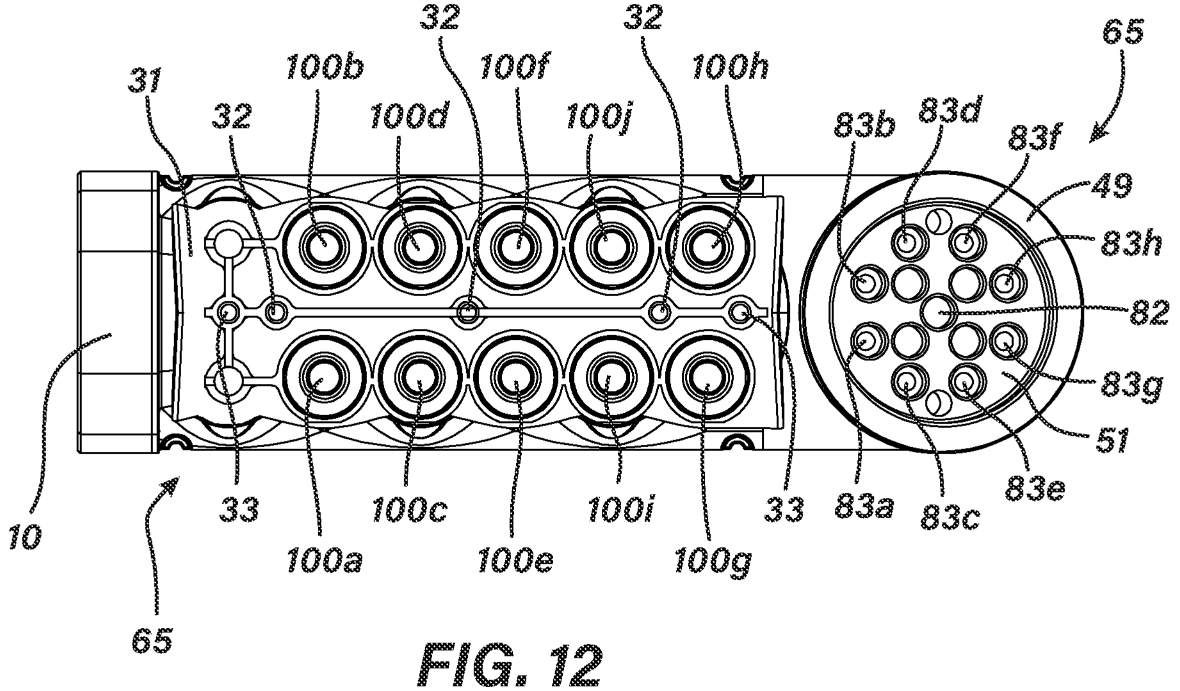
Figure 10:
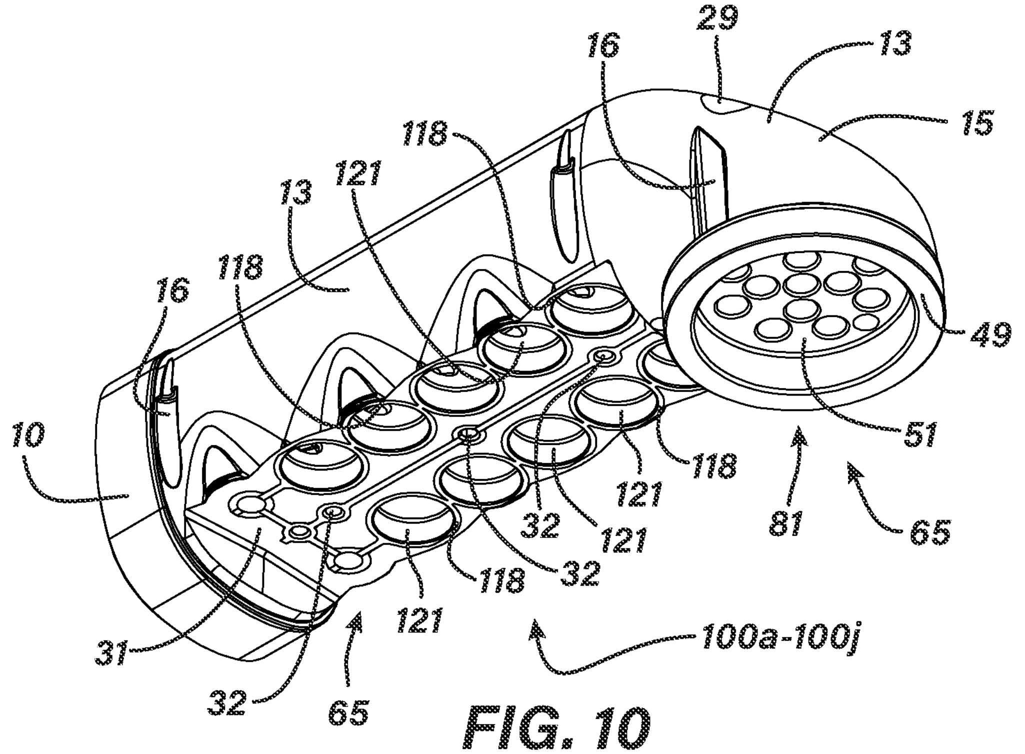

As will be better understood further herein, each diluent selector valve 130*a*-130*j* enables ad hoc selection of one of a plurality of diluents for passage through the valve unit 90*a*-90*j*, under the selective control of the correspondingly implemented flow control valve 185*a*-185*j*. As shown in FIGS. 10 and 12, each individual valve body 100*a*-100*j* comprises a circular open end 121 at the bottom 118 of the valve body 100*a*-100*j*. As shown in the figures, the bottom 118 of each valve body 100*a*-100*j* according to this exemplary implementation forms, or is formed as, a portion of the bottom 31 of handle body 10. As previously discussed in the overview provided with particular reference to FIGS. 7-8, the circular open end 121 at the bottom 118 of the valve body 100*a*-100*j* provides access to the corresponding composite valve trim arrangement 91, whereby each diluent selector valve 130*a*-130*j* may be operated to effect an ad hoc selection of one of a plurality of diluents for passage through the valve unit 90*a*-90*j*.

While each diluent selector valve 130*a*-130*j* may be operated to effect an ad hoc selection of one of a plurality of diluents for passage through the valve unit 90*a*-90*j*, passage through the valve unit 90*a*-90*j* of the selected diluent is under the selective control of the correspondingly implemented flow control valve 185*a*-185*j*, as previously noted. To this end, and as is particularly shown in FIG. 9, a preferably cylindrical flow control valve actuator orifice 102 is formed at the top 101 of each valve body 100*a*-100*j*, a portion of each of which is particularly shown in FIG. 9 at the top 18 of handle body 10. As will be better understood further herein, the top end 190 of the generally cylindrical valve stems 188 about which is formed each flow control valve trim assembly 186 of the flow control valves 185*a*-185*j*, as also shown in overview FIGS. 7-8, protrudes through the respective cylindrical flow control valve actuator orifice 102. As also will be better understood further herein, each of the plurality of ON-OFF flow controls 20*a*-20*j*, as shown in FIGS. 1-3, is operated through a button cap 230, 240 preferably removably attached to the top end 190 of each generally cylindrical valve stem 188 for user actuation of the corresponding one of the flow control valves 185*a*-185*j*. As will be better understood further herein, actuation of a flow control valve 185*a*-185*j* operates to effect passage through the valve unit 90*a*-90*j* of the selected diluent, and, in the general case of there being a beverage product also introduced to the valve unit 90*a*-90*j*, actuation of the flow control valve 185*a*-185*j* also operates to effect concurrent passage through the valve unit 90*a*-90*j* of the introduced beverage product.

Figure 9:
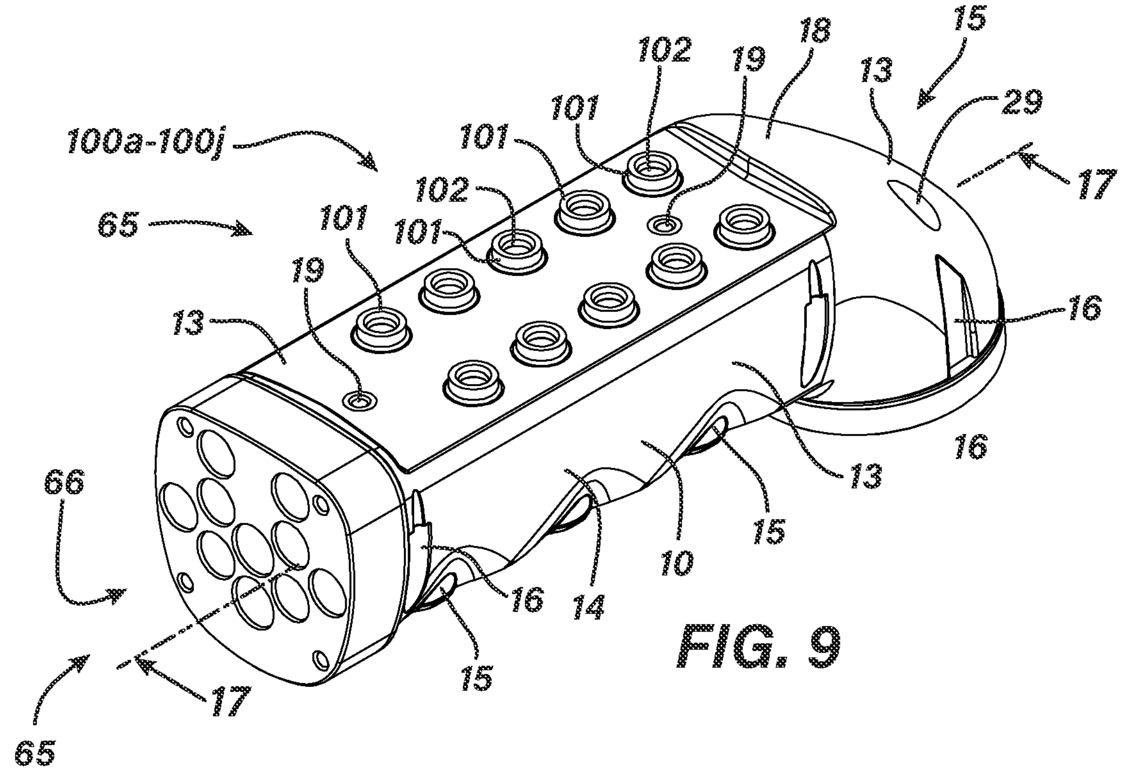
FIGS. 9-12 illustrate various aspects of a handle body of the hand-held beverage dispenser, where.

FIGS. 9-12 show various features of the handle body 10 particularly directed to external aspects of the hand-held beverage dispenser 5 of the present invention. As shown in FIG. 9, a plurality of threaded holes 19 for removably affixing the upper enclosure member 22 of the clamshell type housing assembly 17, as variously shown in FIGS. 1-8, to the top 18 of the handle body 10 are provided in the top 18 of the handle body 10. As is conventional in the art, the provided threaded holes 19 are cooperatively adapted to removably receive conventional mounting hardware 28 such as screws, as shown in FIGS. 7-8. FIGS. 10 and 12 similarly show a plurality of threaded holes 33 for removably affixing the lower enclosure member 34 of the clamshell type housing assembly 17, as variously shown in FIGS. 1-8, to the bottom 31 of handle body 10, and also a plurality of threaded holes 32 for removably affixing the composite valve trim retaining member 245, as shown in FIGS. 7-8, to the bottom 31 of handle body 10. As is conventional in the art, the provided threaded holes 33 for affixing the lower enclosure member 34 are cooperatively adapted to removably receive conventional mounting hardware 44 such as screws, as shown in FIGS. 7-8, and the provided threaded holes 32 for removably affixing the composite valve trim retaining member 245 are conventionally cooperatively adapted to removably receive conventional mounting hardware 254 such as screws, as also shown in FIGS. 7-8.

FIGS. 9-10 also particularly depict aspects of the handle body 10 provided by an overmold 13, which as will be better understood further herein generally implements the relatively-soft-body features 14 of the handle body 10 beyond the novel piping system 65 of the present invention. The overmold 13 thus provides much of the general form of the handle body 10. For example, the overmold 13 implements both functional and aesthetic features such as the contoured surfaces 15 which go beyond aesthetics to provide ergonomic shapes, as well as conforming support for the upper and lower enclosure members 22, 34 of the clamshell type housing assembly 17. The overmold 13 also implements provisions such as channels 16 particularly adapted to accommodate such features as snap fit joints molded or otherwise provided in connection with the clamshell type housing assembly 17. Finally, the provision of the overmold 13 is particularly suited to filling the internal interstices 12, voids and other like spaces in and about a structural framework 11, which preferably implements the internally embodied aspects of the piping system 65 of the present invention and is more fully described herein with particular reference to FIGS. 13-17.

As described in the broad overview with reference to FIGS. 7-8, the preferred embodiment of the hand-held beverage dispenser 5 includes many fluid conduits and like passages of a piping system 65 generally provided within the extents of the handle body 10 of the hand-held beverage dispenser 5. As discussed in overview, the provided fluid conduits and like passages of the piping system 65 establish numerous fluid flow paths within the extents of the handle body 10, each of which runs through the handle body 10 from one of a multiplicity of fluid inlets 66 to one of the multiplicity of fluid outlets 81. As further noted in the overview, the piping system 65 of the hand-held beverage dispenser 5 further includes a plurality of valve bodies 100*a*-100*j* within the extents of the handle body 10, and, importantly, each of the identified fluid flow paths running through the handle body 10 runs from one of the multiplicity of fluid inlets 66 to one of the plurality of valve bodies 100*a*-100*j*, and then from the corresponding one of the valve bodies 100*a*-100*j* to a corresponding one of the multiplicity of fluid outlets 81, the valve bodies 100*a*-100*j* being integral components of the piping system 65. In the most preferred embodiment of the hand-held beverage dispenser 5, the portions of the provided fluid conduits and like passages of the piping system 65 terminating at a fluid outlet 81 are collected together at the top side 50 of a preferably unitarily formed toe plate 49 of the handle body 10. As particularly shown in FIGS. 13-17, the toe plate 49 is generally formed or otherwise provided at the bottom 31 of the handle body 10 in a location adjacent the forward 48 end of the handle body 10. In accordance with this most preferred implementation, each fluid outlet 81 of the piping system 65 of the hand-held beverage dispenser 5 is arranged about the bottom side 51 of the toe plate 49 of the handle body 10, as particularly shown in FIGS. 12 and 14.

As shown and described with reference to FIGS. 9-12, the multiplicity of fluid inlets 66 includes at least a first diluent inlet 67 and a second diluent inlet 68, and a plurality of beverage product inlets 69*a*-69*h*. As previously noted, one beverage product inlet 69*a*-69*h* is provided for each beverage product that a particular implementation of the hand-held beverage dispenser 5 is capable of dispensing. As also shown and described with reference to FIGS. 9-12, the multiplicity of fluid outlets 81 includes an equal plurality of beverage product outlets 83*a*-83*h* as are provided beverage product inlets 69*a*-69*h*, and most preferably a single, common diluents outlet 82. FIGS. 9-12 also show parts of the valve bodies 100*a*-100*j*, thereby clearly showing at least the preferred arrangement and placement of the valve bodies 100*a*-100*j* within the hand-held beverage dispenser 5. Finally, the discussion of FIGS. 9-12 also notes that the preferred embodiment of the hand-held beverage dispenser 5 of the present invention implements the handle body 10 as an overmold 13 applied to a structural framework 11 for the handle body 10.

Referring now to FIGS. 13-16 in particular, the structural framework 11 for the handle body 10 according to the preferred implementation contemplates additively manufacturing the structural framework 11 from stainless steel or like material. Advantageously, Applicant has found this method of making the handle body 10 is particularly suited to manufacturing at least a large part of the necessary structural framework 11 in the forms of the fluid conduits and passages themselves. Utilization of the fluid conduits and passages of the piping system 65 for formation of the structural framework 11 also greatly facilitates providing the piping system 65 of the present invention substantially within the extents of the described handle body 10 of the hand-held beverage dispenser 5.

Figure 17:
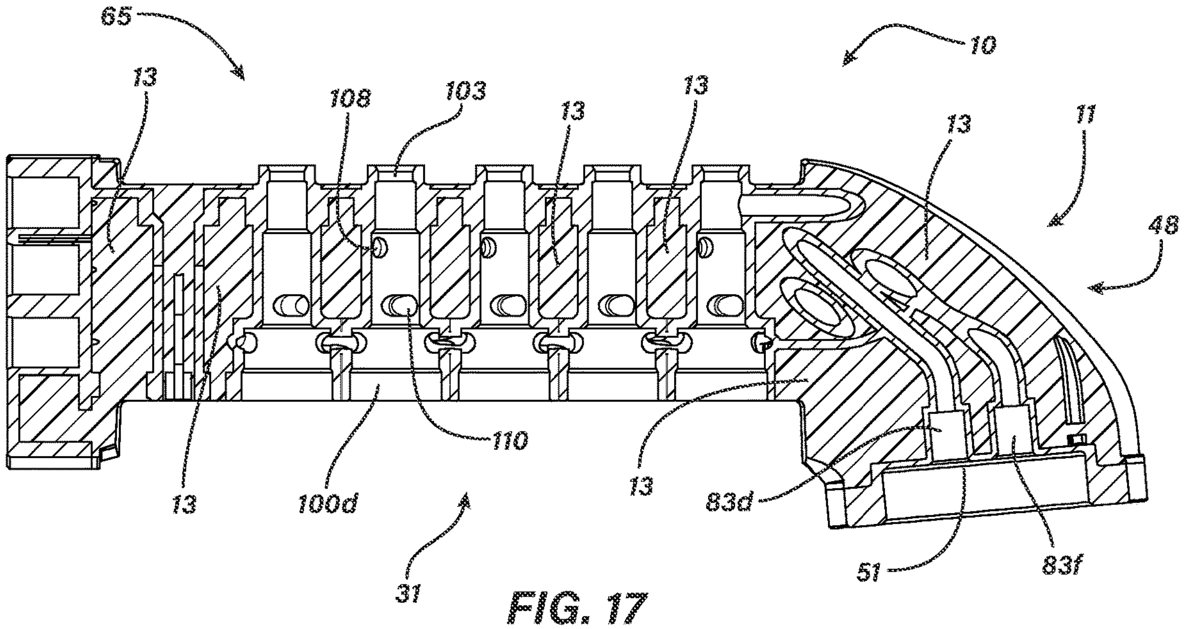
FIG. 17 is a cross-sectional elevational view taken along lines 17-17 of FIG. 9 illustrating various aspects of the formation of the handle body.

As particularly shown in FIGS. 13-16, each of the multiplicity of fluid inlets 66 is placed in fluid communication with a corresponding one of the provided valve bodies 100*a*-100*j* through a connecting one of various fluid conduits and like passages to the corresponding one of the provided valve bodies 100*a*-100*j*. Likewise, each of the multiplicity of fluid outlets 81 is shown to be placed in fluid communication with a corresponding one of the provided valve bodies 100*a*-100*j* through a connecting one of other various fluid conduits and like passages from the corresponding one of the provided valve bodies 100*a*-100*j*. FIG. 17, on the other hand, shows the handle body 10 of the hand-held beverage dispenser 5 in a cross-sectional view generally corresponding to the view of FIG. 16, but with the overmold 13 applied. As particularly shown in FIG. 17, especially as compared to FIG. 16, the overmold 13 most preferably fills substantially all of the internal interstices 12, voids and other like spaces in and about the fluid conduits and passages of the piping system 65 providing fluid communication between the valve bodies 100*a*-100*j* and corresponding fluid inlets 66 and fluid outlets 81.

The views of FIGS. 13-17 are meant to exemplify such physical embodiments as may implement the necessary fluid communications within the extents of the handle body 10 of the piping system 65. Accordingly, only a limited selection of the fluid conduits and like passages is identified in FIGS. 13-16 in order to preserve clarity. However, all of the fluid conduits and like passages provided according to this exemplary implementation are fully described in the discussions to follow, and particularly in the various descriptions with reference to the schematic piping diagrams of FIGS. 29 and 30A-30D. Prior to setting forth these fluid communications in detail, however, additional details of the valve bodies 100*a*-100*j*, and in particular details of the various inlet and outlet ports to and from the valve bodies 100*a*-100*j*, are shown and described with reference to FIGS. 20-28. As an aid in these further descriptions of the valve units 90*a*-90*j*, an exemplary one valve unit 90*d* is selected as generally representative of each of the valve units 90*a*-90*j*, and the component parts thereof, including an exemplary one valve body 100*d*. To this end, FIGS. 18-19 show the heretofore described exemplary handle body 10, wherein the exemplary one valve body 100*d* of the representative exemplary one valve unit 90*d* is depicted with its composite valve trim arrangement 91 shown as substantially assembled operatively in place within the valve body 100*d*, thereby identifying and illustrating various features of the representative one valve unit 90*d* as in an operable configuration.

As noted in the overview discussions of FIGS. 7-8, the composite valve trim arrangement 91 for each of the valve bodies 100*a*-100*j* includes a fully integral selector valve trim assembly 131 for implementation of the diluent selector valves 130*a*-130*j*, and a flow control valve trim assembly 186 for implementation of the flow control valves 185*a*-185*j*. Each fully integral selector valve trim assembly 131 is described as including an open-topped cup 166, and each flow control valve trim assembly 186 is described as including an integral valve stem assembly 187 and a poppet spring 219. Finally, an ON-OFF flow control 20*a*-20*j* for each valve unit 90*a*-90*j* is described as being operable through a button cap 230, 240 attached to the top end 190 of a valve stem 188 of the flow control valve trim assembly 186 of a corresponding flow control valve 185*a*-185*j*, wherefore an upper seal 225 for each valve unit 90*a*-90*j* is provided.

Figure 18:
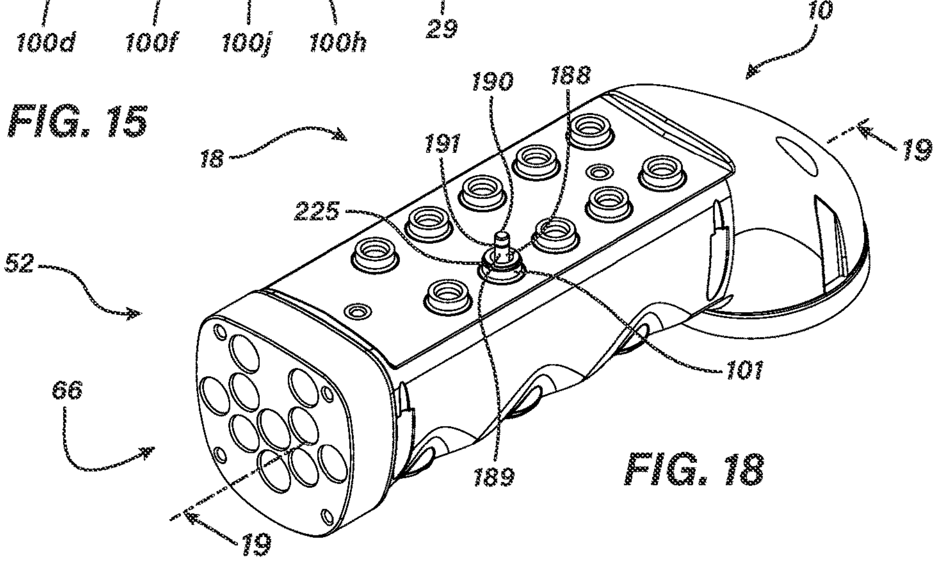
FIGS. 18-19 illustrate various aspects of a representative one valve unit of the piping system of the hand-held beverage dispenser, where.
Figure 16:
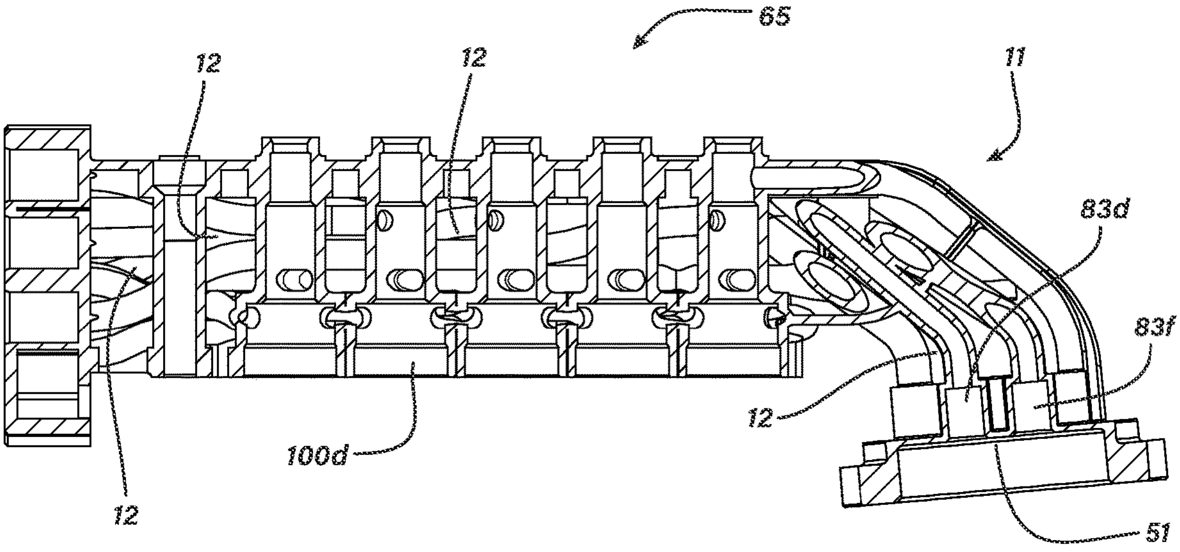
Figure 19:
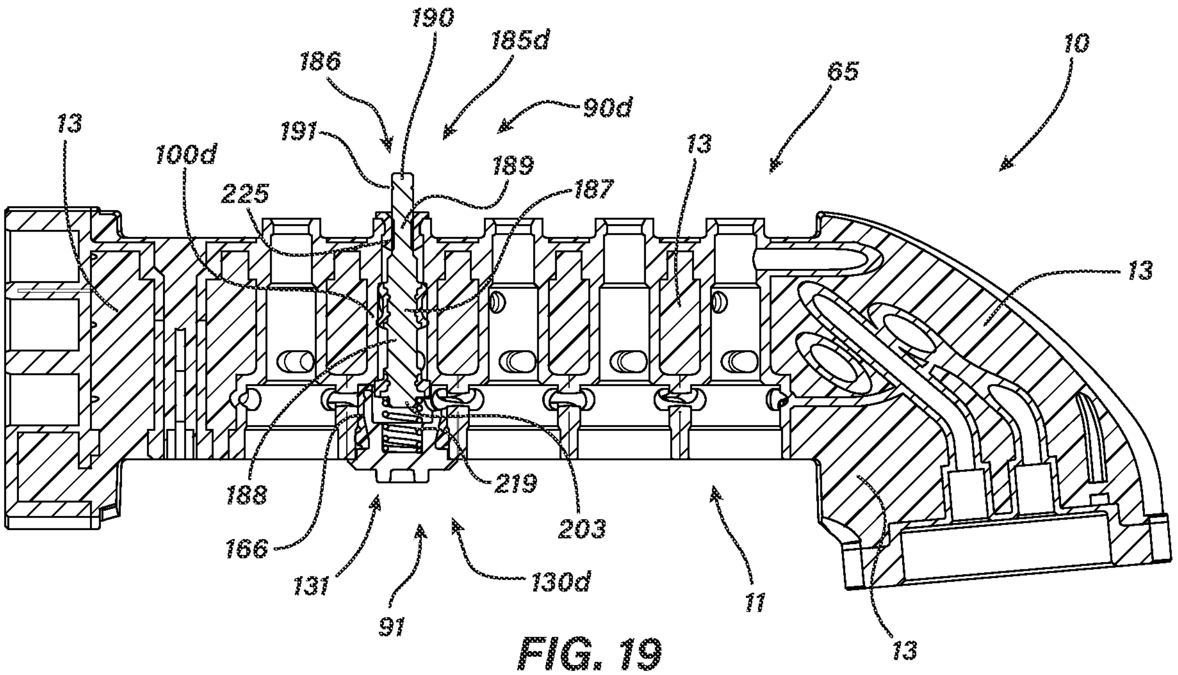
Figure 20:
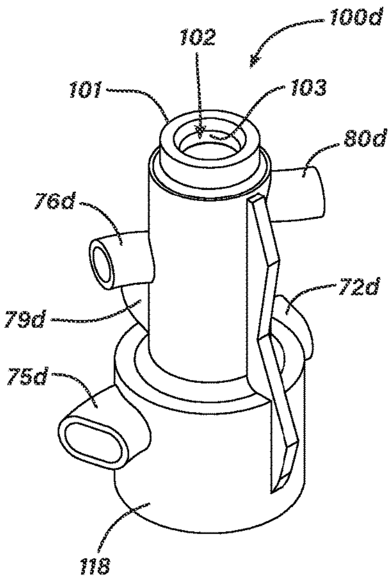
FIGS. 20-28 are partially cut away views illustrating various aspects of a representative one valve body, corresponding to the representative one valve unit, of the piping system of the hand-held beverage dispenser, where.
Figure 21:
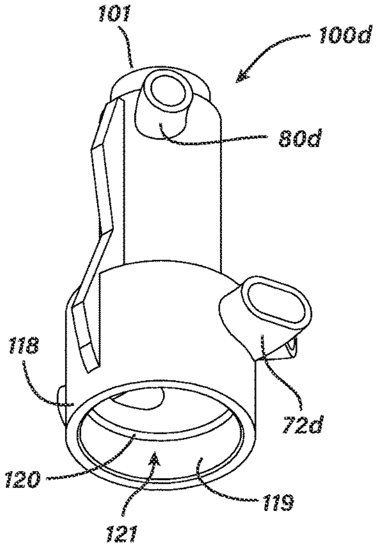
Figure 22:
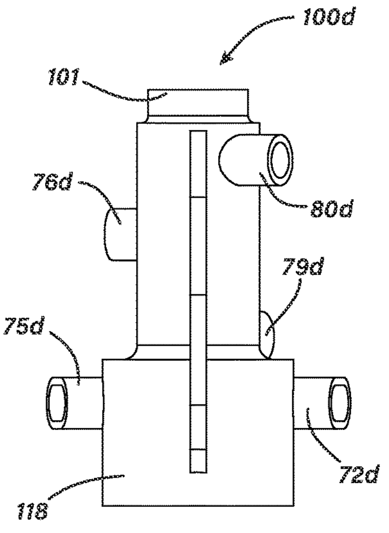

FIGS. 18-19 illustrate the provision of a composite valve trim arrangement 91 for the representative valve body 100*d*, in implementation of the representative valve unit 90*d* comprising a representative diluent selector valve 130*d* and a representative flow control valve 185*d*. As particularly shown in FIG. 19, an open-topped cup 166 is cooperatively arranged, within the representative valve body 100*d*, with an integral valve stem assembly 187 and a poppet spring 219. In accordance with the previously discussed inventive cooperative arrangement of the diluent selector valve 130*d* for the flow control valve 185*d*, it is now particularly noted that the poppet spring 219 and a bottom end 203 of the integral valve stem assembly 187 are arranged within an interior portion of the open-topped cup 166. Finally, as shown in FIGS. 18-19, an upper portion 189 of the valve stem 188 passes through the upper seal 225 of the valve unit 90*d*, where, as will be better understood further herein, a user interface for the corresponding flow control 20*d*, such as a button, may be operatively attached at the top end 190 of the upper portion 189 of the valve stem 188 for selective actuation of the implemented flow control valve 185*d*.

As will be better understood further herein, the integral valve stem assembly 187 and poppet spring 219, as implement the flow control valve trim assembly 186, operate longitudinally within the interior space of the open-topped cup 166, without interference with or by any operation or lack thereof of the implemented diluent selector valve 130*d*. Likewise, and as also will be better understood further herein, the open-topped cup 166, as implements the fully integral selector valve trim assembly 131, operates rotationally about the flow control valve trim assembly 186, without interference with or by any operation or lack thereof of the implemented flow control valve 185*d*. As a result, the implemented diluent selector valve 130*d* and the implemented flow control valve 185*d* are each both distinct and functionally independent with respect to the other, notwithstanding the extensive cooperative adaptation therebetween.

Turning then to FIGS. 20-28, partially cut away views of the representative exemplary valve body 100*d* illustrate various aspects of the representative one valve body 100*d* as viewed with virtually all other aspects of the handle body 10 cut away, thereby providing maximum visibility of the various features of the valve body 100*d*, as though the valve body 100*d* and only the immediately adjacent features of the handle body 10 are completely removed from the remainder of the hand-held beverage dispenser 5. It is noted, however, that the representative valve body 100*d* is utilized in further views and discussions to illustrate and describe aspects of the present invention in relation to a representative exemplary valve unit 90*d* formed about and including the representative valve body 100*d*.

FIGS. 20-28 show the representative exemplary valve body 100*d* comprising a generally axially symmetric body having a preferably cylindrical flow control valve actuator orifice 102 at the top 101 and a circular open end 121 at the bottom 118. As particularly shown in FIGS. 20, 23 and 26-27, an annulus 103 is formed or otherwise provided at the base of the flow control valve actuator orifice 102, and is sized, configured or otherwise adapted to retain the upper seal 225 for the implemented valve unit 90*d* in place. As particularly shown in FIGS. 21 and 26-27, the circular open end 121 at the bottom 118 of the valve body 100*d*, exposes a cylindrical socket 119. The provided cylindrical socket 119 is sized, configured or otherwise adapted for receiving a lower seal 172 of the valve unit 90*d*, which as will be understood further herein is implemented as part of a plug 171 formed integrally with the selector valve trim assembly 131 of an implemented diluent selector valve 130*d*. At this juncture, however, it is noted that the circular open end 121 most preferably comprises a chamfered or similarly relieved edge 122 to prevent damage to the lower seal 172, and the cylindrical socket 119 most preferably comprises a beveled or similarly relieved edge 120 to prevent damage to a cylindrical valve gate 167 of the diluent selector valve 130*d*, as more fully described herein.

Figure 26:
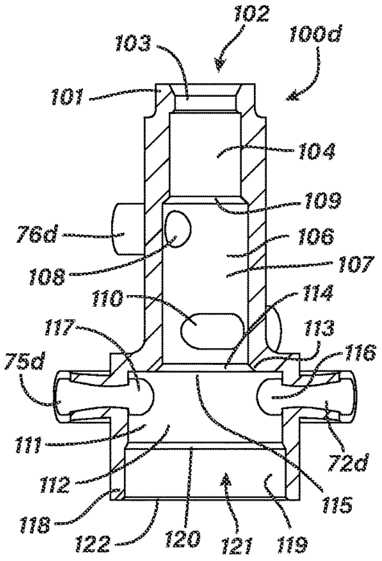
Figure 27:
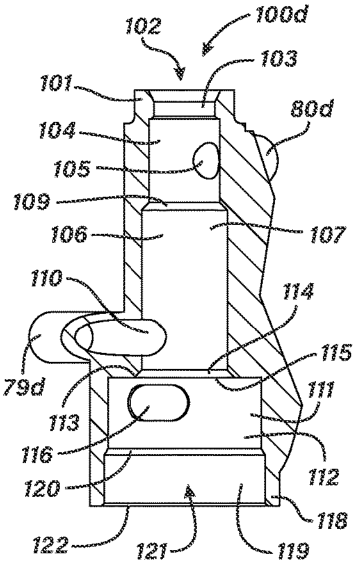
Figure 28:
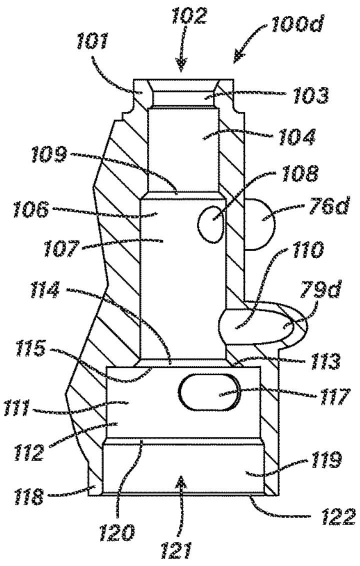

As particularly illustrated in FIGS. 26-28, the valve body 100*d* is preferably formed as a set of axially aligned, stacked cylinders with transitions therebetween, and wherein the interior structures are generally axially symmetric. In the exemplary implementation of the valve body 100*d* according to the present invention, the stacked cylinders increase in diameter from top to bottom. As will be better understood further herein, this arrangement facilitates receiving the entirety of the composite valve trim arrangement 91 through the circular open end 121 at the bottom 118 of the valve body 100*d* in population thereof. As particularly shown in FIGS. 26-28, an upper chamber 104 of the valve body 100*d* is formed or otherwise provided below the cylindrical flow control valve actuator orifice 102 at the top 101 of the valve body 100*d*, an intermediate chamber 106 of the valve body 100*d* is formed or otherwise provided below the upper chamber 104, and a lower chamber 111 of the valve body 100*d* is formed or otherwise provided below the intermediate chamber 106 and above the previously discussed cylindrical socket 119.

As shown in the figures, a beverage product outlet port 105 is formed or otherwise provided through the side wall of the upper chamber 104, and a beverage product inlet port 108 is formed or otherwise provided through and adjacent the top of the cylindrical interior wall 107 about the intermediate chamber 106. The beverage product outlet port 105 is in direct fluid communication through a beverage product dispensing conduit 80*d* with the corresponding beverage product outlet 83*d* on the bottom side 51 of the toe plate 49 of the handle body 10. Similarly, the beverage product inlet port 108 is in direct fluid communication, through a beverage product supply conduit 76*d*, with the corresponding beverage product inlet 69*d* at the rear end 52 of the handle body 10.

A diluent outlet port 110 is formed or otherwise provided through the cylindrical interior wall 107 in the lower portion of the intermediate chamber 106. The diluent outlet port 110 is in fluid communication through a valve dispense branch 79*d* with a common trunk 78 of a common diluents outlet manifold 77. The common trunk 78 of the common diluents outlet manifold 77 is, in turn, in fluid communication with the single, common diluents outlet 82 at the bottom side 51 of the toe plate 49 of the handle body 10. As will be better understood further herein, the common trunk 78 of the implemented common diluents outlet manifold 77 provides fluid communication for every diluent dispensed from the exemplary hand-held beverage dispenser 5.

A first diluent inlet port 116 and a second diluent inlet port 117 are each formed or otherwise provided through and adjacent the top of the cylindrical interior wall 112 about the lower chamber 111 of the valve body 100*d*. As is well known to those of ordinary skill in the relevant arts post-mix diluents are typically mixed with post-mix beverage products in ratios on the order of five to one. In order to adequately sustain the substantially greater relative fluid flow rate of diluents into the valve body 100*d* without compromising the compact character achieved for the valve unit 90*d* notwithstanding implementation of new functionality, each diluent inlet port 116, 117 is preferably formed or otherwise provided in a horizontally oriented obround or like shape.

The first diluent inlet port 116 is in fluid communication through a valve supply branch 72*d* with a common trunk 71 of a first diluent inlet manifold 70. The common trunk 71 of the first diluent inlet manifold 70 is in turn in fluid communication with the first diluent inlet 67 at the rear end 52 of the handle body 10. As will be better understood further herein, the common trunk 71 of the first diluent inlet manifold 70 provides fluid communication to each valve unit 90*a*-90*j* for any diluent admitted into the hand-held beverage dispenser 5 through the first diluent inlet 67. Similarly, the second diluent inlet port 117 is in fluid communication through a valve supply branch 75*d* with a common trunk 74 of a second diluent inlet manifold 73. The common trunk 74 of the second diluent inlet manifold 73 is in turn in fluid communication with the second diluent inlet 68 at the rear end 52 of the handle body 10. As also will be better understood further herein, the common trunk 74 of the second diluent inlet manifold 73 provides fluid communication to each valve unit 90*a*-90*j* for any diluent admitted into the hand-held beverage dispenser 5 through the second diluent inlet 68.

The upper chamber 104 of the valve body 100*d*, as particularly illustrated in FIGS. 26-28, is formed or otherwise provided having an internal diameter sufficient to accommodate and permit a desired fluid flow about the upper portion 189 of the valve stem 188 of the representative flow control valve 185*d*, as shown in FIG. 19 and more fully described herein. The cylindrical interior wall 107 about the intermediate chamber 106 and the cylindrical interior wall 112 about the lower chamber 111, however, each implement or otherwise constrain operating features of the flow control valve 185*d* and the diluent selector valve 130*d*, respectively, in implementation of the operable valve unit 90*d*. As such, the diameter of the cylindrical interior wall 107 about the intermediate chamber 106 and the diameter of the cylindrical interior wall 112 about the lower chamber 111 must, like other features of the intermediate chamber 106 and the lower chamber 111, be specified or otherwise implemented consistent with other requirements of the implemented flow control valve 185*d* and diluent selector valve 130*d*.

The cylindrical interior wall 107 about the intermediate chamber 106 defines a first valve body working segment of the valve unit 90*d* that is particularly formed, configured or otherwise adapted for the flow control valve 185*d*. In particular, a first flow control closure element 207 operates within the first valve body working segment to control fluid flow, or communication, through an internal beverage product passage of the valve body 100*d* running between the beverage product inlet port 108 and the beverage product outlet port 105. In the exemplary implementation as will be better understood further herein, the internal diameter of the cylindrical interior wall 107 about the intermediate chamber 106 of the valve body 100*d* is formed or otherwise provided having a first working diameter for the valve unit 90*d* that is greater than the diameter of the upper chamber 104 of the valve body 100*d*. Additionally, however, the transition, or step, between the intermediate chamber 106 and the upper chamber 104 of the valve body 100*d* implements an upper valve seat 109 of the valve body 100*d*, which is also particularly formed, configured or otherwise adapted as a feature of the implemented the flow control valve 185*d*, as more fully described herein. As best shown in FIGS. 26-28, the upper valve seat 109 is readily formed as a circumferential bevel between the cylindrical interior wall 107 about the intermediate chamber 106 of the valve body 100*d* and the side wall of the upper chamber 104 of the valve body 100*d*.

The cylindrical interior wall 112 about the lower chamber 111, on the other hand, defines a second valve body working segment of the valve unit 90*d* that is particularly formed, configured or otherwise adapted for the diluent selector valve 130*d*. In particular, a passage selection closure element 174 operates within the second valve body working segment to selectively enable fluid flow, or communication, through an exclusive one of at least a first internal diluent passage of the valve body 100*d* and a second internal diluent passage of the valve body 100*d*. The first internal diluent passage of the valve body 100*d* runs between the first diluent inlet port 116 and the diluent outlet port 110 of the valve body 100*d*, and the second internal diluent passage of the valve body 100*d* runs between the second diluent inlet port 117 and the diluent outlet port 110 of the valve body 100*d*. In the exemplary implementation, as will be better understood further herein, the internal diameter of the cylindrical interior wall 112 defining the lower chamber 111 of the valve body 100*d* is formed or otherwise provided having a second working diameter for the valve unit 90*d* that is substantially greater than the first working diameter for the valve unit 90*d* defining the first valve body working segment of the valve unit 90*d*.

Like the transition between the intermediate chamber 106 and the upper chamber 104 of the valve body 100*d*, the transition, or step, between the lower chamber 111 and the intermediate chamber 106 of the valve body 100*d* implements a lower valve seat 115 of the valve body 100*d*, which is particularly formed, configured or otherwise adapted as a feature of the implemented the flow control valve 185*d*, as more fully described herein. Still further, however, the transition, or step, between the lower chamber 111 and the intermediate chamber 106 of the valve body 100*d* implements a shoulder 113 between the lower chamber 111 and the intermediate chamber 106 that is particularly formed, configured or otherwise adapted as a feature of the implemented diluent selector valve 130*d*, as more fully described herein. As best shown in FIGS. 26-28, the lower valve seat 115 for the flow control valve 185*d* is readily formed as a circumferential chamfer about the inside edge 114 of the shoulder 113, as implemented for the diluent selector valve 130*d*.

With the foregoing details of the representative one valve body 100*d* in hand, including in particular details of the various inlet and outlet ports into and out of the representative one valve body 100*d*, as well as details of the various fluid conduits and like passages of the piping system 65 that place the various inlet and outlet ports of the valve body 100*d* in fluid communication with corresponding ones of the multiplicity of fluid inlets 66 provided at the rear end 52 of the handle body 10 and with corresponding ones of the multiplicity of fluid outlets 81 on the bottom side 51 of the toe plate 49 of the handle body 10, details of the various flow paths and relationships embodied by the piping system 65 of hand-held beverage dispenser 5 as previously described with particular reference to aspects of the representative one valve body 100*d* are now extrapolated more fully to each valve body 100*a*-100*j*, as applicable, thereby doubly ensuring clarity in the detailed descriptions to follow.

As particularly shown in FIGS. 29 and 30A-30D, the hand-held beverage dispenser 5 comprises a set of manifolds for efficiently providing fluid communication of diluents into and out of each valve body 100*a*-100*j*. As schematically shown in the figures, a first diluent inlet manifold 70 comprises a common trunk 71 between the first diluent inlet 67 and a plurality of valve supply branches 72*a*-72*j*, each valve supply branch 72*a*-72*j* corresponding to one of the valve bodies 100*a*-100*j*. Similarly, a provided second diluent inlet manifold 73 comprises a common trunk 74 between the second diluent inlet 68 and a plurality of valve supply branches 75*a*-75*j*, each valve supply branch 75*a*-75*j* corresponding to one of the valve bodies 100*a*-100*j*. Still further, a common diluents outlet manifold 77 comprises a common trunk 78 between a plurality of valve dispense branches 79*a*-79*j*, each valve dispense branch 79*a*-79*j* corresponding to one of the valve bodies 100*a*-100*j*, and the single, common diluents outlet 82. Dedicated beverage product supply conduits 76*a*-76*h* and beverage product dispensing conduits 80*a*-80*h*, however, are respectively provided to and from each corresponding valve body 100*a*-100*h*. As previously discussed, a diluent selector valve 130*a*-130*j* and a functionally independent and distinct flow control valve 185*a*-185*j* are cooperatively implemented, as a valve unit 90*a*-90*j*, about each corresponding valve body 100*a*-100*j*.

Figure 29:
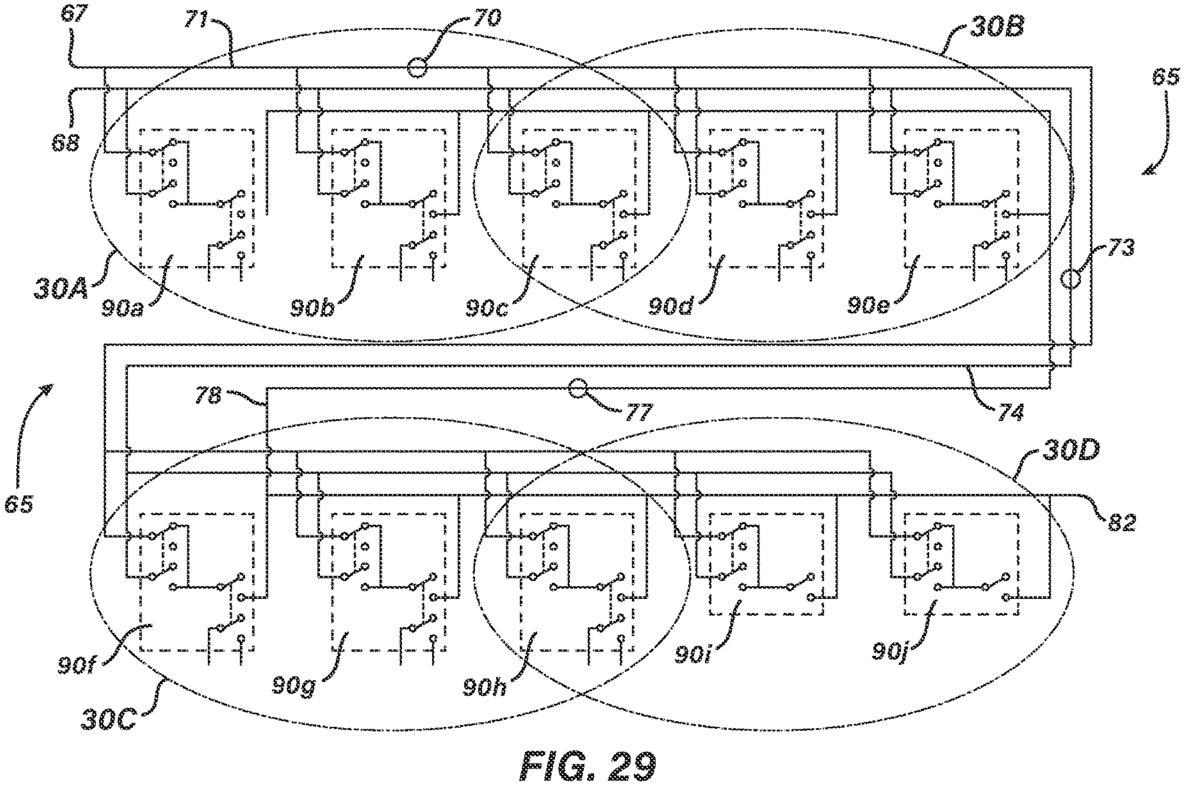
FIG. 29 is a schematic piping diagram illustrating the piping system of the hand-held beverage dispenser.
Figure 30A:
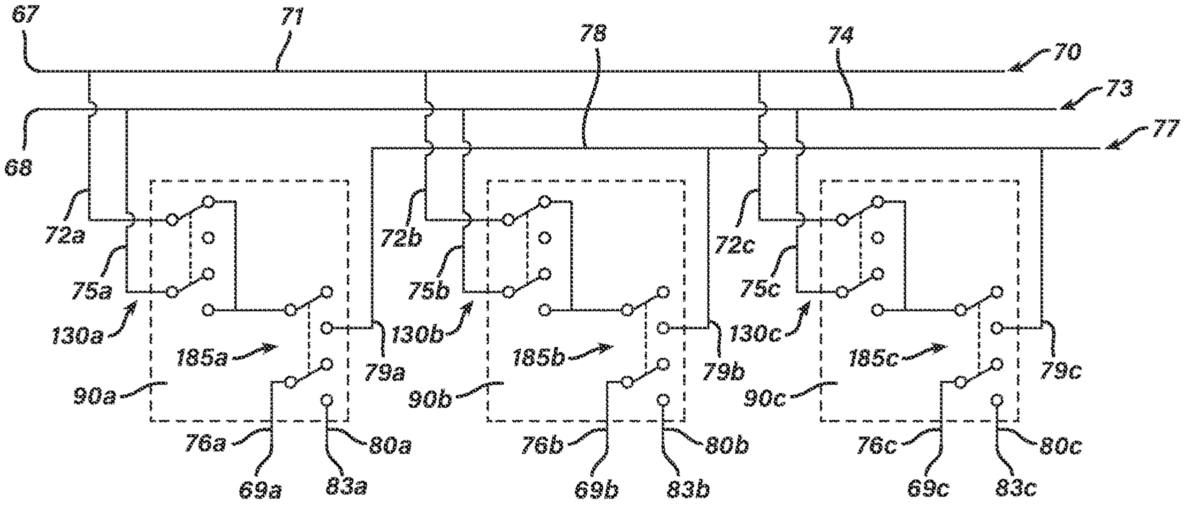
FIGS. 30A-30D illustrate various aspects of the valve units of the piping system of the hand-held beverage dispenser, where.

Referring particularly now to FIGS. 29 and 30A, and with reference to FIGS. 20-28 as necessary, a dedicated beverage product supply conduit 76*a* is provided between beverage product inlet 69*a* and beverage product inlet port 108 of corresponding valve body 100*a* for conveying a supplied beverage product from beverage product inlet 69*a* to valve body 100*a*. A dedicated beverage product dispensing conduit 80*a* is provided between beverage product outlet port 105 of valve body 100*a* and corresponding beverage product outlet 83*a* for selectively conveying the beverage product supplied through beverage product inlet port 108 of valve body 100*a* from valve body 100*a* and to beverage product outlet 83*a*, the selective conveyance being effected by operation of flow control valve 185*a*. A valve supply branch 72*a* is provided between common trunk 71 and first diluent inlet port 116 of corresponding valve body 100*a* for conveying a diluent supplied to common trunk 71 through first diluent inlet 67 from common trunk 71 to valve body 100*a*. A valve supply branch 75*a* is provided between common trunk 74 and second diluent inlet port 117 of corresponding valve body 100*a* for conveying a diluent supplied to common trunk 74 through second diluent inlet 68 from common trunk 74 to valve body 100*a*. A valve dispense branch 79*a* is provided between diluent outlet port 110 of corresponding valve body 100*a* and common trunk 78 for selectively conveying a separately selected one of either the diluent supplied through first diluent inlet port 116 of valve body 100*a* or the diluent supplied through second diluent inlet port 117 of valve body 100*a* from valve body 100*a* to common diluents outlet 82. The selection of one or the other of the diluent supplied through first diluent inlet port 116 or the diluent supplied through second diluent inlet port 117 for selective conveyance from valve body 100*a* to common diluents outlet 82 is determined by the state of diluent selector valve 130*a*. The selective conveyance of the selected diluent from valve body 100*a* to common diluents outlet 82 is effected by operation of flow control valve 185*a*.

A dedicated beverage product supply conduit 76*b* is provided between beverage product inlet 69*b* and beverage product inlet port 108 of corresponding valve body 100*b* for conveying a supplied beverage product from beverage product inlet 69*b* to valve body 100*b*. A dedicated beverage product dispensing conduit 80*b* is provided between beverage product outlet port 105 of valve body 100*b* and corresponding beverage product outlet 83*b* for selectively conveying the beverage product supplied through beverage product inlet port 108 of valve body 100*b* from valve body 100*b* and to beverage product outlet 83*b*, the selective conveyance being effected by operation of flow control valve 185*b*. A valve supply branch 72*b* is provided between common trunk 71 and first diluent inlet port 116 of corresponding valve body 100*b* for conveying a diluent supplied to common trunk 71 through first diluent inlet 67 from common trunk 71 to valve body 100*b*. A valve supply branch 75*b* is provided between common trunk 74 and second diluent inlet port 117 of corresponding valve body 100*b* for conveying a diluent supplied to common trunk 74 through second diluent inlet 68 from common trunk 74 to valve body 100*b*. A valve dispense branch 79*b* is provided between diluent outlet port 110 of corresponding valve body 100*b* and common trunk 78 for selectively conveying a separately selected one of either the diluent supplied through first diluent inlet port 116 of valve body 100*b* or the diluent supplied through second diluent inlet port 117 of valve body 100*b* from valve body 100*b* to common diluents outlet 82. The selection of one or the other of the diluent supplied through first diluent inlet port 116 or the diluent supplied through second diluent inlet port 117 for selective conveyance from valve body 100*b* to common diluents outlet 82 is determined by the state of diluent selector valve 130*b*. The selective conveyance of the selected diluent from valve body 100*b* to common diluents outlet 82 is effected by operation of flow control valve 185*b*.

A dedicated beverage product supply conduit 76*c* is provided between beverage product inlet 69*c* and beverage product inlet port 108 of corresponding valve body 100*c* for conveying a supplied beverage product from beverage product inlet 69*c* to valve body 100*c*. A dedicated beverage product dispensing conduit 80*c* is provided between beverage product outlet port 105 of valve body 100*c* and corresponding beverage product outlet 83*c* for selectively conveying the beverage product supplied through beverage product inlet port 108 of valve body 100*c* from valve body 100*c* and to beverage product outlet 83*c*, the selective conveyance being effected by operation of flow control valve 185*c*. A valve supply branch 72*c* is provided between common trunk 71 and first diluent inlet port 116 of corresponding valve body 100*c* for conveying a diluent supplied to common trunk 71 through first diluent inlet 67 from common trunk 71 to valve body 100*c*. A valve supply branch 75*c* is provided between common trunk 74 and second diluent inlet port 117 of corresponding valve body 100*c* for conveying a diluent supplied to common trunk 74 through second diluent inlet 68 from common trunk 74 to valve body 100*c*. A valve dispense branch 79*c* is provided between diluent outlet port 110 of corresponding valve body 100*c* and common trunk 78 for selectively conveying a separately selected one of either the diluent supplied through first diluent inlet port 116 of valve body 100*c* or the diluent supplied through second diluent inlet port 117 of valve body 100*c* from valve body 100*c* to common diluents outlet 82. The selection of one or the other of the diluent supplied through first diluent inlet port 116 or the diluent supplied through second diluent inlet port 117 for selective conveyance from valve body 100*c* to common diluents outlet 82 is determined by the state of diluent selector valve 130*c*. The selective conveyance of the selected diluent from valve body 100*c* to common diluents outlet 82 is effected by operation of flow control valve 185*c*.

Figure 30B:
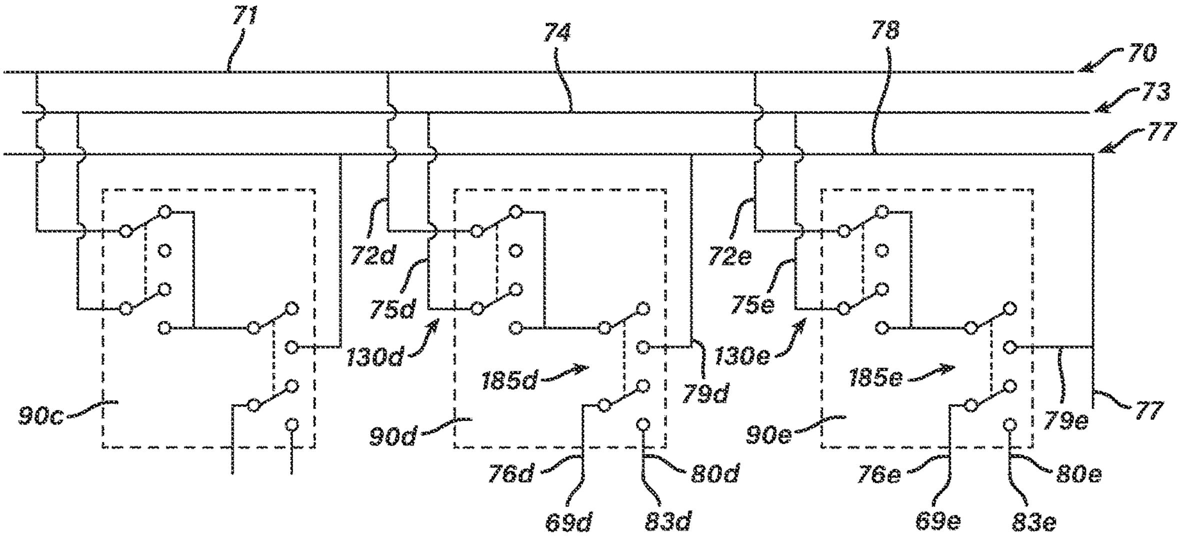

Referring particularly now to FIGS. 29 and 30B, and with reference to FIGS. 20-28 as necessary, a dedicated beverage product supply conduit 76*d* is provided between beverage product inlet 69*d* and beverage product inlet port 108 of corresponding valve body 100*d* for conveying a supplied beverage product from beverage product inlet 69*d* to valve body 100*d*. A dedicated beverage product dispensing conduit 80*d* is provided between beverage product outlet port 105 of valve body 100*d* and corresponding beverage product outlet 83*d* for selectively conveying the beverage product supplied through beverage product inlet port 108 of valve body 100*d* from valve body 100*d* and to beverage product outlet 83*d*, the selective conveyance being effected by operation of flow control valve 185*d*. A valve supply branch 72*d* is provided between common trunk 71 and first diluent inlet port 116 of corresponding valve body 100*d* for conveying a diluent supplied to common trunk 71 through first diluent inlet 67 from common trunk 71 to valve body 100*d*. A valve supply branch 75*d* is provided between common trunk 74 and second diluent inlet port 117 of corresponding valve body 100*d* for conveying a diluent supplied to common trunk 74 through second diluent inlet 68 from common trunk 74 to valve body 100*d*. A valve dispense branch 79*d* is provided between diluent outlet port 110 of corresponding valve body 100*d* and common trunk 78 for selectively conveying a separately selected one of either the diluent supplied through first diluent inlet port 116 of valve body 100*d* or the diluent supplied through second diluent inlet port 117 of valve body 100*d* from valve body 100*d* to common diluents outlet 82. The selection of one or the other of the diluent supplied through first diluent inlet port 116 or the diluent supplied through second diluent inlet port 117 for selective conveyance from valve body 100*d* to common diluents outlet 82 is determined by the state of diluent selector valve 130*d*. The selective conveyance of the selected diluent from valve body 100*d* to common diluents outlet 82 is effected by operation of flow control valve 185*d*.

A dedicated beverage product supply conduit 76*e* is provided between beverage product inlet 69*e* and beverage product inlet port 108 of corresponding valve body 100*e* for conveying a supplied beverage product from beverage product inlet 69*e* to valve body 100*e*. A dedicated beverage product dispensing conduit 80*e* is provided between beverage product outlet port 105 of valve body 100*e* and corresponding beverage product outlet 83*e* for selectively conveying the beverage product supplied through beverage product inlet port 108 of valve body 100*e* from valve body 100*e* and to beverage product outlet 83*e*, the selective conveyance being effected by operation of flow control valve 185*e*. A valve supply branch 72*e* is provided between common trunk 71 and first diluent inlet port 116 of corresponding valve body 100*e* for conveying a diluent supplied to common trunk 71 through first diluent inlet 67 from common trunk 71 to valve body 100*e*. A valve supply branch 75*e* is provided between common trunk 74 and second diluent inlet port 117 of corresponding valve body 100*e* for conveying a diluent supplied to common trunk 74 through second diluent inlet 68 from common trunk 74 to valve body 100*e*. A valve dispense branch 79*e* is provided between diluent outlet port 110 of corresponding valve body 100*e* and common trunk 78 for selectively conveying a separately selected one of either the diluent supplied through first diluent inlet port 116 of valve body 100*e* or the diluent supplied through second diluent inlet port 117 of valve body 100*e* from valve body 100*e* to common diluents outlet 82. The selection of one or the other of the diluent supplied through first diluent inlet port 116 or the diluent supplied through second diluent inlet port 117 for selective conveyance from valve body 100*e* to common diluents outlet 82 is determined by the state of diluent selector valve 130*e*. The selective conveyance of the selected diluent from valve body 100*e* to common diluents outlet 82 is effected by operation of flow control valve 185*e*.

Figure 30C:
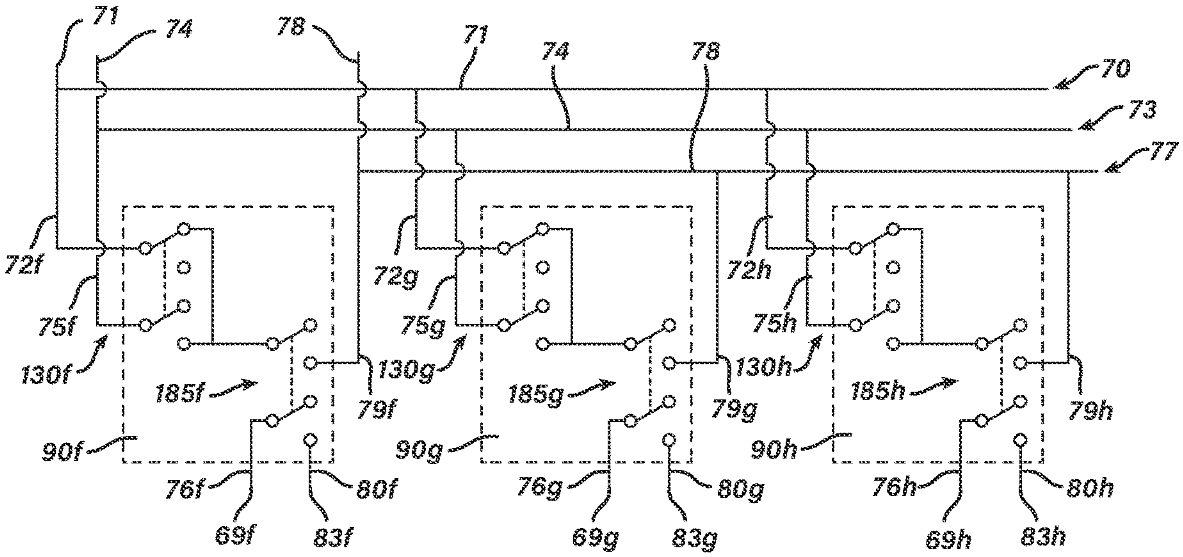

Referring particularly now to FIGS. 29 and 30C, and with reference to FIGS. 20-28 as necessary, a dedicated beverage product supply conduit 76*f* is provided between beverage product inlet 69*f* and beverage product inlet port 108 of corresponding valve body 100*f* for conveying a supplied beverage product from beverage product inlet 69*f* to valve body 100*f*. A dedicated beverage product dispensing conduit 80*f* is provided between beverage product outlet port 105 of valve body 100*f* and corresponding beverage product outlet 83*f* for selectively conveying the beverage product supplied through beverage product inlet port 108 of valve body 100*f* from valve body 100*f* and to beverage product outlet 83*f*, the selective conveyance being effected by operation of flow control valve 185*f*. A valve supply branch 72*f* is provided between common trunk 71 and first diluent inlet port 116 of corresponding valve body 100*f* for conveying a diluent supplied to common trunk 71 through first diluent inlet 67 from common trunk 71 to valve body 100*f*. A valve supply branch 75*f* is provided between common trunk 74 and second diluent inlet port 117 of corresponding valve body 100*f* for conveying a diluent supplied to common trunk 74 through second diluent inlet 68 from common trunk 74 to valve body 100*f*. A valve dispense branch 79*f* is provided between diluent outlet port 110 of corresponding valve body 100*f* and common trunk 78 for selectively conveying a separately selected one of either the diluent supplied through first diluent inlet port 116 of valve body 100*f* or the diluent supplied through second diluent inlet port 117 of valve body 100*f* from valve body 100*f* to common diluents outlet 82. The selection of one or the other of the diluent supplied through first diluent inlet port 116 or the diluent supplied through second diluent inlet port 117 for selective conveyance from valve body 100*f* to common diluents outlet 82 is determined by the state of diluent selector valve 130*f*. The selective conveyance of the selected diluent from valve body 100*f* to common diluents outlet 82 is effected by operation of flow control valve 185*f*.

A dedicated beverage product supply conduit 76*g* is provided between beverage product inlet 69*g* and beverage product inlet port 108 of corresponding valve body 100*g* for conveying a supplied beverage product from beverage product inlet 69*g* to valve body 100*g*. A dedicated beverage product dispensing conduit 80*g* is provided between beverage product outlet port 105 of valve body 100*g* and corresponding beverage product outlet 83*g* for selectively conveying the beverage product supplied through beverage product inlet port 108 of valve body 100*g* from valve body 100*g* and to beverage product outlet 83*g*, the selective conveyance being effected by operation of flow control valve 185*g*. A valve supply branch 72*g* is provided between common trunk 71 and first diluent inlet port 116 of corresponding valve body 100*g* for conveying a diluent supplied to common trunk 71 through first diluent inlet 67 from common trunk 71 to valve body 100*g*. A valve supply branch 75*g* is provided between common trunk 74 and second diluent inlet port 117 of corresponding valve body 100*g* for conveying a diluent supplied to common trunk 74 through second diluent inlet 68 from common trunk 74 to valve body 100*g*. A valve dispense branch 79*g* is provided between diluent outlet port 110 of corresponding valve body 100*g* and common trunk 78 for selectively conveying a separately selected one of either the diluent supplied through first diluent inlet port 116 of valve body 100*g* or the diluent supplied through second diluent inlet port 117 of valve body 100*g* from valve body 100*g* to common diluents outlet 82. The selection of one or the other of the diluent supplied through first diluent inlet port 116 or the diluent supplied through second diluent inlet port 117 for selective conveyance from valve body 100*g* to common diluents outlet 82 is determined by the state of diluent selector valve 130*g*. The selective conveyance of the selected diluent from valve body 100*g* to common diluents outlet 82 is effected by operation of flow control valve 185*g*.

A dedicated beverage product supply conduit 76*h* is provided between beverage product inlet 69*h* and beverage product inlet port 108 of corresponding valve body 100*h* for conveying a supplied beverage product from beverage product inlet 69*h* to valve body 100*h*. A dedicated beverage product dispensing conduit 80*h* is provided between beverage product outlet port 105 of valve body 100*h* and corresponding beverage product outlet 83*h* for selectively conveying the beverage product supplied through beverage product inlet port 108 of valve body 100*h* from valve body 100*h* and to beverage product outlet 83*h*, the selective conveyance being effected by operation of flow control valve 185*h*. A valve supply branch 72*h* is provided between common trunk 71 and first diluent inlet port 116 of corresponding valve body 100*h* for conveying a diluent supplied to common trunk 71 through first diluent inlet 67 from common trunk 71 to valve body 100*h*. A valve supply branch 75*h* is provided between common trunk 74 and second diluent inlet port 117 of corresponding valve body 100*h* for conveying a diluent supplied to common trunk 74 through second diluent inlet 68 from common trunk 74 to valve body 100*h*. A valve dispense branch 79*h* is provided between diluent outlet port 110 of corresponding valve body 100*h* and common trunk 78 for selectively conveying a separately selected one of either the diluent supplied through first diluent inlet port 116 of valve body 100*h* or the diluent supplied through second diluent inlet port 117 of valve body 100*h* from valve body 100*h* to common diluents outlet 82. The selection of one or the other of the diluent supplied through first diluent inlet port 116 or the diluent supplied through second diluent inlet port 117 for selective conveyance from valve body 100*h* to common diluents outlet 82 is determined by the state of diluent selector valve 130*h*. The selective conveyance of the selected diluent from valve body 100*h* to common diluents outlet 82 is effected by operation of flow control valve 185*h*.

As previously noted, the most preferred implementation of the hand-held beverage dispenser 5 of the present invention contemplates a pair of ON-OFF flow controls 20*i*-20*j*, each of which is dedicated to dispensing a diluent only through valve units 90*i*-90*j* configured to only dispense diluents. As also previously noted, the most preferred implementations of the present invention contemplate that the provision of either the first diluent only or the second diluent only is also end-user selectable. In order to meet these demands, the novel piping system 65 of the present invention omits the beverage product supply conduits and beverage product dispensing conduits, as otherwise would run to or from the corresponding adjunct valve units 90*i*-90*j*. Additionally, each corresponding valve body 100*i*-100*j* is formed or otherwise provided without a beverage product inlet port 108 or a beverage product outlet port 105. On the other hand, the valve bodies 100*i*-100*j* are formed or otherwise provided with internal structures identical to those of valve bodies 100*a*-100*h*, thereby requiring no additional or different valve components for implementation of the desired features.

Figure 30D:
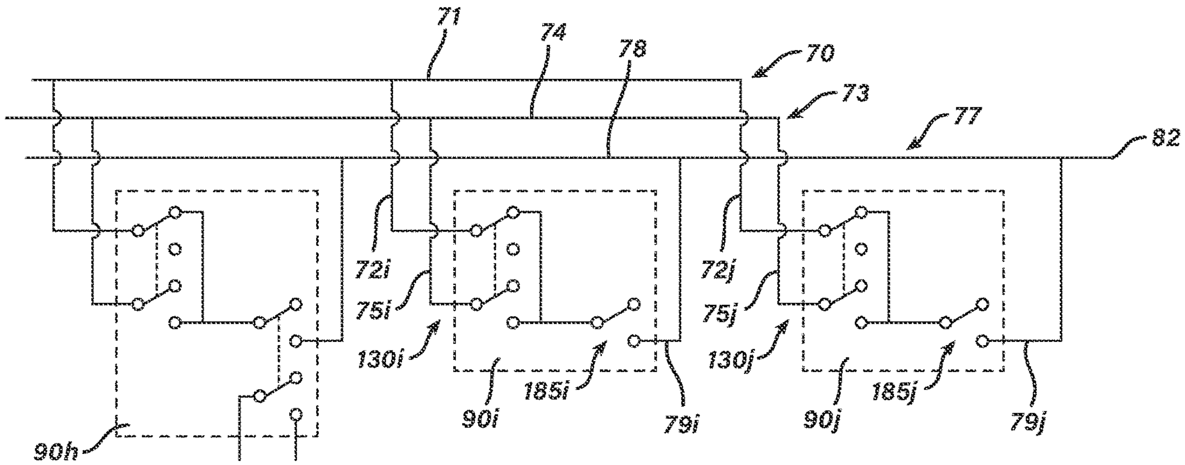
Figure 31:
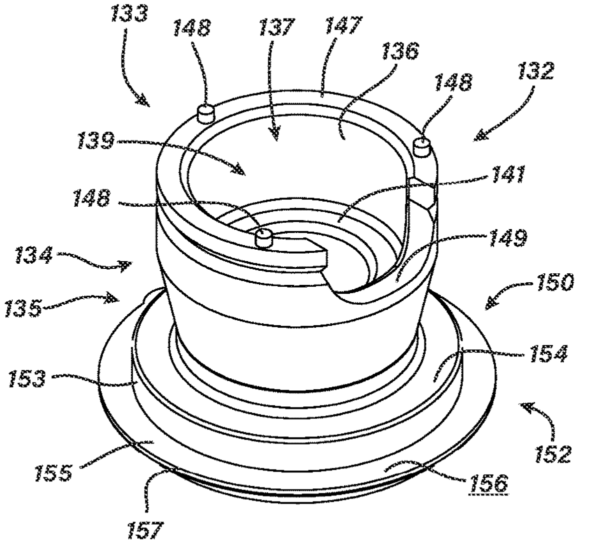
FIGS. 31-36 illustrate various aspects of a structural body about which a selector valve trim assembly of the piping system of the hand-held beverage dispenser is integrally formed, where.
Figure 32:
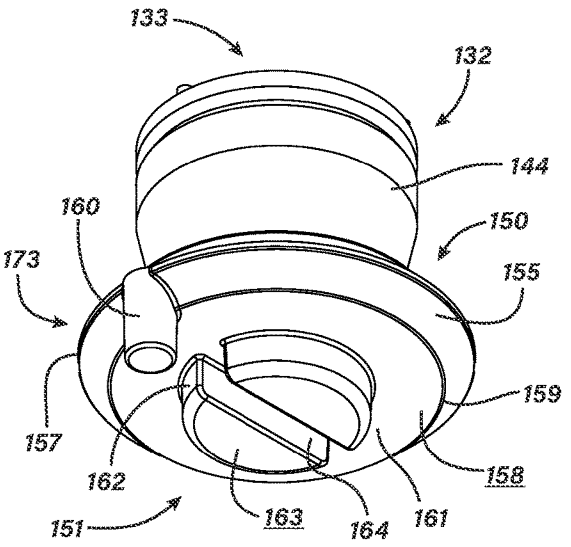
Figure 33:
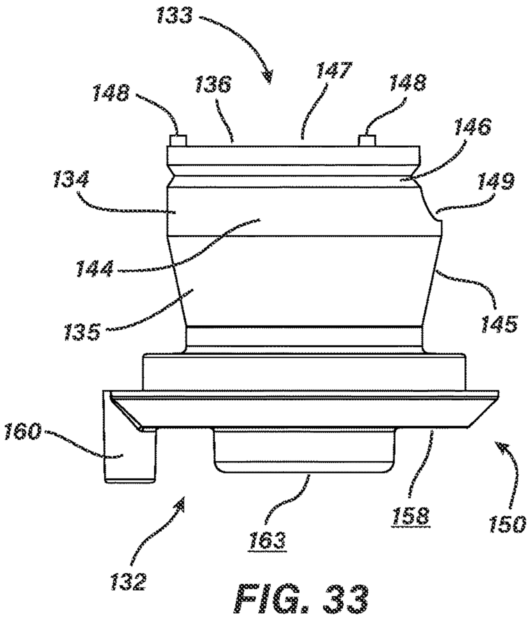
Figure 34:
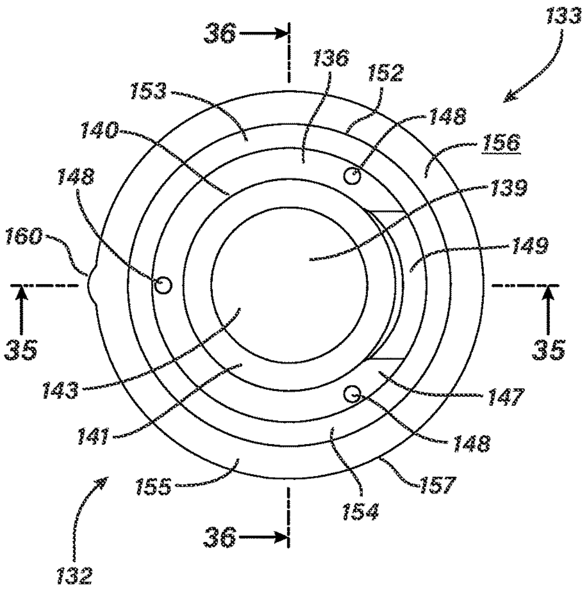
Figure 35:
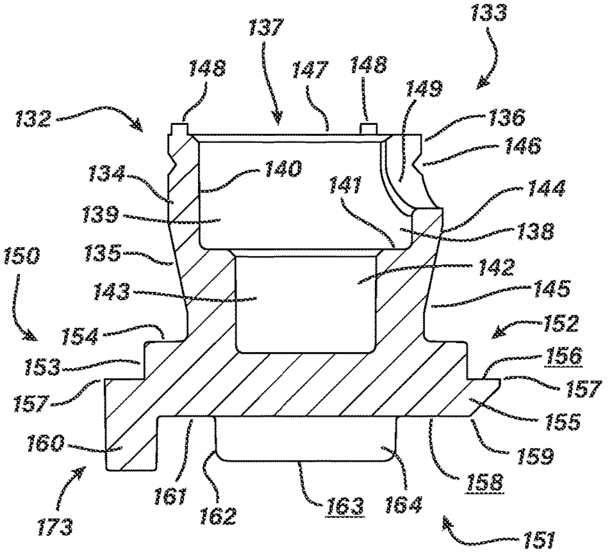
Figure 36:
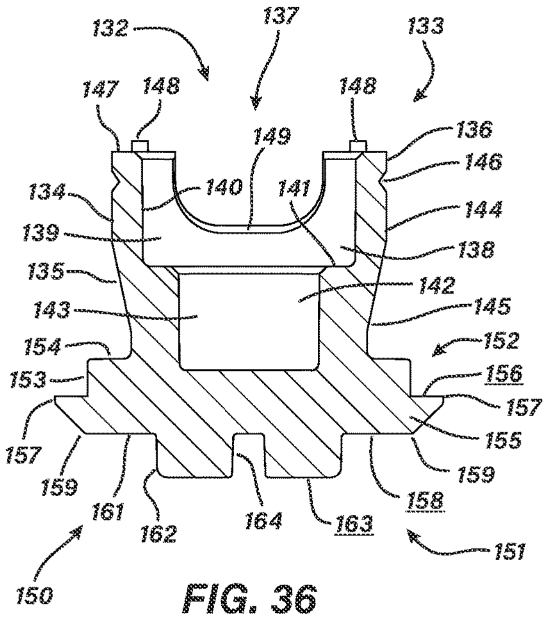
Figure 37:
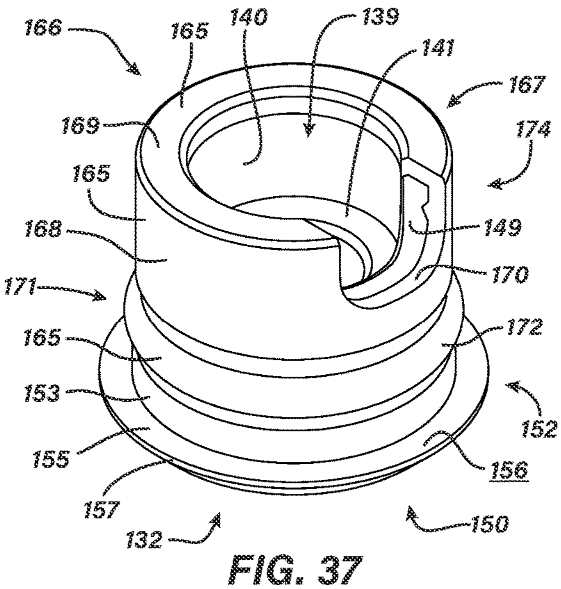
FIGS. 37-40 illustrate various aspects of the selector valve trim assembly, where.
Figure 38:
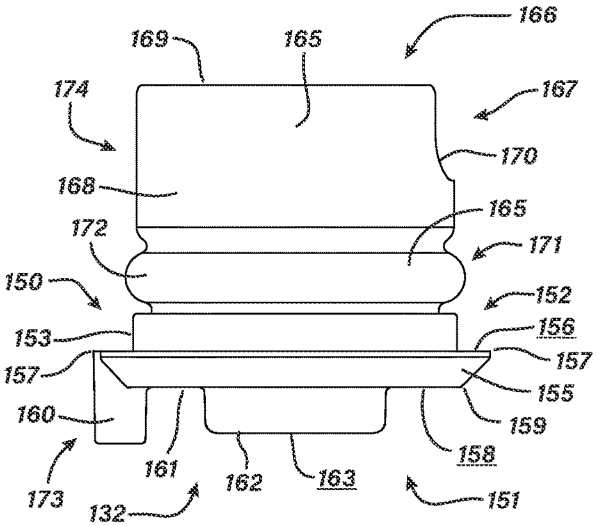
Figure 39:
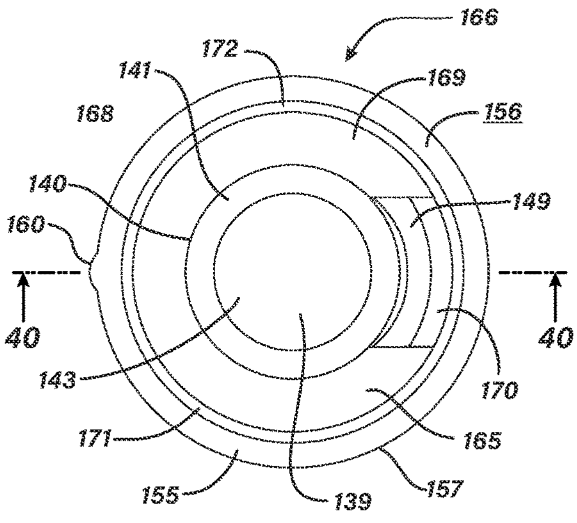
Figure 40:
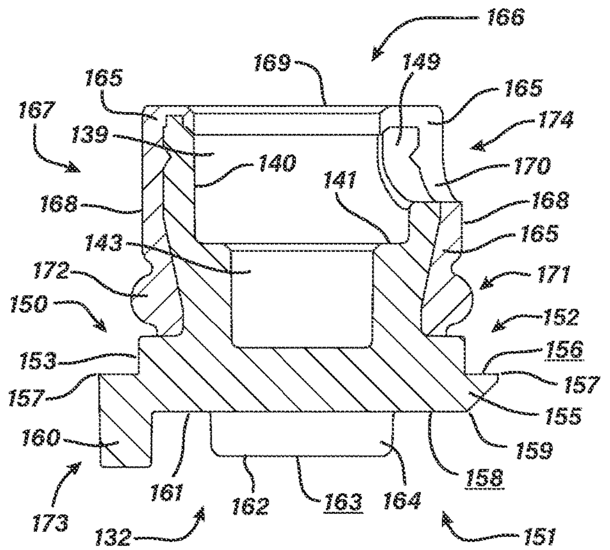

Referring particularly now to FIGS. 29 and 30D, and with reference to FIGS. 20-28 as necessary, a valve supply branch 72*i* is provided between common trunk 71 and first diluent inlet port 116 of corresponding valve body 100*i* for conveying a diluent supplied to common trunk 71 through first diluent inlet 67 from common trunk 71 to valve body 100*i*. A valve supply branch 75*i* is provided between common trunk 74 and second diluent inlet port 117 of corresponding valve body 100*i* for conveying a diluent supplied to common trunk 74 through second diluent inlet 68 from common trunk 74 to valve body 100*i*. A valve dispense branch 79*i* is provided between diluent outlet port 110 of corresponding valve body 100*i* and common trunk 78 for selectively conveying a separately selected one of either the diluent supplied through first diluent inlet port 116 of valve body 100*i* or the diluent supplied through second diluent inlet port 117 of valve body 100*i* from valve body 100*i* to common diluents outlet 82. The selection of one or the other of the diluent supplied through first diluent inlet port 116 or the diluent supplied through second diluent inlet port 117 for selective conveyance from valve body 100*i* to common diluents outlet 82 is determined by the state of diluent selector valve 130*i*. The selective conveyance of the selected diluent from valve body 100*i* to common diluents outlet 82 is effected by operation of flow control valve 185*i*.

Likewise, a valve supply branch 72*j* is provided between common trunk 71 and first diluent inlet port 116 of corresponding valve body 100*j* for conveying a diluent supplied to common trunk 71 through first diluent inlet 67 from common trunk 71 to valve body 100*j*. A valve supply branch 75*j* is provided between common trunk 74 and second diluent inlet port 117 of corresponding valve body 100*j* for conveying a diluent supplied to common trunk 74 through second diluent inlet 68 from common trunk 74 to valve body 100*j*. A valve dispense branch 79*j* is provided between diluent outlet port 110 of corresponding valve body 100*j* and common trunk 78 for selectively conveying a separately selected one of either the diluent supplied through first diluent inlet port 116 of valve body 100*j* or the diluent supplied through second diluent inlet port 117 of valve body 100*j* from valve body 100*j* to common diluents outlet 82. The selection of one or the other of the diluent supplied through first diluent inlet port 116 or the diluent supplied through second diluent inlet port 117 for selective conveyance from valve body 100*j* to common diluents outlet 82 is determined by the state of diluent selector valve 130*j*. The selective conveyance of the selected diluent from valve body 100*j* to common diluents outlet 82 is effected by operation of flow control valve 185*j*.

As previously noted, each fully integral selector valve trim assembly 131 includes an inventive specially formed open-topped cup 166 in implementation of the diluent selection valves 130*a*-130*j* and other inventive aspects of the valve units 90*a*-90*j* of the exemplary hand-held beverage dispenser 5. In the most preferred implementation of the hand-held beverage dispenser 5, the fully integral selector valve trim assembly 131 is implemented as a flexible yet resilient thermoplastic overmold 165 as applied to and including aspects of a preferably moldable, yet strong and durable thermoplastic structural body 132. The structural body 132, however, could alternatively be additively formed, milled, cast or otherwise formed. Although other materials may be utilized in other combinations for both the overmold 165 and structural body 132, the open-topped cup 166 as formed for the exemplary hand-held beverage dispenser 5 according to the preferred embodiment includes a thermoplastic overmold 165 comprising a food grade polyether-based thermoplastic polyurethane. The structural body 132 as forms a rigid substrate for the overmold 165 in the exemplary implementation of the open-topped cup 166 comprises a food grade amorphous copolyester or like material.

Referring now to FIGS. 31-36, the structural body 132 is formed or otherwise provided as a molded thermoplastic or alternatively formed as open-topped vessel 133, in accordance with the described most preferred implementation. The preferred implementation of the open-topped vessel 133 generally comprises a substantially radially symmetric structure, and includes an upper portion 134, a lower portion 135 and a lowermost flanged base portion 150. The upper portion 134 of the open-topped vessel 133 implements the previously noted passage selection closure element 174 for the diluent selector valve 130*d*. As will be better understood further herein, the passage selection closure element 174 for the diluent selector valve 130*d* is implemented as an independently inventive cylindrical valve gate 167, which is formed about the upper portion 134 of the open-topped vessel 133. In addition to aspects of the fully integral selector valve trim assembly 131, a lower seal 172 for the valve unit 90*d* is implemented about the lower portion 135 of the open-topped vessel 133 as part of a plug 171. As will be better understood further herein, the plug 171 is implemented more generally about the lowermost flanged base portion 150 of the open-topped vessel 133.

In definition of the open-topped vessel 133, a tiered socket 137 is formed or otherwise provided through the top 136 of the structural body 132, whereby a cylindrical chamber 139 of the open-topped cup 166 is implemented in an upper tier 138 of the tiered socket 137 and a preferably cylindrical receptacle 143 of the open-topped cup 166 is implemented in a lower tier 142 of the tiered socket 137. For clarity, however, and as more fully described herein, the upper tier 138 generally defines the upper portion 134 of the open-topped vessel 133 and the implemented cylindrical chamber 139 of the open-topped cup 166. The cylindrical interior wall 140 about the cylindrical chamber 139 defines a third valve body working segment of the valve unit 90*d* that is particularly formed, configured or otherwise adapted for the flow control valve 185*d*. In particular, a second flow control closure element 215 operates within this third valve body working segment to control fluid flow, or communication, through a user selected one of at least a first internal diluent passage of the valve body 100*d* and a second internal diluent passage of the valve body 100*d*. The first internal diluent passage runs between the first diluent inlet port 116 and the diluent outlet port 110 of the valve body 100*d*, and the second internal diluent passage runs between the second diluent inlet port 117 and the diluent outlet port 110 of the valve body 100*d*. As will be better understood further herein, the internal diameter of the cylindrical interior wall 140 about the cylindrical chamber 139 of the open-topped cup 166 is formed or otherwise provided having a third working diameter for the valve unit 90*d* that is greater than the first working diameter for the valve unit 90*d* defining the first valve body working segment of the valve unit 90*d*, but is substantially less than the second working diameter for the valve unit 90*d* defining the second valve body working segment of the valve unit 90*d*. Within these constraints, the required substantiality of the differences between the second working diameter and the first and third working diameters is largely a matter of desired thickness of the cylindrical valve gate 167 implemented in connection with the open-topped cup 166 of the diluent selector valve 130*d*, as also constrained by available space within the extents of the handle body 5 of the hand-held beverage dispenser 10.

The previously noted lower tier 142 is formed through the bottom 141 of the cylindrical chamber 139, and within the lower portion 135, below the bottom 141 of the cylindrical chamber 139, of the open-topped vessel 133 to define a preferably cylindrical, closed-bottom receptacle 143. The closed-bottom receptacle 143 is sized, shaped or otherwise adapted for receiving one end of the poppet spring 219 of the flow control valve trim assembly 186 conformingly about the outer circumference of the poppet spring 219.

A preferably radially symmetric outer wall 144 of the open-topped vessel 133 includes contours 145, grooves 146 or like features for accommodating, as well as facilitating adherence and stability of, the overmold 165, as will be better understood further herein. A top edge 147 of the open-topped vessel 133 is defined between the respective uppermost extents of the cylindrical interior wall 140 about the cylindrical chamber 139 and the outer wall 144 of the open-topped vessel 133. A plurality of posts 148 or like anchors project upwardly from the top edge 147 of the open-topped vessel 133 to facilitate adherence and stability of the overmold 165. In an important aspect of the present invention, a horizontally oriented notch 149 is provided in the top edge 147 of the open-topped vessel 133.

A lowermost portion 150 of the open-topped vessel 133, below the outer wall 144 of the open-topped vessel 133, includes a cylindrical base 152 atop a circumferential flange 155, which together form a closed bottom 151 of the open-topped vessel 133, and thus the fully integral selector valve trim assembly 131. The cylindrical base 152 conforms to, and has an outer diameter sufficiently less than the inside diameter of the circular open end 121 at the bottom 118 of the valve body 100*d* as to enable the cylindrical base 152 to be readily slidingly received through the circular open end 121 and into the bottom 118 of the valve body 100*d*. An annular ledge 153 is formed or otherwise provided atop the cylindrical base 152. Although not critical, the top 154 of the annular ledge 153 is preferably formed or otherwise provided as a substantially planar surface to facilitate application and support of the overmold 165.

The circumferential flange 155 forms a substantially planar, annular top surface 156 about the cylindrical base 152 bounded by a preferably circular top rim 157 about the circumferential flange 155. The diameter of the circumferential flange 155 at the top rim 157 is sufficiently greater than the diameter of the cylindrical base 152 such that the substantially planar, annular top surface 156 of the circumferential flange 155 is sized, shaped or otherwise adapted for flush engagement with, and preferably all about, the circular open end 121 at the bottom 118 of the valve body 100*d*. A preferably circular bottom rim 159 about the circumferential flange 155, however, is deeply chamfered or similarly relieved such that the diameter of the circumferential flange 155 at the bottom rim 159 is substantially less than the diameter of the circumferential flange 155 at the top rim 157. As more fully described herein, the chamfered, beveled or otherwise relieved outer edge of the circumferential flange 155 enables very close conformance of the lower enclosure member 34 for the handle body 10 about the lowermost flanged base portion 150 of the open-topped vessel 133.

A cylindrical protuberance 162, in the general nature of a trunnion, projects downwardly from the bottom side 161 of the closed bottom 151 of the open-topped vessel 133 of the diluent selector valve 130*d* and thus the fully integral selector valve trim assembly 131. A bottom face 163 of the cylindrical protuberance 162 includes a blind slot 164 for engagement by a standard slotted screwdriver or a like implement in operation of the diluent selector valve 130*d* in accordance with the present invention, as more fully described herein. As will be better understood further herein, the cylindrical protuberance 162 is sized, shaped or otherwise adapted to substantially conformingly engage an arcuate notch 248 of the rigid plate 246 of the composite valve trim retaining member 245, as introduced in the overview description of FIGS. 7-8. As operably placed in use, at least a portion of the bottom side 161 of the closed bottom 151 of the open-topped vessel 133, and thus the fully integral selector valve trim assembly 131, securely abuts a top side 247, about the arcuate notch 248, of the rigid plate 246, as more fully described herein. Accordingly, the bottom side 161 of the closed bottom 151 of the open-topped vessel 133 forms a substantially planar, annular engagement surface 158 for the fully integral selector valve trim assembly 131. As particularly illustrated in FIG. 32, the annular engagement surface 158 is formed or otherwise provided about the downwardly projecting cylindrical protuberance 162 and is bounded by the preferably circular bottom rim 159 about the circumferential flange 155. The substantially reduced diameter of the circumferential flange 155 at the bottom rim 159, as previously described, also substantially reduces the area of the substantially planar engagement surface 158, which, as will be better understood further herein, is in frictional engagement with the top side 247 of the rigid plate 246 of the composite valve trim retaining member 245.

A downwardly projecting stop post 160 extends from the chamfered bottom rim 159 of the circumferential flange 155. The stop post 160 is formed, configured or otherwise adapted to operably engage various features of upwardly projecting locking barriers 40 formed or otherwise provided on the interior side 37 of the lower enclosure member 34, interiorly bulging areas 43 of the lower enclosure member 34, and edge segments 251 of the rigid plate 246 of the composite valve trim retaining member 245, which are specially provided to implement stops 252 for the stop post 160. Each of these features and engagements are described in greater detail further herein.

As particularly shown in FIGS. 37-40, the previously described overmold 165 is selectively applied to the structural body 132 providing the substrate for the overmold 165, thereby cooperatively implementing the fully integral selector valve trim assembly 131 for the diluent selector valve 130*d* in the preferred form of the open-topped cup 166. For clarity, the most preferred implementation of the open-topped cup 166, including the cylindrical valve gate 167, contemplates a composite structure comprising a combination of overmold 165 and naked substrate, that is portions of the structural body 132 not covered by the overmold material and therefore remaining exteriorly exposed. The passage selection closure element 174 for the diluent selector valve 130*d* of the exemplary hand-held beverage dispenser 5 according to the preferred embodiment is thus implemented as the compositely formed cylindrical valve gate 167.

The cylindrical valve gate 167 for the diluent selector valve 130*d* is cooperatively formed between the cylindrical interior wall 140 about the cylindrical chamber 139 of the open-topped vessel 133, and thus the open-topped cup 166, and a cylindrical exterior surface 168 of the open-topped cup 166 as formed or otherwise provided by the overmold 165. Consistent with the previously described lower chamber 111 of the valve body 100*d*, the cylindrical exterior surface 168 of the open-topped cup 166 is formed or otherwise provided by the overmold 165 having a diameter closely conforming to the second working diameter for the valve unit 90*d* defining the second valve body working segment of the valve unit 90*d* such that when the open-topped cup 166 is operably received within the valve body 100*d* it is freely but sealingly rotatable in place. As particularly shown in FIGS. 37 and 40, application of the overmold 165 about the horizontally oriented notch 149 in the top edge 147 of the open-topped vessel 133 also forms a horizontally oriented notch 170 for the open-topped cup 166 of the diluent selector valve 181*d* substantially coextensive with the horizontally oriented notch 149 of the open-topped vessel 133.

The overmold 165 also extends substantially coextensively over the top edge 147 of the open-topped vessel 133 to cooperatively form a preferably substantially planar upper edge 169 of the cylindrical valve gate 167, and thus the open-topped cup 166. As operably placed in use of the hand-held beverage dispenser 5, the upper edge 169 of the open-topped cup 166 engages the shoulder 113 about the top of the lower chamber 111, thereby joining the cylindrical chamber 139 of the open-topped cup 166 with the intermediate chamber 106 of the valve body 100*d*. As joined, the first and third valve body working segments of the valve unit 90*d* form a continuous valve body volume for implementation of the flow control valve 185*d*. Although making use of common structure through at least the valve body 100*d* and the open-topped cup 166, the diluent selector valve 130*d* and the flow the flow control valve 185*d*, as implemented with the inventive composite valve trim arrangement 91 shown and described herein, are nonetheless both functionally independent and distinct.

As previously noted, the lower seal 172 for the valve unit 90*d* is implemented adjacent the lowermost portion of the selector valve trim assembly 131 that is received within the valve body 100*d*. As shown in the figures, the lower seal 172 is provided by the overmold 165 below the cylindrical exterior surface 168 of the cylindrical valve gate 167. In use of the hand-held beverage dispenser 5 of the present invention, the cylindrical valve gate 167 is operably received within the lower chamber 111 of the valve body 100*d* defining the second valve body working segment of the valve unit 90*d*. The lower seal 172 for the valve unit 90*d*, however, is operably received within the cylindrical socket 119 at the bottom 118 of the valve body 100*d*, and is cooperatively adapted with the cylindrical base 152 and circumferential flange 155 at the lowermost flanged base portion 150 of the open-topped vessel 133 to form a plug 171 corresponding to the cylindrical socket 119.

The cylindrical socket 119 at the bottom 118 of the valve body 100*d* has an internal diameter that is coextensive with the circular open end 121 of the valve body 100*d* and slightly greater than the second working diameter for the valve unit 90*d* defined by the lower chamber 111 of the valve body 100*d*. The greater diameter of the circular open end 121 and cylindrical socket 119 of the valve body 100*d* permits the lower seal 172 for the valve unit 90*d* to have a greater outer diameter than that of the cylindrical exterior surface 168 of the cylindrical valve gate 167. This arrangement facilitates specification of the interface or other working characteristics for the lower seal 172 of the valve unit 90*d* independent of the specified characteristics for the cylindrical exterior surface 168 of the cylindrical valve gate 167, thereby ensuring a desired level of sealing engagement is achieved for each.

Figure 41:
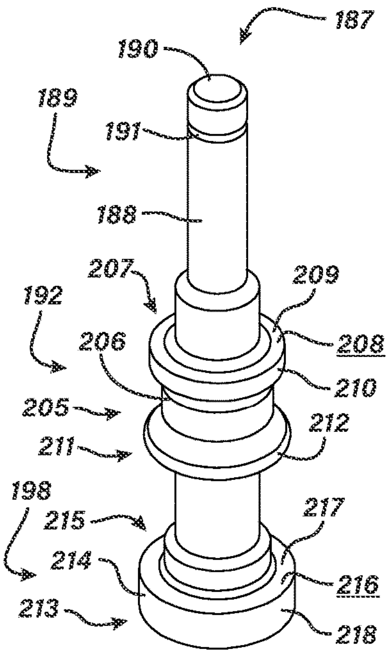
FIGS. 41-43 illustrate various aspects of an integral valve stem assembly of a flow control valve trim assembly of the piping system of the hand-held beverage dispenser, where.
Figure 42:
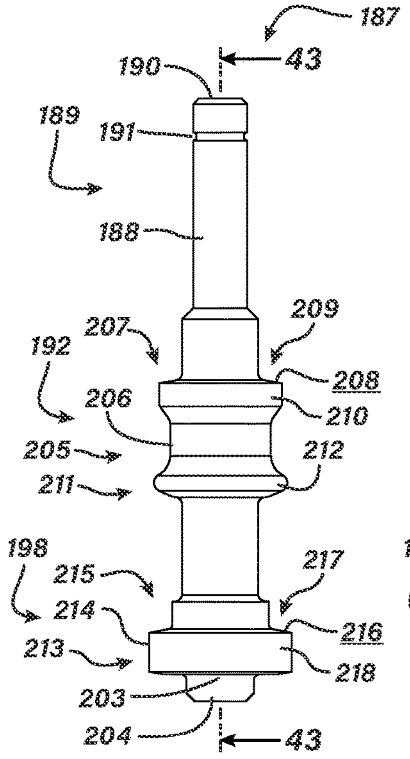
Figure 43:
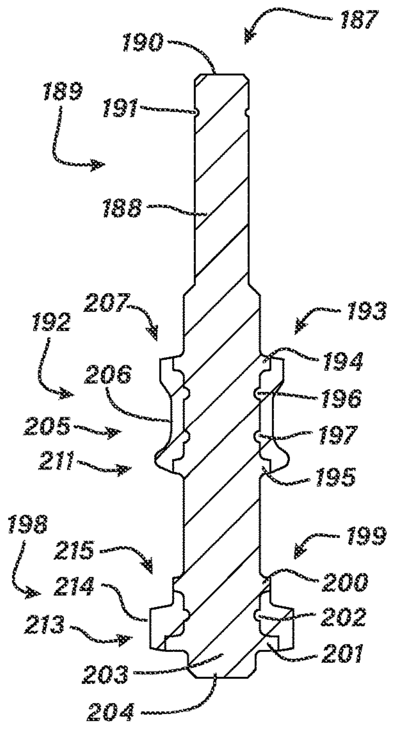

As previously noted, each flow control valve trim assembly 186 includes an integral valve stem assembly 187 and a poppet spring 219. As particularly shown in FIGS. 41-43, the integral valve stem assembly 187 comprises a generally cylindrical, axially symmetric valve stem 188, a first flow control closure element 207, a second flow control closure element 215 and a wiping seal 211. As shown in FIGS. 41-43, but most particularly in FIG. 43, the upper portion 189 of the valve stem 188 is substantially narrowed, as compared to the generally uniform diameter of the midsection 192 and lower portion 198 of the valve stem 188. As previously noted, the upper portion 189 of the valve stem 188 is sized, shaped or otherwise configured or adapted to extend from within to without the valve body 100*d* while in use, thereby implementing aspects of the ON-OFF flow control 20*d* for manual actuation by a user of the flow control valve 185*d*. The valve stem 188 also includes a keeper groove 191 adjacent the top end 190 of the valve stem 188 for retaining a button cap 230, which will more fully described herein to also implement aspects of the ON-OFF flow control 20*d*.

As shown in FIGS. 41-43, a first, upper reciprocating sealing member 205, in the general form of a spool-shaped annular body 206, is most preferably implemented about the midsection 192 of the valve stem 188 as an integral overmold of the valve stem 188. The annular body 206 includes the first flow control closure element 207 and the wiping seal 211 for the flow control valve 185*d*. The first flow control closure element 207 comprises a top surface 208 generally bounded by a cylindrical outer edge 210. The top surface 208 of the first flow control closure element 207 includes a valve face 209, which is formed, configured or otherwise adapted to sealingly engage the upper valve seat 109 of the flow control valve 185*d*, as formed at the transition between the intermediate chamber 106 and the upper chamber 104 of the valve body 100*d*. The wiping seal 211 includes an outer edge 212 that is sized, configured or otherwise adapted to operate against the cylindrical interior wall 107 of the intermediate chamber 106 as a reciprocating wiper. As more fully described herein, the reciprocating wiper formed by the outer edge 212 segregates, and provides fluid isolation between, the interior space of the valve body 100*d* above the wiping seal 211 and the interior space of the valve body 100*d* below the wiping seal 211, as the flow control valve trim assembly 186 shifts longitudinally up and down within the exemplary valve body 100*d*.

In order to facilitate adherence of the overmold implementing the first, upper reciprocating sealing member 205, and provide structure and stability during use for the spool-shaped annular body 206 implementing the first flow control closure element 207 and wiping seal 211, a first retainer 193 is formed at the midsection 192 of the valve stem 188 for the first, upper reciprocating sealing member 205. In particular, as shown in FIG. 43, a first, upper annular disk 194 and a second, lower annular disk 195 of the first retainer 193 are milled or otherwise provided about the midsection 192 of the valve stem 188. Additionally, a first, upper annular groove 196 and a second, lower annular groove 197 of the first retainer 193 are milled or otherwise provided about the midsection 192 between the first, upper annular disk 194 and the second, lower annular disk 195 of the first retainer 193.

As also shown in FIGS. 41-43, a second, lower reciprocating sealing member 213 in the general form of a discoid annular body 214 is most preferably implemented about the lower portion 198 of the valve stem 188 as an integral overmold of the valve stem 188. The annular body 214 implements the second flow control closure element 215 includes a second flow control closure element 215 for the flow control valve 185*d*, which comprises a top surface 216 generally bounded by a cylindrical outer edge 218. The top surface 216 of the second flow control closure element 215 includes a valve face 217, which is formed, configured or otherwise adapted to sealingly engage the lower valve seat 115 of the flow control valve 185*d*, as formed at the transition between the lower chamber 111 and the intermediate chamber 106 of the valve body 100*d*.

In order to facilitate adherence of the overmold implementing the second, lower reciprocating sealing member 205, and provide structure and stability during use for the discoid annular body 214 implementing the second flow control closure element 215, a second retainer 199 is formed at the lower portion 198 of the valve stem 188 for the second, lower reciprocating sealing member 213. In particular, as shown in FIG. 43, a first, upper annular disk 200 and a second, lower annular disk 201 of the second retainer 199 are milled or otherwise provided about the lower portion 198 of the valve stem 188. Additionally, an annular groove 202 of the second retainer 199 is milled or otherwise provided about the lower portion 198 between the first, upper annular disk 200 and the second, lower annular disk 201 of the second retainer 199.

A downwardly projecting protuberance 204 from the bottom end 203 of the valve stem 188 is formed or otherwise provided in the general nature of a trunnion. In an important aspect of the cooperative integration of the open-topped cup 166 and the flow control valve trim assembly 186 forming the fully integrated selector valve trim assembly 131, the downwardly projecting protuberance 204 of the valve stem 188 is sized, shaped or otherwise adapted to engage the free, reciprocating end of the poppet spring 219 while the opposite, generally fixed end of the poppet spring 219 is engaged within the closed-bottom receptacle 143 provided therefor in the open-topped cup 166 of the diluent selector valve 130*d*.

Figure 44:
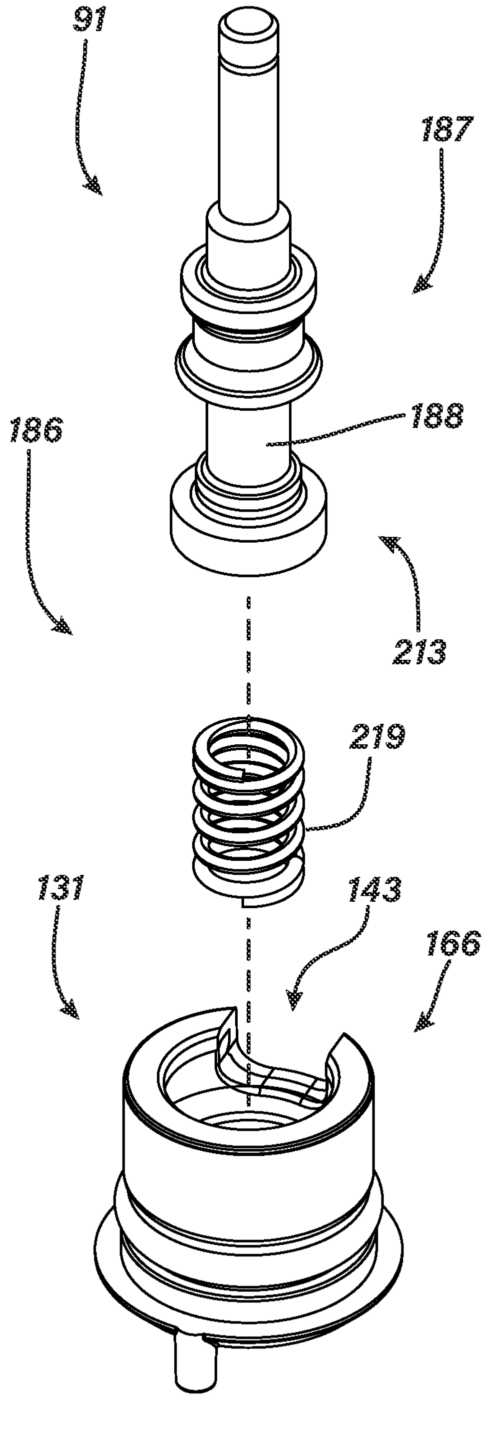
FIGS. 44-45 are exploded views illustrating various aspects of the arrangement of the flow control valve trim assembly with the selector valve trim assembly, where.
Figure 45:
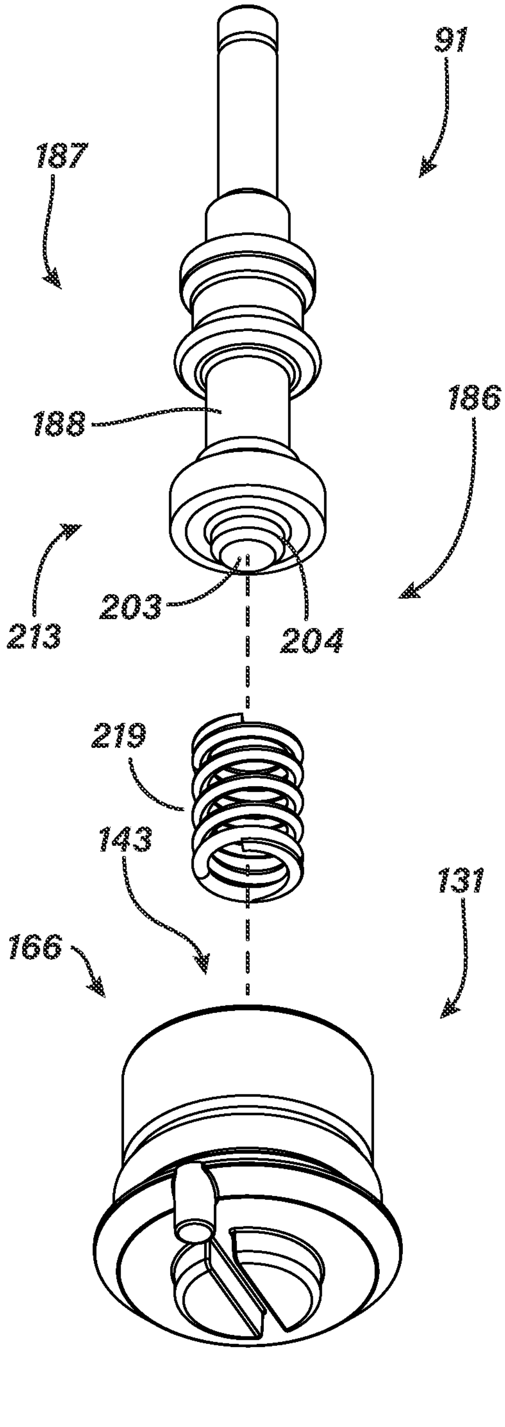
Figure 46A:
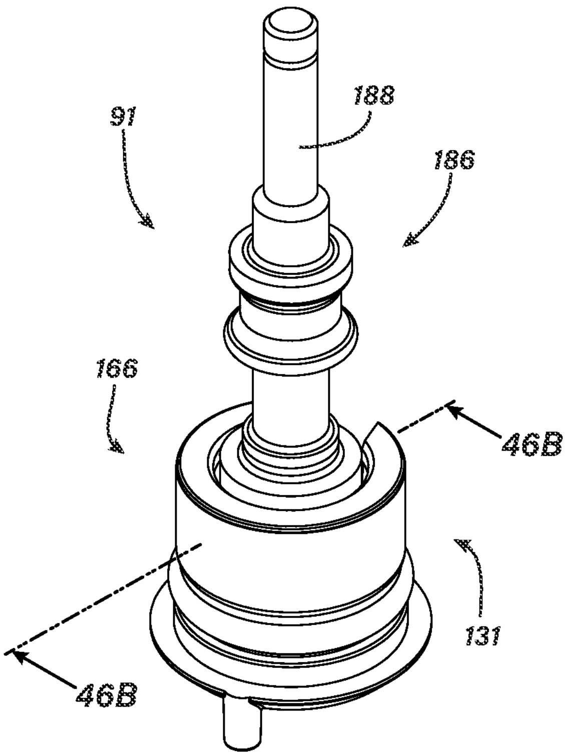
FIGS. 46A-46B illustrate various aspects of the cooperative adaptation of the flow control valve trim assembly and the selector valve trim assembly, in a first state of operation, where.
Figure 46B:
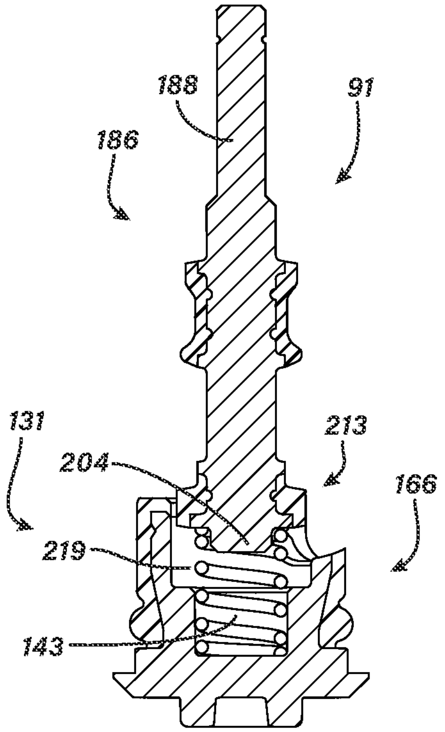
Figure 47A:
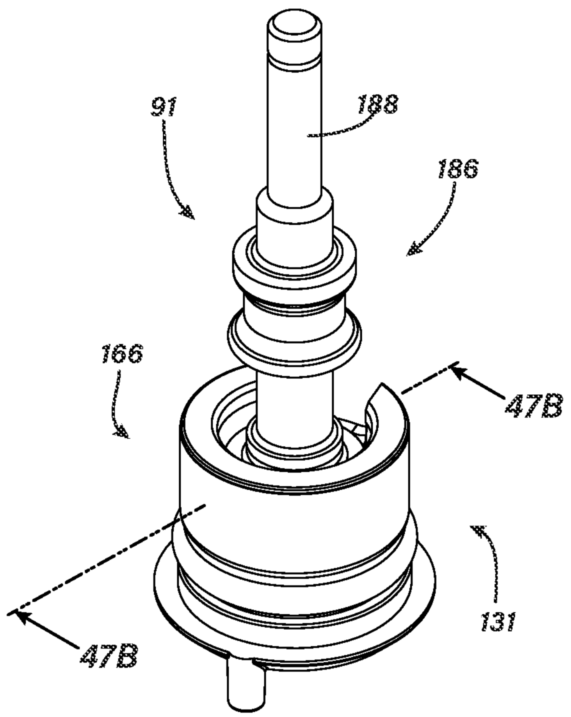
FIGS. 47A-47B illustrate various aspects of the cooperative adaptation of the flow control valve trim assembly and the selector valve trim assembly, in a second state of operation, where.
Figure 47B:
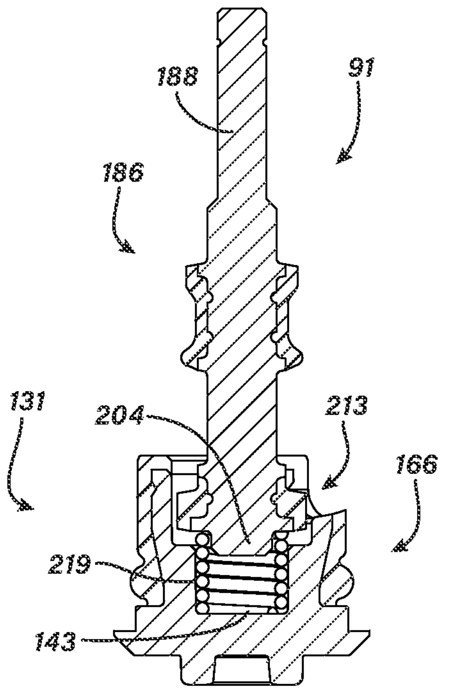

Referring now to the corresponding fully exploded views of FIGS. 44-45, the composite valve trim arrangement 91 is shown to comprise just three separable components, including the fully integral selector valve trim assembly 131, for implementation of diluent selector valves 130*a*-130*j*, and a flow control valve trim assembly 186, for implementation of flow control valves 185*a*-185*j*. As previously described, the flow control valve trim assembly 186 comprises an integral valve stem assembly 187 and a poppet spring 219. As shown in FIGS. 44-45 and FIGS. 46A-46B and 47A-47B, an end of the poppet spring 219 is received within the open-topped cup 166 forming the selector valve trim assembly 131, and is captured within the cylindrical receptacle 143 provided therefor through the bottom 141 of the cylindrical chamber 139. As previously described, the opposite end of the poppet spring 219 is engaged by the downwardly projecting protuberance 204 provided therefor at the bottom end 203 of the valve stem 188. As particularly shown in FIGS. 46B and 47B, the second, lower reciprocating sealing member 213 of the integral valve stem assembly 187 operates, as previously described, within the third valve body working segment of the valve unit 90*d*, as defined by the cylindrical interior wall 140 about the cylindrical chamber 139 of the open-topped cup 166. FIG. 46B shows the composite valve trim arrangement 91 as in a first operational state, wherein the flow control valve 185*d* is at rest in the OFF, or closed, configuration. FIG. 47B, on the other hand, shows the composite valve trim arrangement 91 as in a second operational state, wherein the integral valve stem assembly 187 has been operated to press against the poppet spring 219 and further into the third valve body working segment of the valve unit 90*d*, thereby actuating the flow control valve 185*d* in the ON, or open, configuration.

Figure 48:
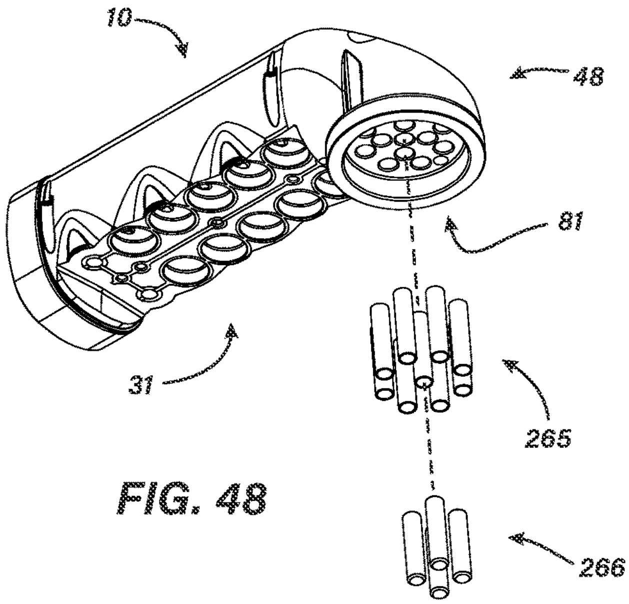
FIGS. 48-49 illustrate a selectively implementable preliminary stage of assembly of the preferred embodiment of the hand-held beverage dispenser, where.
Figure 49:
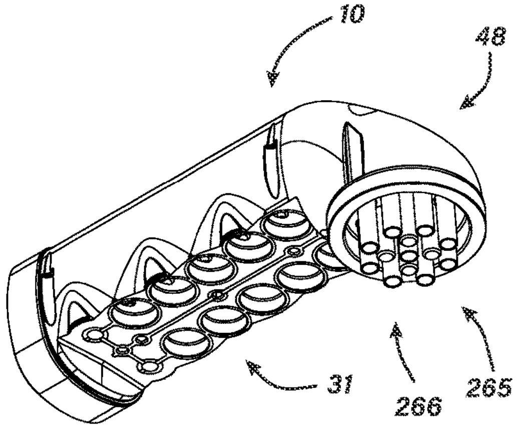
Figure 50:
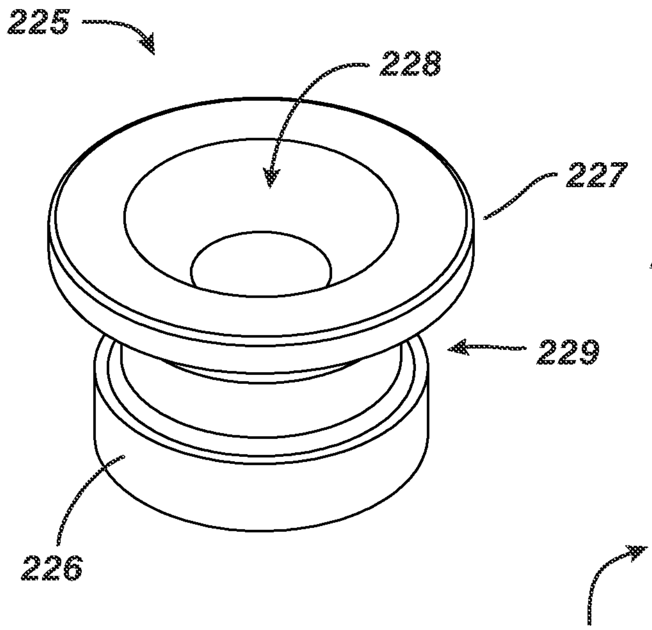
FIGS. 50-53 illustrate an upper seal of the valve unit of the hand-held beverage dispenser, where.
Figure 51:
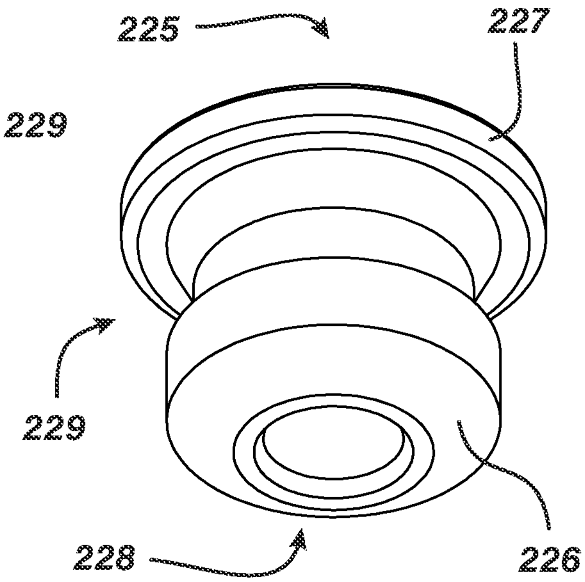
Figure 52:
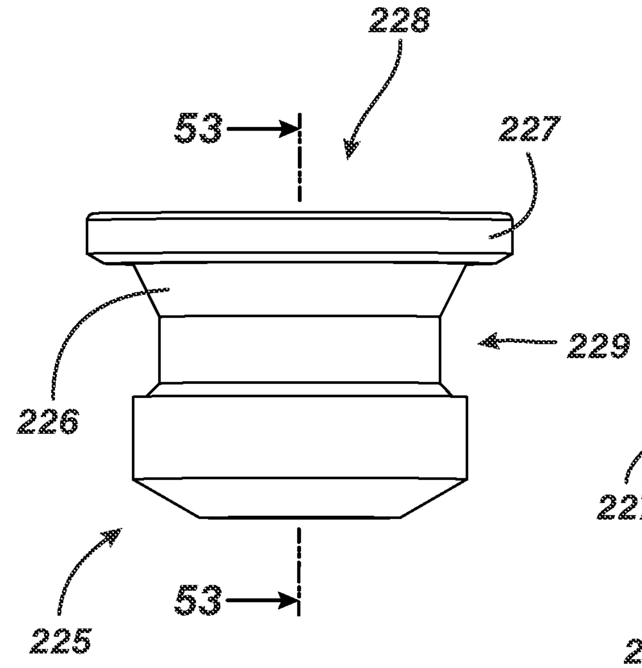
Figure 53:
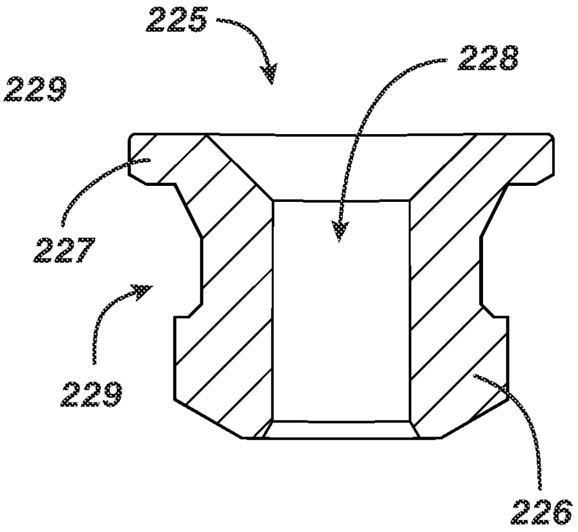
Figure 54:
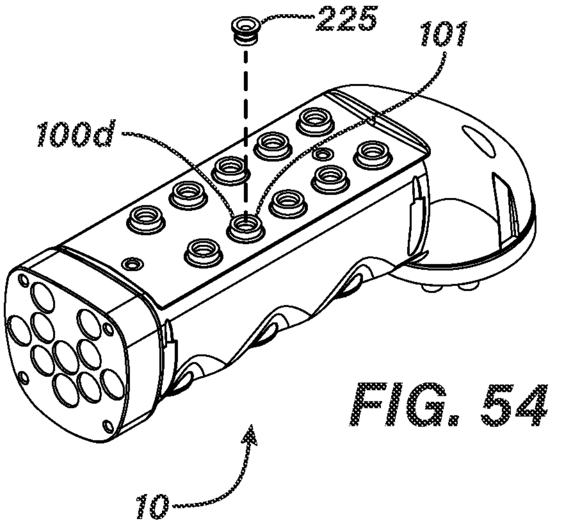
FIGS. 54-57 illustrate the handle body and the upper seal of a valve unit in a first stage of assembly of the preferred embodiment of the hand-held beverage dispenser, where.

In a selectively implementable preliminary stage of assembly of the preferred embodiment of the hand-held beverage dispenser 5 of the present invention, as particularly illustrated in FIGS. 48-49, a multiplicity of connector tubes 265 may be press fit into the various fluid outlets 81 as necessary or otherwise desired, for example to provide or enhance compatibility with fluid connectors or other aspects of the particular mixer subassembly 276 of the post-mix type drink dispenser assembly 275 selected for use in connection with the hand-held beverage dispenser 5 of the present invention. Additionally, or alternatively, rods 266 may be provided and similarly attached to the handle body 10 to plug or otherwise close unused inlets of the utilized mixer subassembly 276. In order to prevent damage to more delicate components of the hand-held beverage dispenser 5 during press fit of like attachment operations, it may be preferable if possible to complete any such manufacturing operations in an early stage of assembly prior to integration with the handle body 10 of any such delicate or otherwise likely to be damaged components.

Referring now to FIGS. 50-53, various details of the upper seal 225 for the exemplary valve unit 90*d* of the present invention are shown and described. In the preferred implementation of the valve unit 90*d* of the present invention, the upper seal 225 is formed as a grommet-shaped plug 226 comprising rubber or like material. The plug 226 is provided with a circumferential shoulder 227 about the top, which will be more fully described herein as resting upon the top 101 of the exemplary valve body 100*d* about the flow control valve actuator orifice 102 when operably placed for use. As previously noted, the plug 226 comprises a central orifice 228 running longitudinally through the plug 226 and sized, shaped or otherwise adapted to slidingly but sealingly engage a coextensive length of the outer surface of the upper portion 189 of the generally cylindrical valve stem 188. As particularly shown in FIGS. 51 and 53, the bottom edge of the central orifice 228 is preferably chamfered or otherwise relieved to prevent loss of integrity or other damage to the upper seal 225 during assembly of the valve unit 90*d*. The top edge of the central orifice 228 may also be chamfered or otherwise relieved as necessary or otherwise desired in a particular implementation as shown in the figures. The plug 226 also has a retention groove 229 formed about the midsection of the plug 226, which is sized, shaped or otherwise adapted to engage the corresponding annulus 103 formed within the flow control valve actuator orifice 102 of the exemplary valve body 100*d*. As will be appreciated by those of ordinary skill in the relevant arts in view of this exemplary description, the described arrangement of the upper seal 225 and flow control valve actuator orifice 102 firmly secures the plug 226 operably in place when the central orifice 228 is occupied by the upper portion 189 of the valve stem 188.

Figure 55:
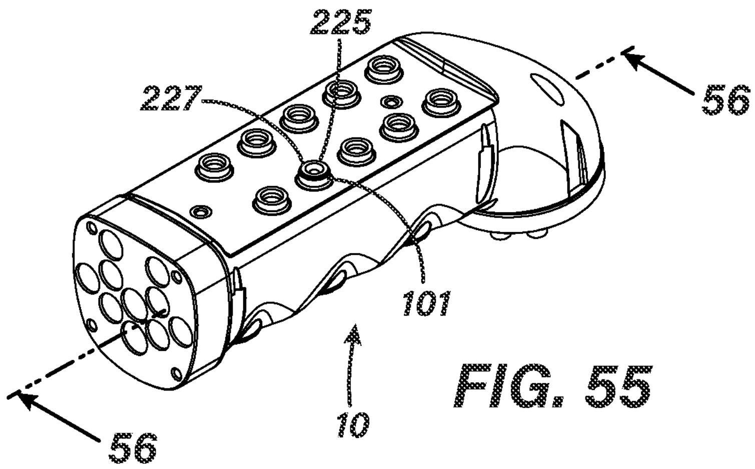
Figure 57:
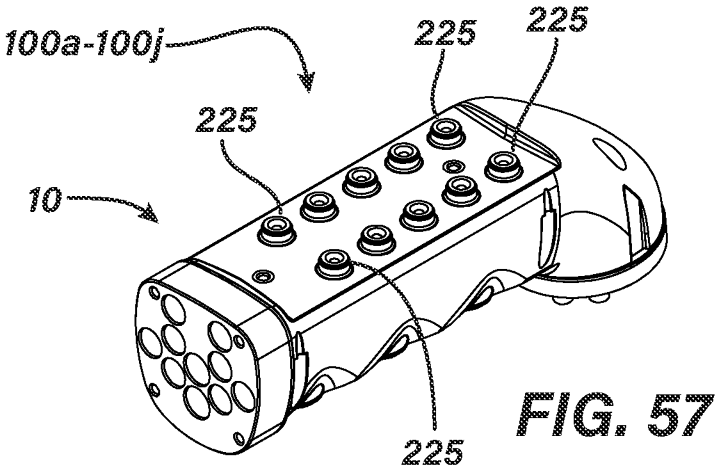
Figure 56:
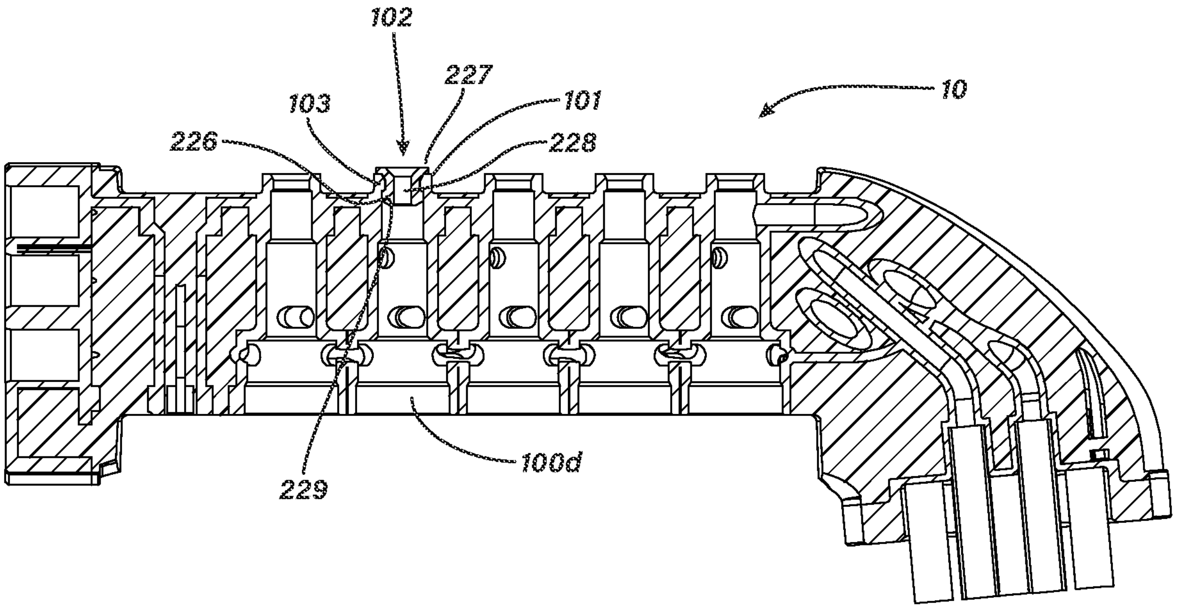

As illustrated in FIGS. 54-57, a first stage of assembly of the hand-held beverage dispenser 5 according to the preferred embodiment of the present invention begins with insertion of an upper seal 225 for the flow control valve 185*d* into the flow control valve actuator orifice 102 of the exemplary valve body 100*d*. Upon application of gentle top down force, such as by a thumb press, the upper seal 225 of the flow control valve 185*d* will readily take the correct position within the flow control valve actuator orifice 102 of the exemplary valve body 100*d*, with the retention groove 229 fully engaged by the annulus 103 formed within the flow control valve actuator orifice 102, and the circumferential shoulder 227 resting securely at the top 101 of the exemplary valve body, as shown in FIGS. 55-56. This process for operably placing the upper seal 225 substantially within the exemplary valve body 100*d* is then repeated until each of the valve bodies 100*a*-100*j* is fitted with an upper seal 225, as shown in FIG. 57.

Figure 58:
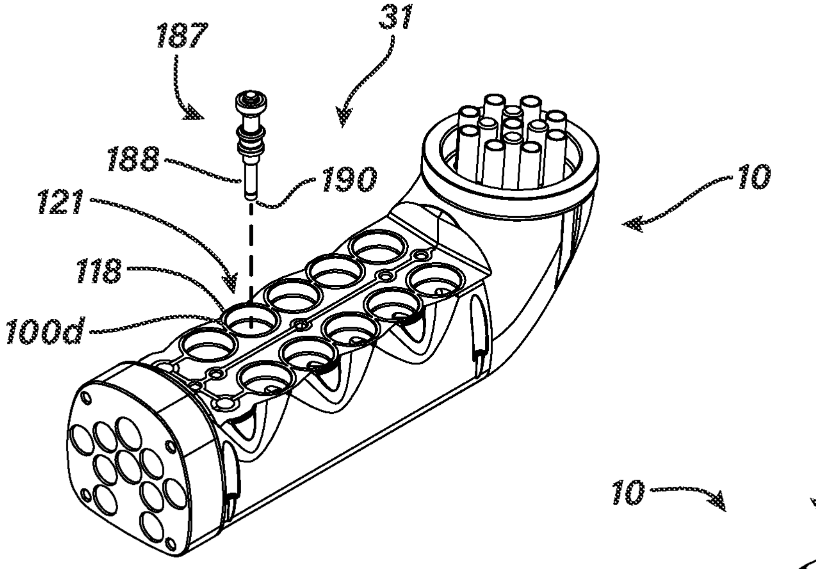
FIGS. 58-60 illustrate population of an inverted handle body with the integral valve stem assembly of the flow control valve trim assembly, in a second stage of assembly of the preferred embodiment of the hand-held beverage dispenser, where.
Figure 59:
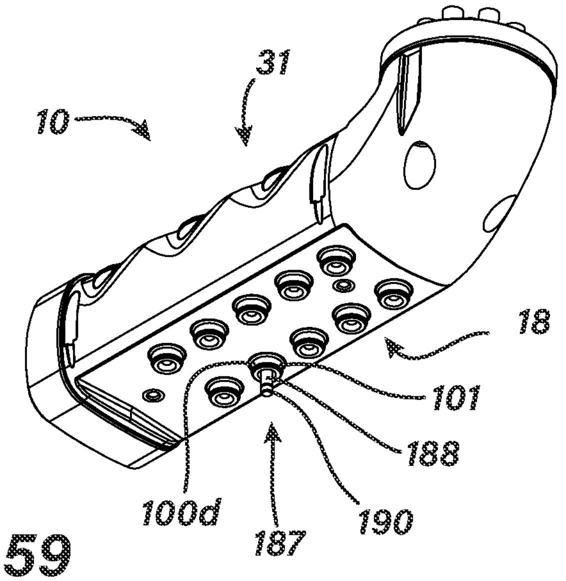
Figure 60:
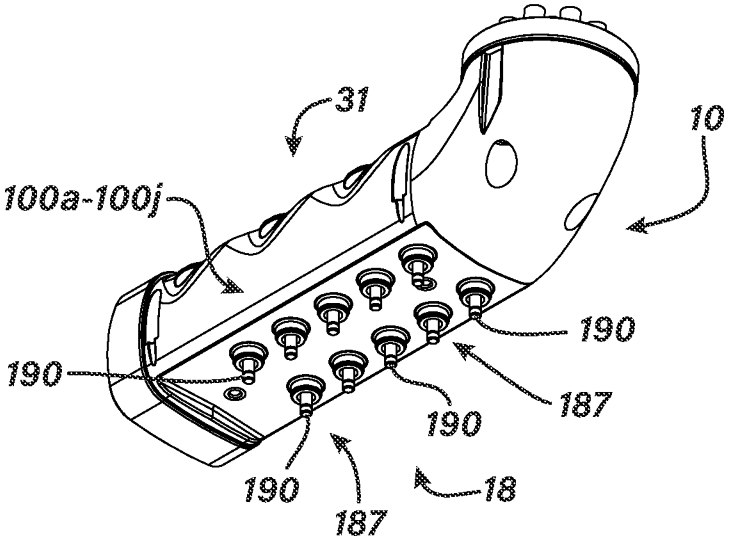
Figure 61:
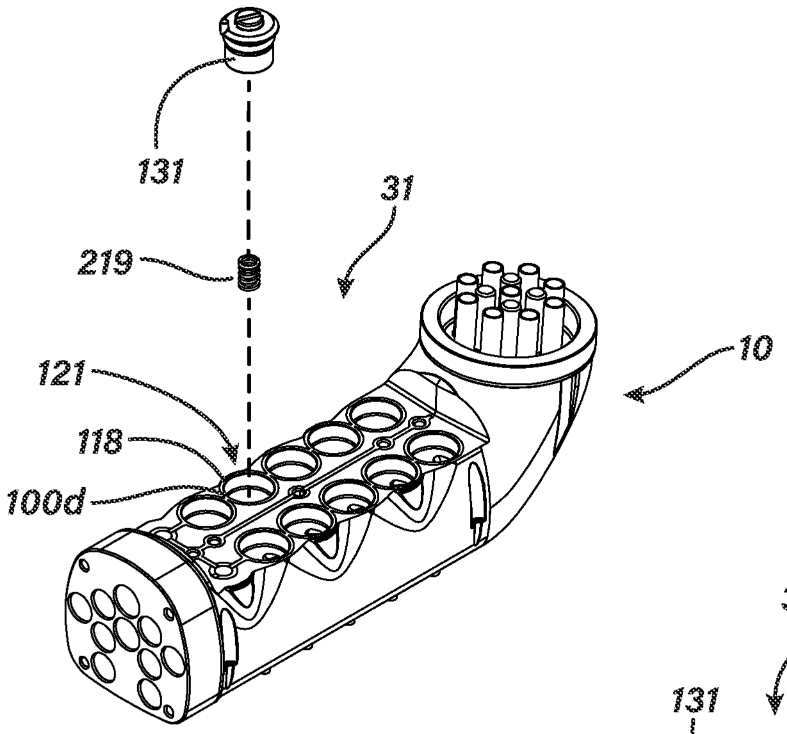
FIGS. 61-63 illustrate population of the inverted handle body with a fully integral selector valve trim assembly and a poppet spring of the flow control valve trim assembly, in the second stage of assembly of the hand-held beverage dispenser, where.
Figure 62:
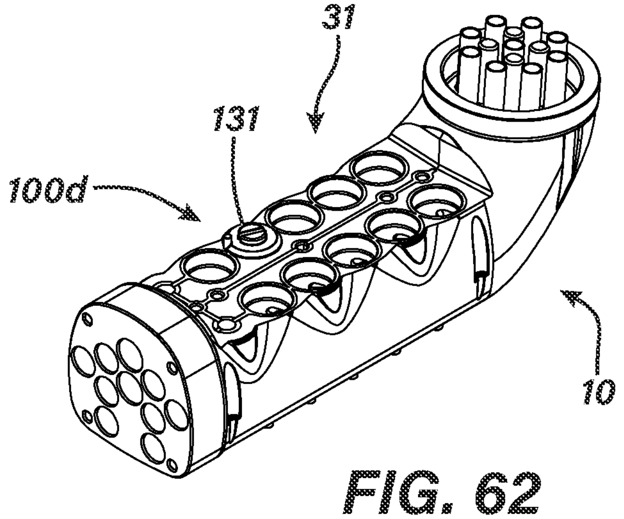
Figure 63:
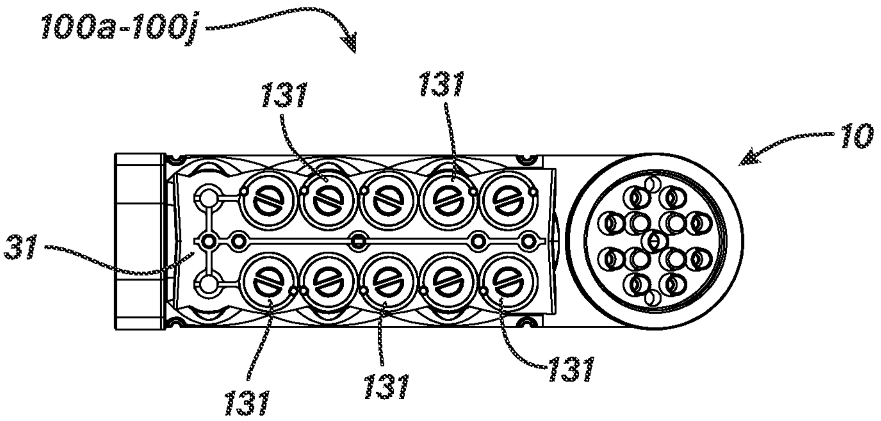

As particularly illustrated in FIGS. 58-60, a second stage of assembly of the hand-held beverage dispenser 5 according to the preferred embodiment of the present invention begins with insertion of an integral valve stem assembly 187 through the circular open end 121 at the bottom 118 of the valve body 100*d*, as shown in FIG. 58. The inserted integral valve stem assembly 187 is then manually or otherwise worked through the interior chambers of the valve body 100*d* until the top end 190 of the valve stem 188 passes through and emerges from the previously inserted upper seal 225 at the top 101 of the valve body 100*d*, as shown in FIG. 59. This process is then repeated until each of the valve bodies 100*a*-100*j* is populated with an integral valve stem assembly 187. As illustrated in FIGS. 61-63, the second stage of assembly of the hand-held beverage dispenser 5 then continues with placement of a poppet spring 219 followed by a fully integral selector valve trim assembly 131 through the circular open end 121 at the bottom 188 of the valve body 100*d*, as shown in FIG. 61, and firmly seating the selector valve trim assembly 131 in place, as shown in FIG. 62. This process is then repeated until each of the valve bodies 100*a*-100*j* is fully populated with a composite valve trim arrangement 91, including an integral selector valve trim assembly 131, flow control valve trim assembly 186 and a poppet spring 219, as shown in FIG. 63 illustrating the completion of stage two.

At this juncture in the assembly of the valve units 90*a*-90*j*, it is emphasized that as depicted in FIG. 63 each composite valve trim arrangement 91 is only initially placed within a respective valve body 100*a*-100*j*. Much of each composite valve trim arrangement 91 is merely resting in place, and the full composite valve trim arrangement 91 for each valve unit 90*a*-90*j* must be secured operatively in place within a respective valve body 100*a*-100*j*. In the exemplary implementation of the hand-held beverage dispenser 5 of the preferred embodiment the composite valve trim arrangements 91 are all simultaneously secured in place using an inventive purpose built composite valve trim retaining member 245, as particularly shown in FIGS. 64-66.

As previously noted, the composite valve trim retaining member 245 not only secures each composite valve trim arrangement 91 operably in place, but also constrains the range of movement in operation of the diluent selector valves 130*a*-130*j*. To doubly ensure clarity, it is emphasized that even with the composite valve trim retaining member 245 operably secured in place the full functionality of each of the diluent selector valves 130*a*-130*j* is accessible and freely usable. A diluent selection may be freely made notwithstanding that the hand-held beverage dispenser 5 of the preferred embodiment may be fully pressurized in fluid communication with provided beverage products and diluents. That said, however, the composite valve trim retaining member 245 is also cooperatively adapted, as more fully described herein, with the lower enclosure member 34 to implement both a failsafe ensuring a correct state for each of the diluent selector valves 130*a*-130*j* prior to normal use, and a configuration lock ensuring that no configuration of the diluent selector valves 130*a*-130*j* changes during normal use of the hand-held dispenser 5. In operation of the failsafe, the hand-held beverage dispenser 5 cannot be placed in normal use unless each diluent selector valve 130*a*-130*j* is in a proper, even if incorrect, operable configuration. Once the hand-held beverage dispenser 5 is properly configured in condition for normal use, however, the configuration lock restrains each diluent selector valve 130*a*-130*j* in the configuration selected at deployment. In the preferred exemplary implementation of the hand-held beverage dispenser 5, the failsafe acts on all of the diluent sector valves 130*a*-130*j* concurrently, and the configuration lock also acts on all of the diluent sector valves 130*a*-130*j* concurrently. Additionally, both the failsafe and the configuration lock are employed through a single otherwise required action of the user or other party responsible for configuration of the hand-held beverage dispenser 5.

Figure 64:
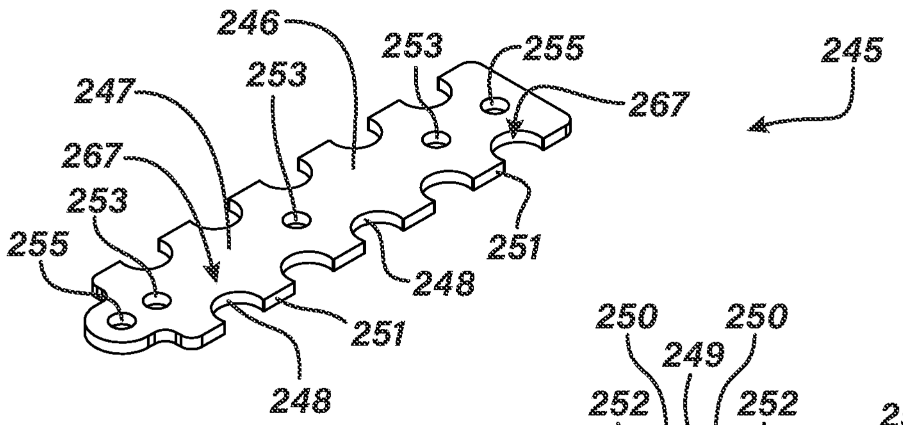
FIGS. 64-65 illustrate various aspects of a valve trim retaining member of the preferred embodiment of the hand-held beverage dispenser, where.
Figure 65:
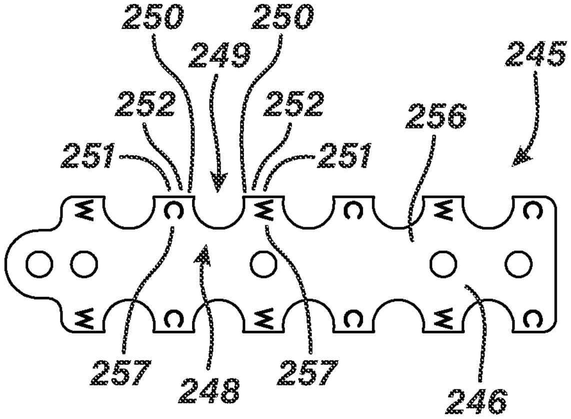

As partially shown in FIGS. 64-65 in particular, the specially formed novel composite valve trim retaining member 245 generally comprises a rigid plate 246 having various unitary, machined, milled, drilled or otherwise provided or formed holes, notches and other features for interoperability with the handle body 10, valve units 90*a*-90*j* and the lower enclosure member 34 for the handle body 10. The novel specially formed composite valve trim retaining member 245 primarily functions to secure each composite valve trim arrangement 91 operably in place within a corresponding one of the valve bodies 100*a*-100*j*, while nonetheless permitting operation of the diluent selector valves 100*a*-100*j*. In particular, the composite valve trim retaining member 245 allows, and provides, user access for sufficient rotation of each fully integral selector valve trim assembly 131 to enable straightforward ad hoc user selection of either the first diluent or the second diluent for each corresponding valve body 100*a*-100*j*. Although the composite valve trim retaining member 245 is cooperatively adapted with other features or aspects of the hand-held beverage dispenser 5 to implement important and inventive advancements in the relevant arts, each such implementation is fully realized without compromise of the preferred implementations of the systems, methods and articles implementing or contributing to the ad hoc diluent selection features according to the present invention.

The rigid plate 246 generally implementing the preferred embodiment of the composite valve trim retaining member 245 is sized, shaped or otherwise adapted to concurrently conformingly abut with the previously described substantially planar, annular engagement surface 158 formed about the downwardly projecting cylindrical protuberance 162 at a bottom side 161 of each of the diluent selector valves 130*a*-130. To this end, a preferably arcuate notch 248 is milled, drilled or otherwise provided or formed in the rigid plate 246 for each of the diluent selector valves 130*a*-130*j* of the hand-held beverage dispenser 5. Each of the arcuate notches 248 is bounded by a corresponding set of adjacent edge segments 251 of the rigid plate 246, which are specially formed of otherwise provided concomitantly with the provision of the arcuate notches 248.

Each arcuate notch 248 includes a circular end 267 that is sized, shaped or otherwise adapted to conformingly collar a portion of the downwardly projecting cylindrical protuberance 162 of the corresponding one of the diluent selector valves 130*a*-130*j*, in the general manner of a receptacle for a trunnion. Accordingly, each of the plurality of arcuate notches 248 is arranged about the rigid plate 246 such that the circular end 267 of the notch 248 is axially aligned with a corresponding one of the valve units 90*a*-90*j* when the composite valve trim retaining member 245 is operably in place at the bottom 31 of the handle body 10. As particularly shown in FIG. 65, each arcuate notch 248 may be formed as a major segment of a circle, whereby the ends 250 of the opening 249 to the arcuate notch 248, and thus also the corresponding ends 250 of the adjacent edge segments 251, are defined by the chord forming the arcuate notch 248. As will be better understood further herein, a portion of each adjacent edge segment 251 at a corresponding end 250 provides an alternative one of either a first or second stop 252 for the previously described downwardly projecting stop post 160 of a corresponding selector valve trim assembly 131.

Figure 66:
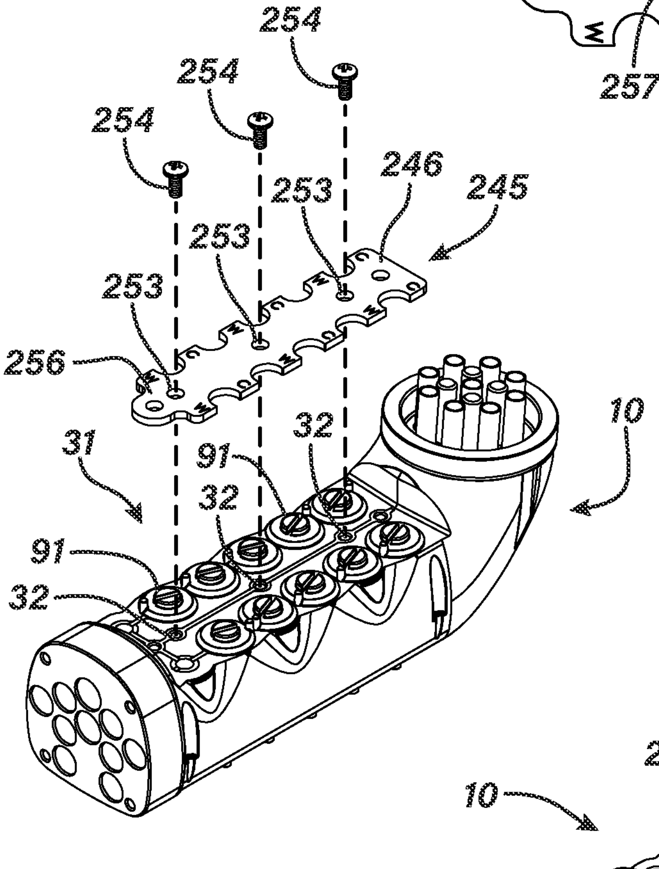
FIGS. 66-67 illustrate the inverted handle body and the valve trim retaining member in a third stage of assembly of the preferred embodiment of the hand-held beverage dispenser, where.
Figure 67:
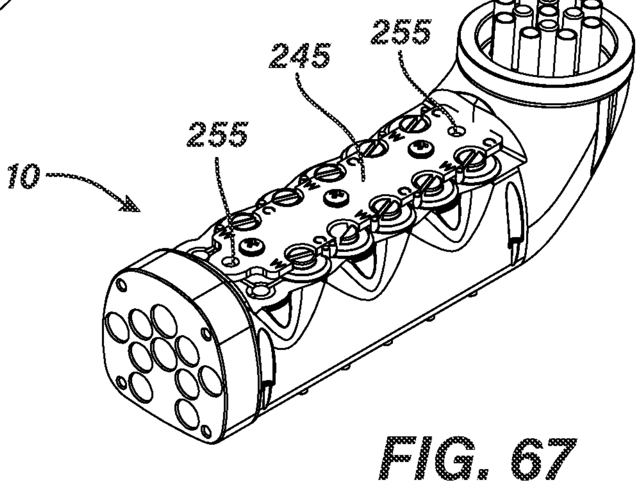

As shown and illustrated in FIGS. 64-66, a plurality of mounting holes 253 for the composite valve trim retaining member 245 are provided as otherwise conventional thread clearing holes through the rigid plate 246. Likewise, a corresponding plurality of otherwise conventional fasteners, such as the plurality of machine screws 254 depicted in FIGS. 66-67, are provided for releasably engaging the previously mentioned threaded holes 32, which are tapped, chased or otherwise formed in the bottom 31 of the handle body 10. As shown in FIGS. 64-67, a set of hardware pass-through holes 255, in addition to the plurality of mounting holes 253, are provided through the rigid plate 246 to facilitate attachment of the lower enclosure member 34, over and about and as cooperatively adapted with the composite valve trim retaining member 245, to the bottom 31 of the handle body 10. Like the composite valve trim retaining member 245, the lower enclosure member 34 is removably affixed to the bottom 31 of the handle body 10 utilizing otherwise conventional fasteners, such as the previously mentioned machine screws 44, for releasably engaging the also previously mentioned corresponding threaded holes 33, which are tapped, chased or otherwise formed in the bottom 31 of the handle body 10, as all will be better understood further herein.

The composite valve trim retaining member 245 also includes various indicia of alignment 257, as particularly shown in FIG. 65. In the exemplary implementation of the composite valve trim retaining member 245 of the preferred embodiment of the hand-held beverage dispenser 5, the provided indicia of alignment 257 particularly include the letter C, as the end user will be instructed and understand indicates a first diluent consisting of carbonated water, and the letter W, as the end user will be instructed and understand indicates a second diluent consisting of plain water. In any case and as illustrated in FIG. 65, the provided indicia of alignment 257 are arranged about the bottom side 256 of the rigid plate 246 of the of the composite valve trim retaining member 245, where about each particular indicium is located in close proximity to a single one of each previously described adjacent edge segment 251 of the rigid plate 246. As particularly shown in FIG. 65, the indicia of alignment 257 are alternately provided such that for each set of stops 252 corresponding to a particular one of the valve units 90*a*-90*j* one of the first and second stops 252 is identified as corresponding with the first diluent, which in this exemplary description consists of carbonated water, and the other of the first and second stops 252 is identified as corresponding with the second diluent, which in this exemplary description consists of plain water.

In any case, and as a matter of practical utility for the provided indicia of alignment 257, each set of the provided indicia of alignment 257 corresponding to a particular one of the valve units 90*a*-90*j* is formed, positioned and otherwise cooperatively adapted with a corresponding indicium of alignment 173 of the selector valve trim assembly 131 of the particular one of the valve units 90*a*-90*j*. As will be better understood further herein, the end user will be instructed and understand that the previously described downwardly projecting stop post 160 of each selector valve trim assembly 131 is to be utilized as an indicium of alignment 173 of the selector valve trim assembly 131. As also will be better understood further herein, the indicium of alignment 173 implemented by the downwardly projecting stop post 160 of each selector valve trim assembly 131 is indicative of the operable position of the previously described horizontally oriented notch 170 in the cylindrical valve gate 167 of the open-topped cup 166 of a particular one of the diluent selector valves 130*a*-130*j*.

Referring now to FIGS. 66-67 in particular, the composite valve trim retaining member 245 is operably affixed to the bottom 31 of the handle body 10 in a third stage of assembly of the hand-held beverage dispenser 5, whereby each of the initially placed composite valve trim arrangements 91, as depicted in FIG. 63, is secured operably in place to establish at this juncture fully functional valve units 90*a*-90*j*. As illustrated in FIG. 66, the composite valve trim retaining member 245 is generally affixed to the bottom 31 of handle body 10 by first placing the rigid plate 246 adjacent the initially populated handle body 10, taking care to ensure that each of the previously described cylindrical protuberances 162 of the diluent selector valves 130*a*-130*j* is received within a corresponding one of the arcuate notches 248 about the rigid plate 246 and axially aligned with the circular end 267 of the arcuate notch 248, and that the top side 247 of the rigid plate 246 rests in substantially planar engagement with each of the previously described annular engagement surfaces 158 formed about the downwardly projecting cylindrical protuberances 162. In order to achieve the correct application of the composite valve trim retaining member 245 about each selector valve trim assembly 131 according to the foregoing discussions, each selector valve trim assembly 131 must either be initially oriented in a proper selection state, or initially oriented with the previously discussed stop post 160 of the selector valve trim assembly 131 manually confined to its minor arc of travel between first and second stops 252, as correspondingly provided by the composite valve trim retaining member 245, and as will be better understood further herein. In any case, the provided machine screws 254 are conventionally utilized to secure the composite valve trim retaining member 245—as correctly applied about each selector valve trim assembly 131—to the bottom 31 of handle body 10, as particularly shown in FIG. 67.

Figure 68A:
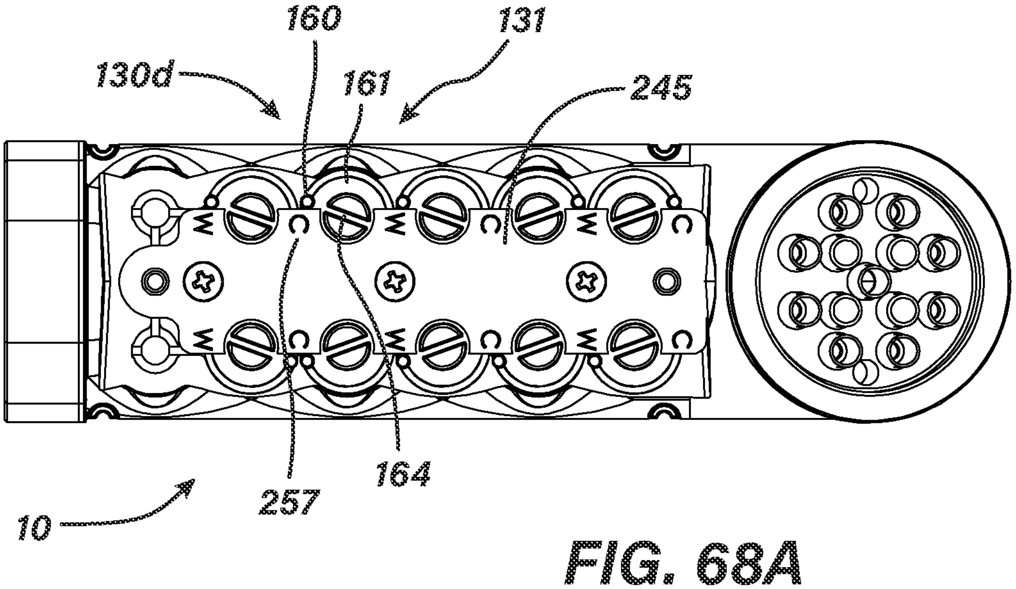
FIGS. 68A-68B are bottom plan views illustrating various aspects of the cooperative adaptation of the valve trim retaining member and a selector valve trim assembly in functional implementation of various aspects of the representative one valve unit, where.
Figure 68B:
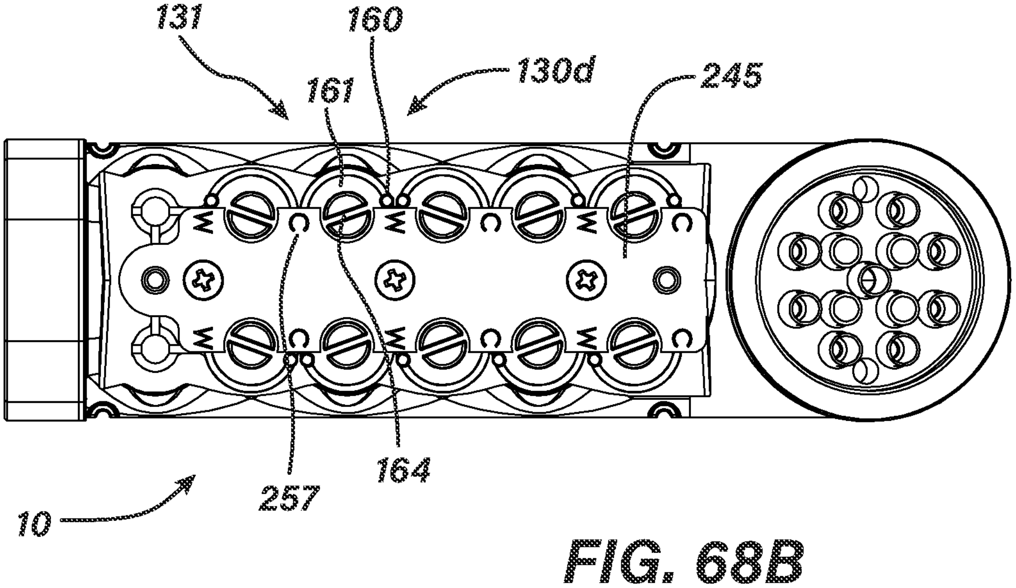

With the third stage of assembly completed, as illustrated in FIGS. 67 and 68A-68B, each of the valve units 90a-90j is in a fully functional configuration. Referring now to FIG. 68A in particular, the exemplary valve unit 90d is shown as configured to dispense a first diluent, which in the exemplary representation is carbonated water as indicated by the letter C. As particularly illustrated in FIG. 68A, the downwardly projecting stop post 160 for the exemplary diluent selector valve 130d, as implements the corresponding indicium of alignment 173 for the diluent selector valve 130d, is positioned adjacent the one of the corresponding stops 252 most proximate to the particular corresponding indicium of alignment 257 of the composite valve trim retaining member 245 comprising the letter C. In FIG. 68B, on the other hand, the exemplary valve unit 90d is shown as configured to dispense a second diluent, which in the exemplary representation is plain water as indicated by the letter W. As particularly illustrated in FIG. 68B, the downwardly projecting stop post 160 for the exemplary diluent selector valve 130d, as implements the corresponding indicium of alignment 173 for the diluent selector valve 130d, is positioned adjacent the other one of the corresponding stops 252, which is in this case most proximate to the particular corresponding indicium of alignment 257 of the composite valve trim retaining member 245 comprising the letter W.

As will in light of this exemplary description be readily appreciated by those of ordinary skill in the art, the hand-held beverage dispenser 5 may be transitioned from the configuration of FIG. 68A, which represents a first state of the diluent selector valve 130d, to the configuration of FIG. 68B, which represents a second state of the diluent selector valve 130d, as well as from the second state of the diluent selector valve 130d back to the first state of the diluent selector valve 130d, by operation, from either depicted configuration, of the diluent selector valve 130d. To transition from the first state, as shown in FIG. 68A, to the second state, as shown in FIG. 68B, an end user simply uses a standard slotted screwdriver or like implement to otherwise conventionally engage the blind slot 164, as formed on the bottom face 163 of the cylindrical protuberance 162 of the composite valve trim arrangement 91 of the diluent selector valve 130d, to rotate the composite valve trim arrangement 91 clockwise, as viewed in FIGS. 68A-68B, causing the stop post 160 to swing along a minor arc beginning at the stop 252 corresponding to the first diluent, exemplified in FIG. 68A as consisting of carbonated water, until further clockwise rotation of the composite valve trim arrangement 91 is arrested as the stop post 160 is blocked by the stop 252 corresponding to the second diluent, exemplified in FIG. 68B as consisting of plain water. Alternatively, to transition from the second state, as shown in FIG. 68B, to the first state, as shown in FIG. 68A, an end user uses the standard slotted screwdriver or other selected implement, as operably engaged with the blind slot 164, to rotate the composite valve trim arrangement 91 of the diluent selector valve 130d counterclockwise, as viewed in FIGS. 68A-68B, causing the stop post 160 to swing along the minor arc beginning at the stop 252 corresponding to the second diluent, exemplified in FIG. 68B as consisting of plain water, until further counterclockwise rotation of the composite valve trim arrangement 91 is arrested as the stop post 160 is blocked by the stop 252 corresponding to the first diluent, exemplified in FIG. 68A as consisting of carbonated water.

At this juncture, it is particularly emphasized that in the stage of assembly depicted in FIGS. 68A-68B each stop post 160, as provided in connection with any particular diluent selector valve 130a-130j, is limited to travel along a minor arc between adjacent stops 252 corresponding to the particular diluent selector valve 130a-130j, whereas travel along the major arc is precluded by the presence of the rigid plate 246 of the composite valve trim retaining member 245. Additionally, it is noted that each selector valve trim assembly 131 is cooperatively adapted with the composite valve trim retaining member 245 such that each operating state of a diluent selector valve 130a-130j corresponds to a configuration of the diluent selector valve 130a-130j wherein the stop post 160 of the diluent selector valve 130a-130j is in contact with a corresponding one of the adjacent stops 252. That said, it is again emphasized that the composite valve trim retaining member 245 not only secures each composite valve trim arrangement 91 operably in place, but also constrains the range of movement in operation of the diluent selector valves 130a-130j. The composite valve trim retaining member 245 also facilitates user selection of a diluent by providing positive tactile indication that a proper selection state is selected as a stop post 160 rotates into contact with an adjacent stop 252. Still further, the composite valve trim retaining member 245 additionally facilitates user selection of a diluent by providing a clear visual indication of which diluent is selected. To this point it is noted that the composite valve trim retaining member 245, as presents the visual indications identifying alternative diluents as the implemented indicia of alignment 257, is readily removed and replaced in order to present any chosen indicia of alignment 257, such as may accommodate variance of provided diluents, alternative languages, a desire to utilized symbols, or any other indication providing practical utility.

In order to reinforce the foregoing discussions as particularly directed toward operations of the diluent selector valves 130a-130j relative to the composite valve trim retaining member 245, as well as to emphasize various aspects of the cooperative adaptation of the diluent selection valves 130a-130j and the composite valve trim retaining member 245 as particularly pertain to features of the hand-held beverage dispenser 5 discussed further herein, FIGS. 69A-69E and corresponding FIGS. 70A-70E illustrate the previously detailed fully integral valve trim assembly 131 of the exemplary diluent selector valve 130d and the rigid plate 246 embodying the composite valve trim retaining member 245. Although FIGS. 69A-69E and 70A-70E depict the fully integral valve trim assembly 131 and rigid plate 246 in isolation, the figures all show the fully integral valve trim assembly 131 and the rigid plate 246, each one relative to the other, in a proper operable configuration—that is, where each one is positioned relative to the other as would be properly positioned in a proper operable configuration within a fully assembled hand-held beverage dispenser 5 of the preferred embodiment, as deployed for use in a ready-to-dispense configuration. Each of the views of FIGS. 69A-69E depict the fully integral valve trim assembly 131 and the rigid plate 246 in an identical proper configuration, and FIGS. 70A-70E depict the fully integral valve trim assembly 131 and the rigid plate 246 in an identical proper configuration other than the configuration depicted in FIGS. 69A-69E. In particular, the views of FIGS. 69A-69E adhere to a first valid operable state of the diluent selector valve 130*d* as illustrated in FIG. 68A, wherein the exemplary valve unit 90*d* is properly configured to dispense a first diluent, which for purposes of the exemplary representation is carbonated water as indicated within the indicia of alignment 257 by the letter C. The views of FIGS. 70A-70E, on the other hand, adhere to a second valid operable state of the diluent selector valve 130*d* as illustrated in FIG. 68B, wherein the exemplary valve unit 90*d* is properly configured to dispense a second diluent, which for purposes of the exemplary representation is plain water as indicated within the indicia of alignment 257 by the letter W. Finally, the five viewpoints illustrated in FIGS. 70A-70E correspond sequentially with the same five viewpoints illustrated in FIGS. 69A-69E.

Referring now to FIGS. 69A-69E, as generally correspond to FIG. 68A, and to FIGS. 70A-70E, as generally correspond to FIG. 68B, the fully integral valve trim assembly 131 is shown as though the fully integral valve trim assembly 131 is rotatably received within the corresponding valve body 100*d*, and rotatably secured operably within the valve body 100*d* by the rigid plate 246 of the composite valve trim retaining member 245 as though the rigid plate 246 is affixed to the bottom 31 of the handle-body 10. As particularly shown in FIGS. 69A-69C and 70A-70C, the previously described cylindrical protuberance 162, as projects downwardly from the bottom side 161 of the fully integral selector valve trim assembly 131, is axially aligned with the previously described circular end 267 of a corresponding one of the arcuate notches 248 of the rigid plate 246, and at least a portion of the cylindrical protuberance 162 is collared by the circular end 267 of the corresponding one of the arcuate notches 248.

As illustrated in FIGS. 69B-69D and 70B-70D, neither the rotatably collared cylindrical protuberance 162 nor the previously discussed downwardly projecting stop post 160 of the fully integral selector valve trim assembly 131 projects below the rigid plate 246. Both the rotatably collared cylindrical protuberance 162 and the downwardly projecting stop post 160, however, project below the top side 247 of the rigid plate 246, as also illustrated in FIGS. 69B-69D and 70B-70D. In order then for the cylindrical protuberance 162 to be properly operably received within the arcuate notch 248, such that the top side 247 of the rigid plate 246 is in substantially flush engagement with the previously described substantially planar engagement surface 158 about the downwardly projecting cylindrical protuberance 162, the fully integral valve trim assembly 131 must be rotationally positioned relative to the rigid plate 246 such that the stop post 160 is not radially aligned with any portion of the rigid plate 246.

Figure 69A:
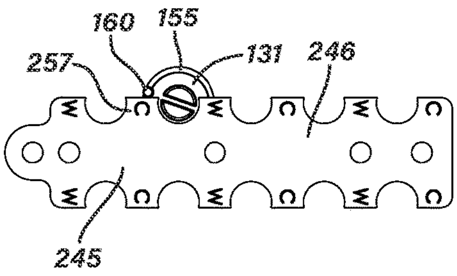
FIGS. 69A-69E illustrate the valve trim retaining member and the selector valve trim assembly of the representative one valve unit, as configured in the first operative state illustrated in FIG. 68A but, for clarity, depicted in isolation, and where.
Figure 69B:
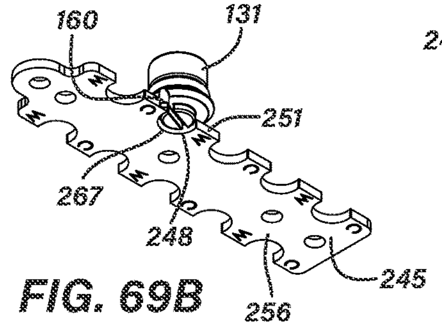
Figure 69C:
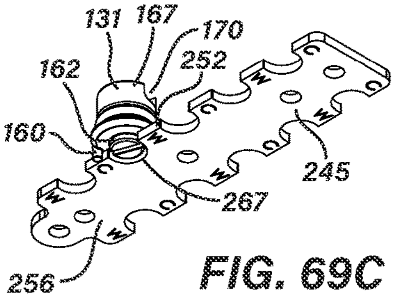
Figure 69D:
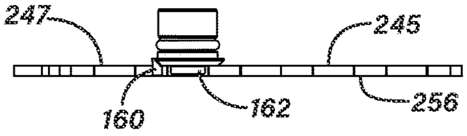
Figure 70A:
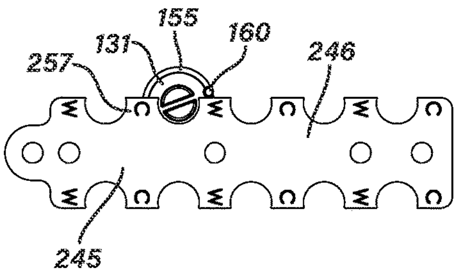
FIGS. 70A-70E illustrate the valve trim retaining member and the selector valve trim assembly of the representative one valve unit, as configured in the second operative state illustrated in FIG. 68B but, for clarity, depicted in isolation, and where.

With the composite valve trim retaining member 245 correctly placed about the selector valve trim assembly 131, as particularly illustrated in FIGS. 69A-69C and 70A-70C, it is clear that the rigid plate 246 limits the position of the stop post 160 to the minor arc of travel running generally along the circular bottom rim 159 of the previously described circumferential flange 155, as best shown in FIGS. 69A and 70A, between the two stops 252, as defined by the previously described adjacent edge segments 251 of the rigid plate 246, as best shown in FIGS. 69B-69C and 70B-70C. As should be understood, the composite posts valve trim retaining member 245, as heretofore described, only constrains the range of movement in operation of the diluent selector valves 130*d*, and in particular constrains the diluent selector valves 130*d* to bidirectional rotation between a first valid operable state of the diluent selector valve 130*d* and a second valid operable state of the diluent selector valve 130*d*.

In the previously discussed first valid operable state of the diluent selector valve 130*d*, corresponding to FIG. 68A and as illustrated in FIGS. 69A-69E, however, the downwardly projecting stop post 160 of the fully integral selector valve trim assembly 131 is positioned in contact with the stop 252 defined by the adjacent edge segments 251 of the rigid plate 246 most proximate to a first indicium of alignment 257 identifying the first diluent. For purposes of the exemplary representation, the first indicium of alignment 257 is the letter C, which is particularly shown in FIGS. 69A-69C as applied to or otherwise provided on the bottom side 256 of the rigid plate 246, where the first indicium of alignment 257 identifies the first diluent as carbonated water. In the previously discussed second valid operable state of the diluent selector valve 130*d*, corresponding to FIG. 68B and as illustrated in FIGS. 70A-70E, on the other hand, the downwardly projecting stop post 160 of the fully integral selector valve trim assembly 131 is positioned in contact with the stop 252 defined by the adjacent edge segments 251 of the rigid plate 246 most proximate to a second indicium of alignment 257 identifying the second diluent. For purposes of the exemplary representation, the second indicium of alignment 257 is the letter W, which is particularly shown in FIGS. 70A-70C as applied to or otherwise provided on the bottom side 256 of the rigid plate 246, where the second indicium of alignment 257 identifies the second diluent as plain water.

Figure 70B:
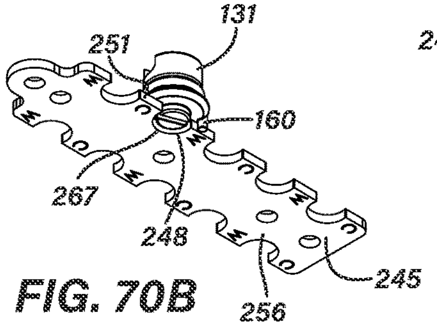
Figure 70C:
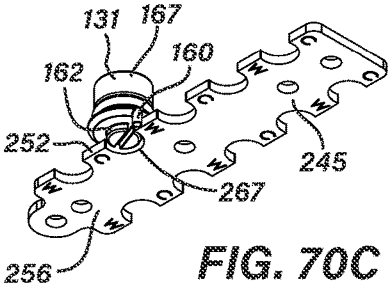
Figure 70D:
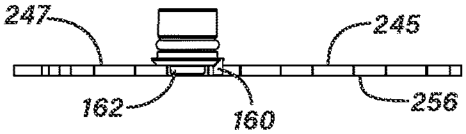

As shown in FIGS. 69C and 70B, and more particularly in FIG. 44, this particular exemplary implementation contemplates a horizontally oriented notch 170 in the upper edge 169 of the cylindrical valve gate 167 substantially opposite the location about the fully integral selector valve trim assembly 131 at which is provided the downwardly projecting stop post 160. It is noted that the downwardly projecting stop post 160 of the fully integral selector valve trim assembly 131 is indicative of the operable position of the horizontally oriented notch 170 of the cylindrical valve gate 167, to which end it affirms a condition of state, but in and of itself says nothing about the actual location of the horizontally oriented notch 170, or any other component. To be sure, the location about the fully integral selector valve trim assembly 131 for implementation of the downwardly projecting stop post 160 is a matter of best providing the various functionality of the stop post 160. The location about the fully integral selector valve trim assembly 131 for implementation of the horizontally oriented notch 170 in the upper edge 169 of the cylindrical valve gate 167, on the hand, is largely dictated by the requirements of implementing the very dense piping system 65 of the hand-held beverage dispenser 5 substantially within the extents of the handle body 10.

Figure 23:
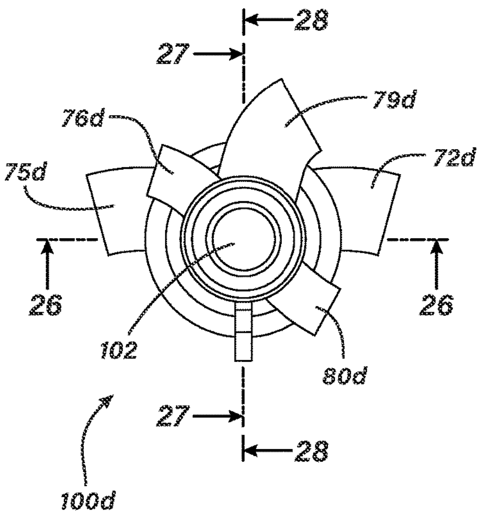
Figure 24:
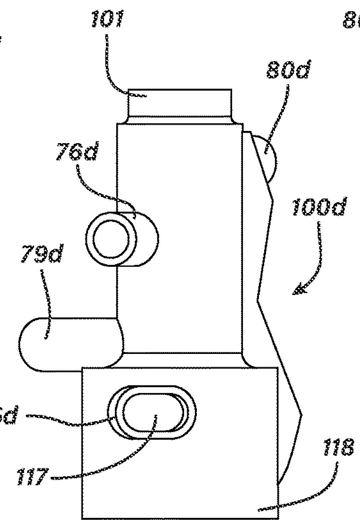
Figure 25:
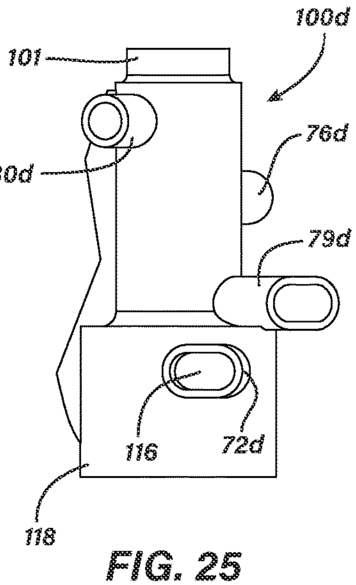
Figure 69E:
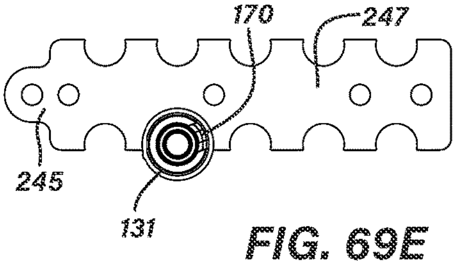
Figure 70E:
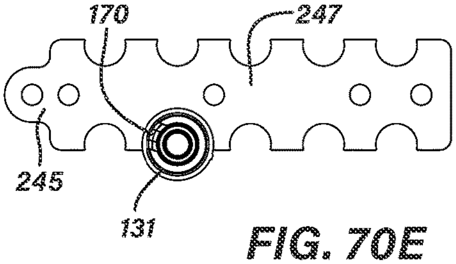
Figure 71:
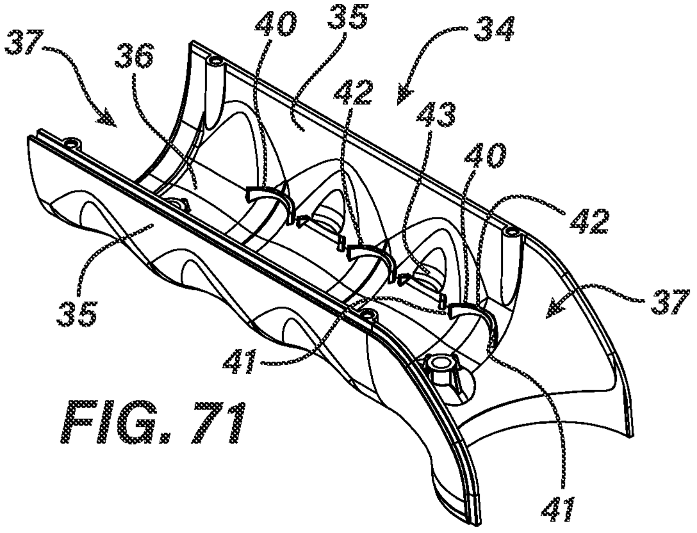
FIGS. 71-76 illustrate various aspects of a bottom enclosure member of the preferred embodiment of the hand-held beverage dispenser, where.

In the first valid operable state of the diluent selector valve 130*d*, the horizontally oriented notch 170 in the upper edge 169 of the cylindrical valve gate 167, as particularly shown in FIG. 69E, is operably aligned with the first diluent inlet port 116 of the valve body 100*d*, as particularly shown in FIG. 26, which is in fluid communication with a first valve supply branch 72*d* of the piping system 65 for conveying a first diluent to the diluent selector valve 130*d*, as particularly shown in FIG. 23. In the second valid operable state of the diluent selector valve 130*d*, the horizontally oriented notch 170 in the upper edge 169 of the cylindrical valve gate 167, as particularly shown in FIG. 70E, is operably aligned with the second diluent inlet port 117 of the valve body 100*d*, as particularly shown in FIG. 26, which is in fluid communication with a second valve supply branch 75*d* of the piping system 65 for conveying a second diluent to the diluent selector valve 130*d*, as particularly shown in FIG. 23. Selection of one or the other of the first and second valid operable states of the diluent selector valve 130*d* is effected, on an ad hoc basis, by simply rotating the fully integral valve trim assembly 131 clockwise or counterclockwise, as the case may be, until further rotation is blocked by contact between the downwardly projecting stop post 160 and the stop 252 corresponding to the newly selected valid operable state of the diluent selector valve 130*d*. In the simple to operate implementation according to the preferred embodiment of the diluent selector valve 130*d*, the end user can be confident that the diluent selector valve 130*d* has been set to a valid operable state, and that the desired diluent will be dispensed, upon no more than simply detecting the unmistakable blocking contact.

As previously noted in the overview discussions with particular reference to FIGS. 7-8, the lower enclosure member 34 of the preferably provided clamshell type housing assembly 17 not only covers and encases the lowermost portions of the composite valve trim arrangement 91 and the composite valve trim retaining member 245 during normal use of the hand-held beverage dispenser 5, but is also specially formed or otherwise cooperatively adapted with the composite valve trim retaining member 245 to implement both a configuration lock, whereby each diluent selector valve 130*a*-130*j* is restrained in the valid operable state for which each diluent selector valve 130*a*-130*j* is configured at deployment, and a failsafe, whereby the hand-held beverage dispenser 5 cannot be deployed in a normal, ready-to-use condition unless each of the diluent selector valves 130*a*-130*j* is in a proper operable configuration—that is, each of the diluent selector valves 130*a*-130*j* is properly configured for a valid operable state, even though the particular valid operable state for any one or more of the diluent selector valves 130*a*-130*j* may not be correct—that is, the valid operable state may not be that which the end user or other party responsible for configuration of the hand-held beverage dispenser 5 intends.

Referring then to FIGS. 71-76, a preferred implementation of the lower enclosure member 34, as may be formed as part of a clamshell type housing assembly 17 shown in FIGS. 1-3, is shown for the exemplary implementation of the hand-held beverage dispenser 5 as a single body manufacture generally comprising an aesthetically pleasing exterior, and including features for enhancing end-user experience with the hand-held beverage dispenser 5. For example, and as particularly shown in FIGS. 71-73, portions of the exterior of the lower enclosure member 34 are provided with knurls 45 or other features for facilitating a secure grasp by a user of the handle body 10 notwithstanding the generally fast-paced, and often wet, environments in which the hand-held beverage dispenser 5 will typically be used. To be sure, end users of beverage dispensers of the bar gun class will generally expect any commercially suitable offering to include exterior features in the general nature of the knurls 45 implemented in the hand-held beverage dispenser 5 according to the preferred embodiment of the present invention. That said, the knurls 45 as implemented in the ambidextrous grip 46 for the preferred embodiment of the hand-held beverage dispenser 5 are specially formed to also implement or otherwise be compatible with inventive aspects of the lower enclosure member 34 as provided on the interior side 37 of the lower enclosure member 34.

As particularly shown in FIGS. 71 and 74-76, the interior side 37 of the lower enclosure member 34 includes a plurality of upwardly projecting locking barriers 40 at a lower portion of the interior side 37 of the lower enclosure member 34 and adjacent each of the upwardly projecting side panels 35. As shown in the figures, each of the upwardly projecting locking barriers 40 is arcuate in form, and includes a top side 42 bounded by vertical ends 41 of the arcuate locking barrier 40. As additionally shown in the figures, however, an intermediate portion of at least some of the locking barriers 40, between the corresponding vertical ends 41, may be formed as or by interiorly bulging areas 43 of the interior side 37 of the lower enclosure member 34. As shown in FIGS. 71 and 74-76, but most particularly in FIG. 75, the interiorly bulging areas 43 are implemented through a special functional arrangement of the previously described otherwise aesthetic knurls 45.

Figure 72:
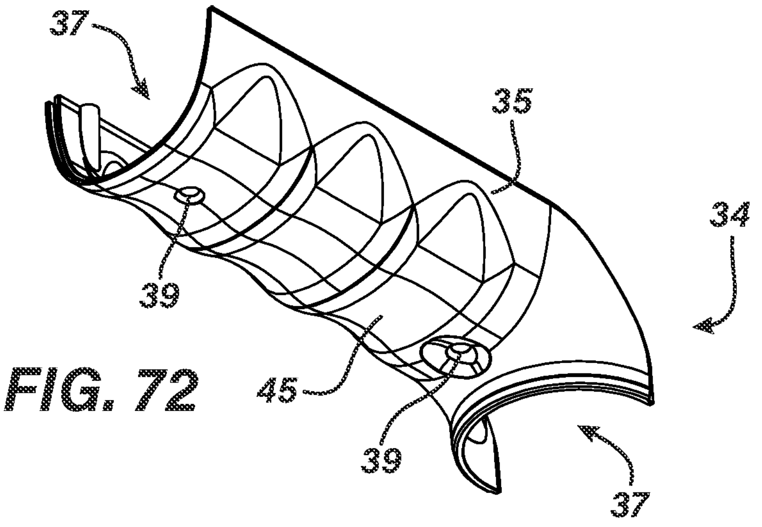
Figure 73:
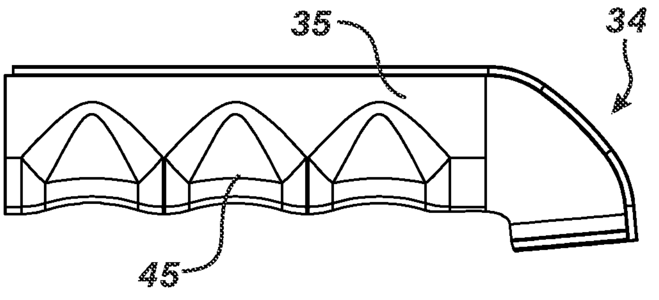
Figure 74:
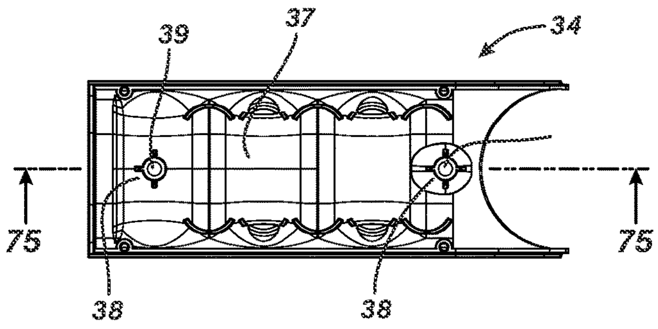
Figure 75:
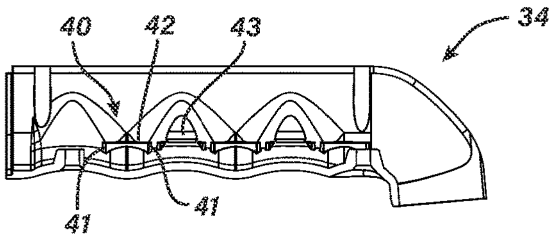
Figure 76:
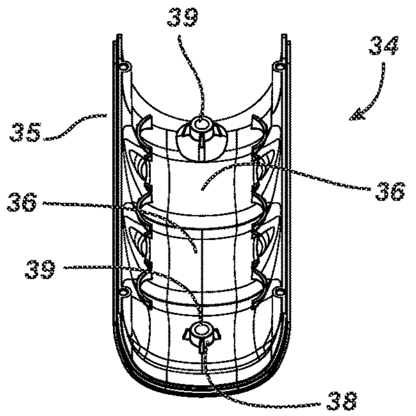

The lower enclosure member 34 also includes features for removably attaching the lower enclosure member 34 to the bottom 31 of handle body 10. For example, a plurality of mounting holes 39 for the lower enclosure member 34, as particularly shown in FIGS. 72 and 76 are provided as otherwise conventional thread clearing holes through the bottom panel 36 of the lower enclosure member 34 for passage of the threaded ends of the previously described machine screws 44 corresponding to the threaded holes 33 at the bottom 31 of handle body 10. As also shown in FIG. 72, the exterior end of each mounting hole 39 is most preferably countersunk as may be required to enable flush insertion of the machine screws 44 or other mounting hardware provided for the lower enclosure member 34, thereby ensuring that a user may comfortably grasp the handle body 10.

As previously described, the lower enclosure member 34 is attached in very close conformance about the lowermost flanged base portions 150 of the open-topped vessels 133 of the enclosed diluent selector valves 130*a*-130*j*, and is also cooperatively adapted with the composite valve trim retaining member 245 in implementation of both the previously noted failsafe and configuration lock for the diluent selector valves 130*a*-130*j*. As will be better understood further herein, the previously described locking barriers 40, including those portions thereof formed by the interiorly bulging areas 43 of the lower enclosure member 34, are particularly vertically spaced with respect to the rigid plate 246 implementing the composite valve trim retaining member 245 as the lower enclosure member 34 is operably affixed to the handle body 10. In order to maintain the required spatial relationship between the cooperatively adapted lower enclosure member 34 and the rigid plate 246, the mounting holes 39 are provided through upwardly projecting bosses 38 formed along the interior side 37 of the bottom panel 36 and spaced or otherwise adapted to align with the corresponding hardware pass through holes 255 in the composite valve trim retaining member 245, which in turn align with the corresponding threaded holes 33 in the bottom 31 of the handle body 10. Additionally, however, the bosses 38 also facilitate insertion of the machine screws 44 or like mounting hardware into the distally located threaded holes 33 at the bottom 31 of the handle body 10. For implementations where the lower enclosure member 34 is formed of plastics or like material, the provision of the bosses 38 also prevents flexing of the lower enclosure member 34 as likely to result in cracking or breaking of the lower enclosure member 34.

Figure 77:
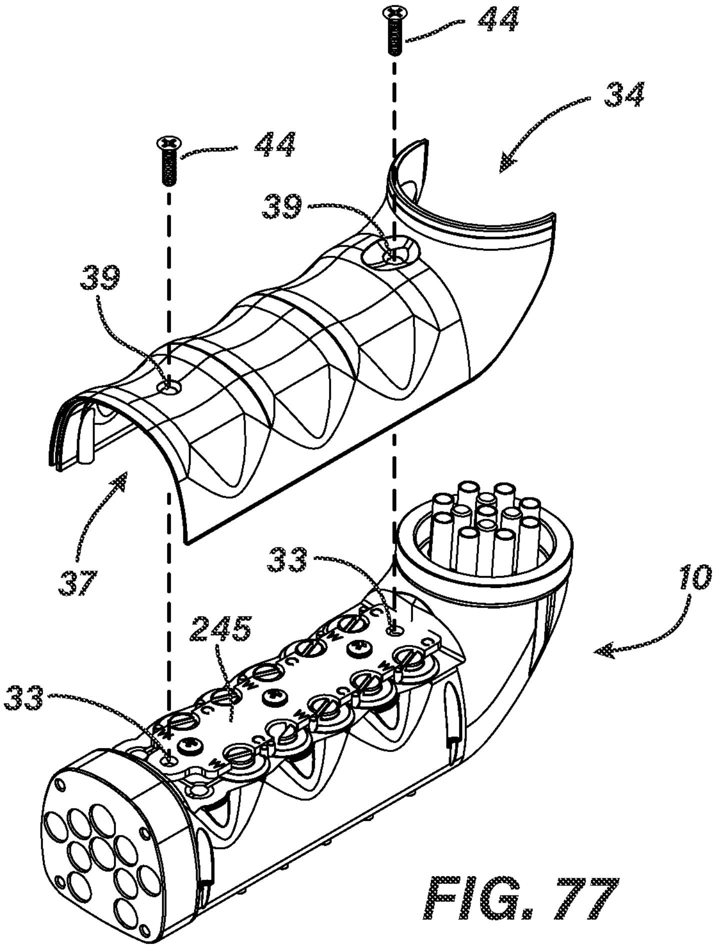
FIG. 77 is a partially exploded top rear end isometric view illustrating the inverted handle body and the bottom enclosure member, in a fourth stage of assembly of the preferred embodiment of the hand-held beverage dispenser.
Figure 78:
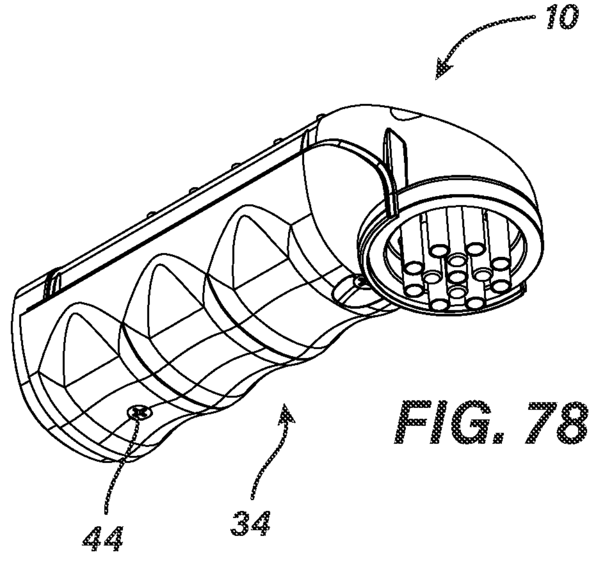
FIG. 78 is a bottom front end isometric view illustrating the handle body and the bottom enclosure member, on completion of the fourth stage of assembly of the preferred embodiment of the hand-held beverage dispenser

In a fourth stage of assembly of the hand-held beverage dispenser 5 according to the preferred embodiment of the present invention illustrated in FIGS. 77-78 the lower enclosure member 34 is removably affixed to the bottom 31 of the handle body 10. As particularly shown in FIG. 77, conventional fasteners, such as the previously mentioned machine screws 44, releasably engage the corresponding threaded holes 33 in the bottom 31 of the handle body 10. Each machine screw 44 passes through the corresponding mounting hole 39 through the bottom panel 36, and extending through the boss 38 of the lower enclosure member 34, and then through the corresponding hardware pass-through hole 255 in the rigid plate 246 of the composite valve trim retaining member 245, and finally into threaded engagement with the corresponding threaded hole 33 formed in the bottom 31 of the handle body 10, all of which are axially aligned in the assembled hand-held beverage dispenser 5, as represented in FIG. 78. As illustrated in FIG. 78, the lower enclosure member 34, composite valve trim retaining member 245 and the handle body 10 are operably attached each one to each other, including the upwardly projecting locking barriers 40 and interiorly bulging areas 43 of the interior side 37 of the lower enclosure member 34 and the corresponding features of each valve unit 90*a*-90*j*. To remove the lover enclosure member 34, however, as will be more fully described herein as a necessary step in the selection of a new state of operation for the diluent selector valves 130*a*-130*j*, the machine screws 44 or other conventional hardware are removed and the lower enclosure member 34 is simply pulled away or otherwise separated from the handle body 10 of the hand-held beverage dispenser 5.

Figure 79:
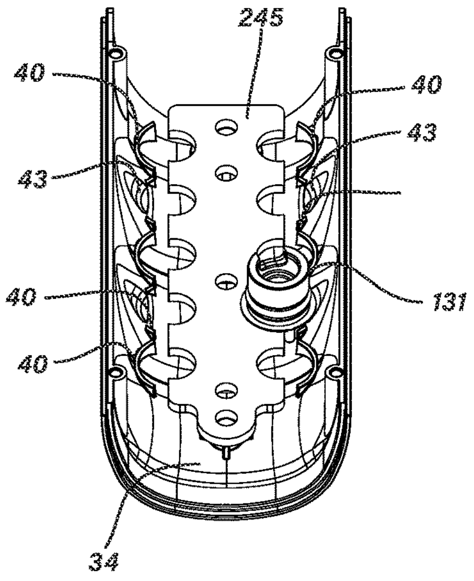
FIGS. 79-81 illustrate the bottom enclosure member, the valve trim retaining member and the selector valve trim assembly of the representative one valve unit, as arranged in the fourth stage of assembly as illustrated in FIG. 78 but, for clarity, depicted in isolation, and where.
Figure 80:
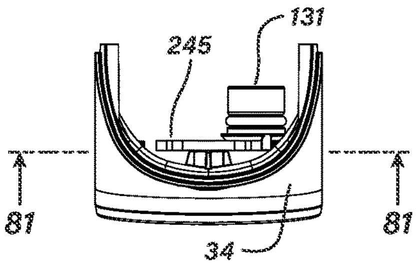
Figure 81:
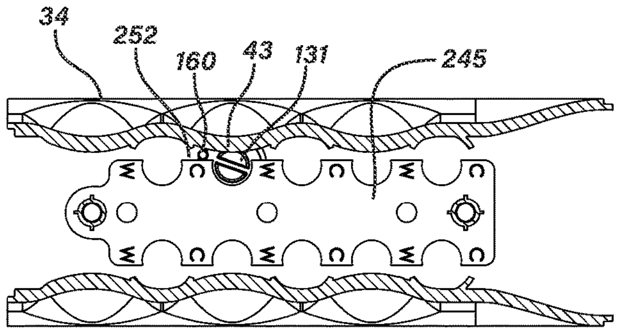

FIGS. 79-80 show the fully integral selector valve trim assembly 131 of the exemplary diluent selector valve 130*d*, the rigid plate 246 implementing the composite valve trim retaining member 245, and the lower enclosure member 34 in isolation, in the general manner of the features illustrated in FIGS. 69A-69E, and wherein the fully integral selector valve trim assembly 131, the rigid plate 246 and the lower enclosure member 34 are all illustrated, each one relative to each other one, in the proper operable configuration as previously described with particular reference to FIG. 68A. FIG. 81 shows a cross-sectional view of the components, and FIGS. 82A-82B show the cross-sectional view from other viewpoints.

Figure 82A:
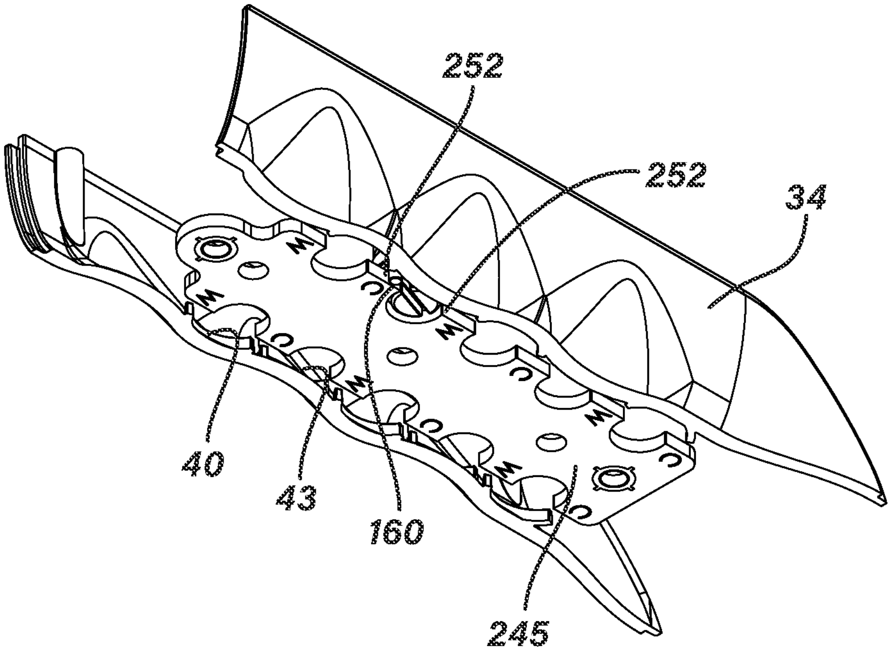
FIGS. 82A-82B are partially cut away views, corresponding to the cross-sectional view of FIG. 81, illustrating various aspects of the isolated bottom enclosure member, the valve trim retaining member and the selector valve trim assembly of the representative one valve unit, as arranged in the fourth stage of assembly as illustrated in FIG. 78, and where.
Figure 82B:
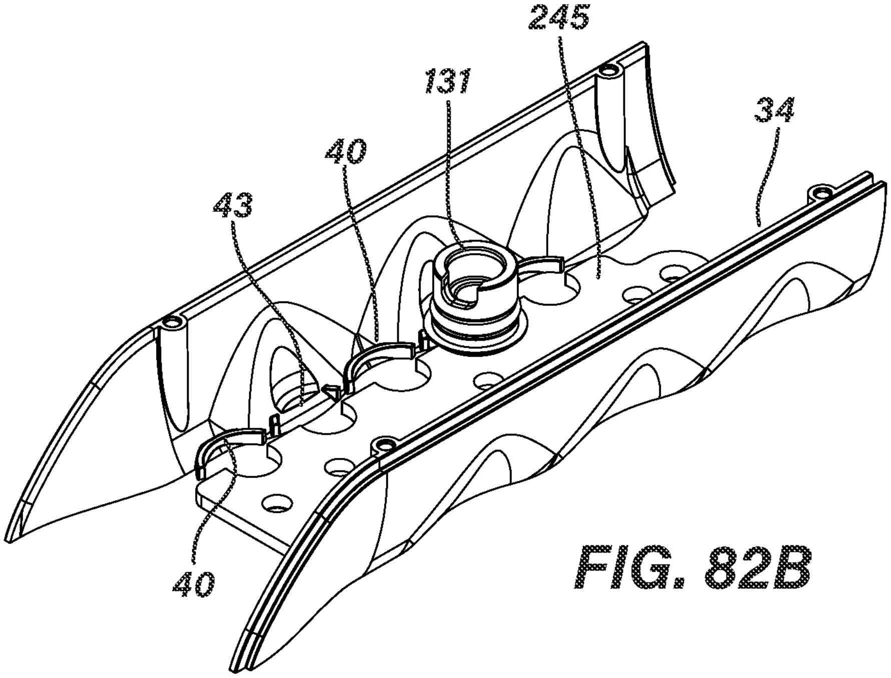

As shown in FIGS. 81 and 82A-82B, the upwardly projecting locking barriers 40 and interiorly bulging areas 43 of the lower enclosure member 34 together with the stops 252 formed by the rigid plate 246 implementing the composite valve trim retaining member 245, as operably assembled with the diluent selector valve 130*d* clearly cooperate to fully restrain any rotation of the diluent selector valve 130*d*. Additionally, as is particularly clear with reference to FIGS. 82A-82B, the lower enclosure member 34 is prevented from operably engaging with and about the composite valve trim retaining member 245, and thus the handle body 10, in any configuration wherein the downwardly projecting stop post 160, as carried by the diluent selector valve 130*d*, is rotated into any position other than as configured in either the first operable state, as shown in FIGS. 69A-69E, or the second operable state, as shown in FIGS. 70A-70E.

Figure 83A:
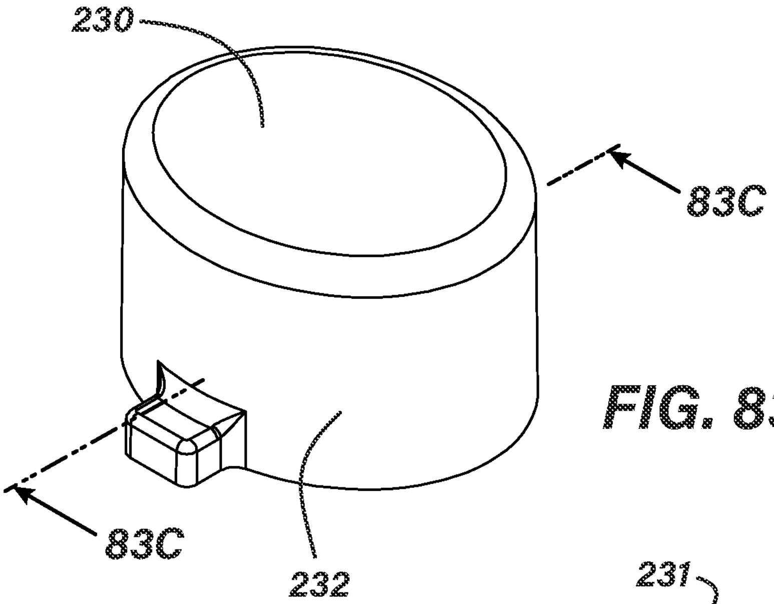
FIGS. 83A-83C illustrate a first exemplary button cap of the hand-held beverage dispenser, where.
Figure 83B:
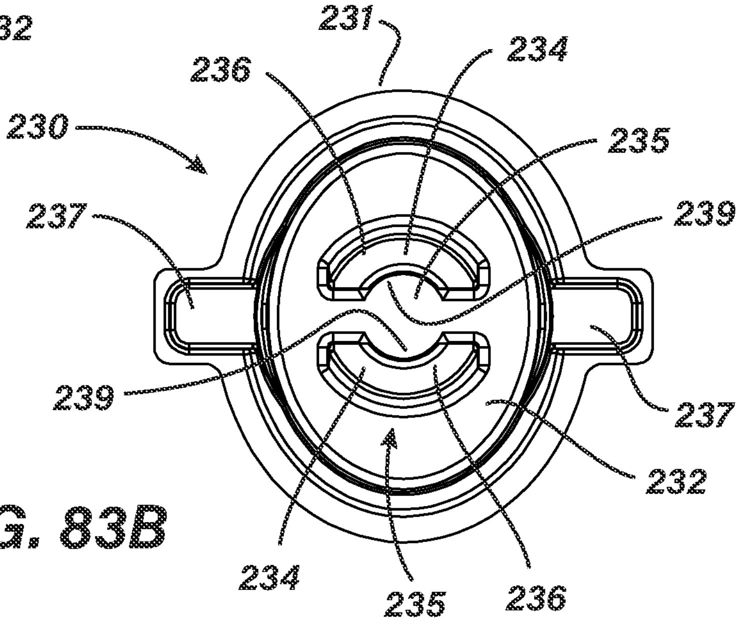
Figure 83C:
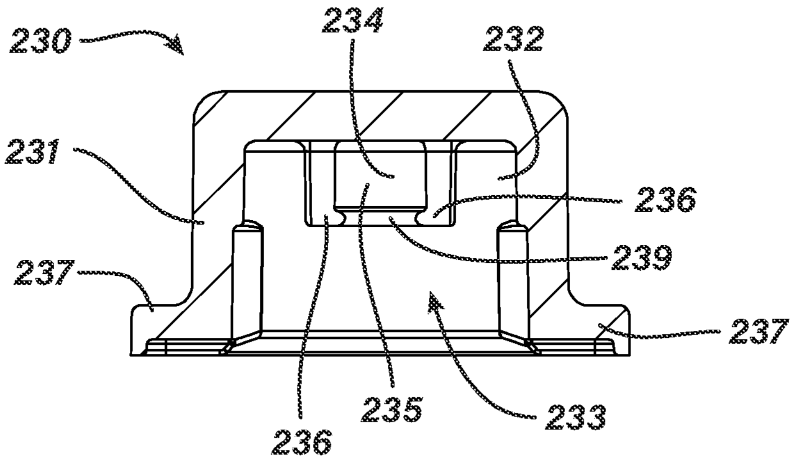
Figure 85:
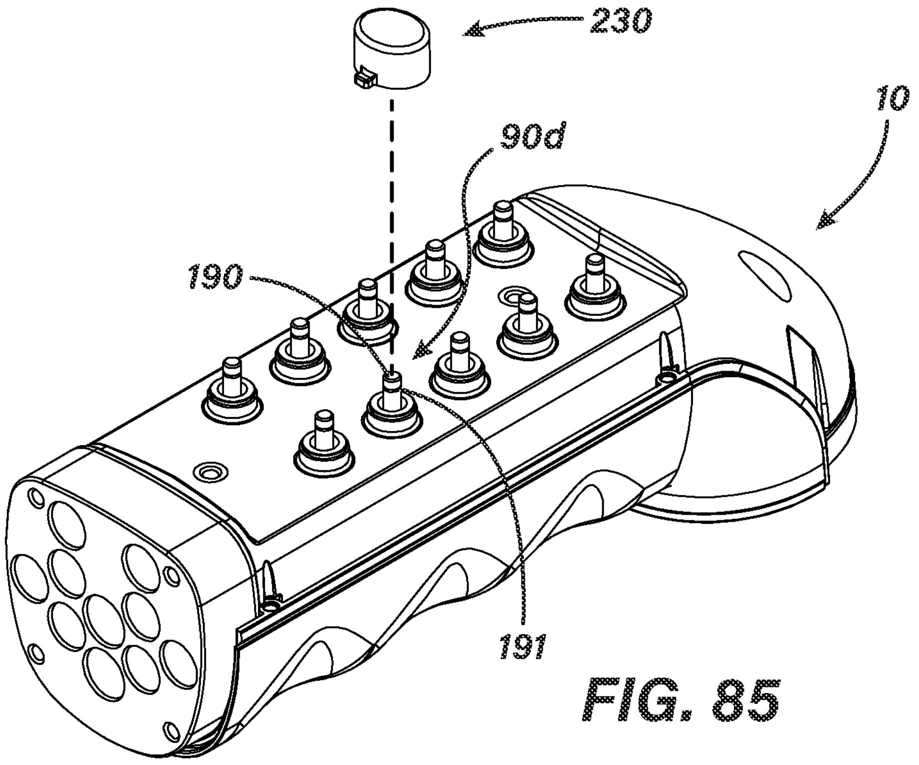

FIGS. 83A-83C show an exemplary button cap 230 as is particularly suitable for the flow control valve 185*d* of the hand-held beverage dispenser 5. The button cap 230 is attached to the top end 190 of the cylindrical valve stem 188 of the composite valve trim arrangement 91 for the valve unit 90*d*, as retained operably in place within the valve body 100*d* such that the top end 190 of the valve stem 188 protrudes through the upper seal 225 for the flow control valve 185*d*, as shown in FIG. 85 and more fully described herein. In the exemplary hand-held beverage dispenser 5 according to the preferred embodiment, the attached button cap 230 implements aspects of the ON-OFF flow control 20*d* for manual actuation by a user of the flow control valve 185*d*, as previously described.

As shown in FIGS. 83A-83C, the preferred implementations of the button cap 230 include an overhanging side 231 or, depending on the shape of the button cap 230, overhanging sides 231. In any case, the overhanging sides 231 are provided to operate cooperatively with the top 101 of the valve body 100*d* to facilitate achieving a low profile valve control 20*d*. The overhanging sides 231 also aid in preventing ingress of beverage fluids or like matter into the button cap 230, or about the upper seal 225 for the flow control valve 185*d* and the top end 190 of the valve stem 188.

As particularly shown in FIGS. 83B-83C, a snap ring 233 for engaging the top of top end 190 of the valve stem 188 is formed within the interior space 232 of the button cap 230, as generally bounded by the overhanging sides 231. As shown in the figures, the implemented snap ring 233 generally comprises a pair of spaced tabs 234, each of which includes a notch 239 in the shape of a minor arc of a circle to cooperatively form a longitudinally oriented central aperture 235 between the tabs 234. Additionally, each of the tabs 234 has an interiorly projecting foot 236 formed about the bottom edge of the aperture 235, which is sized, shaped or otherwise adapted to engage the keeper groove 191 provided about the top end 190 of the cylindrical valve stem 188, as previously described and particularly shown in FIGS. 41-43.

The implemented button cap 230 also comprises a pair of oppositely disposed alignment and retention tabs 237. As will be understood further herein, the alignment and retention tabs 237 cooperate with corresponding tab guide slots 25 formed within the upper enclosure member 22 for the handle body 10 to maintain the button cap 230 on the top end 190 of the valve stem 188. Furthermore, the cooperatively adapted retention tabs 237 and tab guide slots 25 also keep the button cap 230 at a desired rotation about the valve stem 188, thereby ensuring any printed matter applied to the top of the button cap 230 is properly viewable.

Figure 84A:
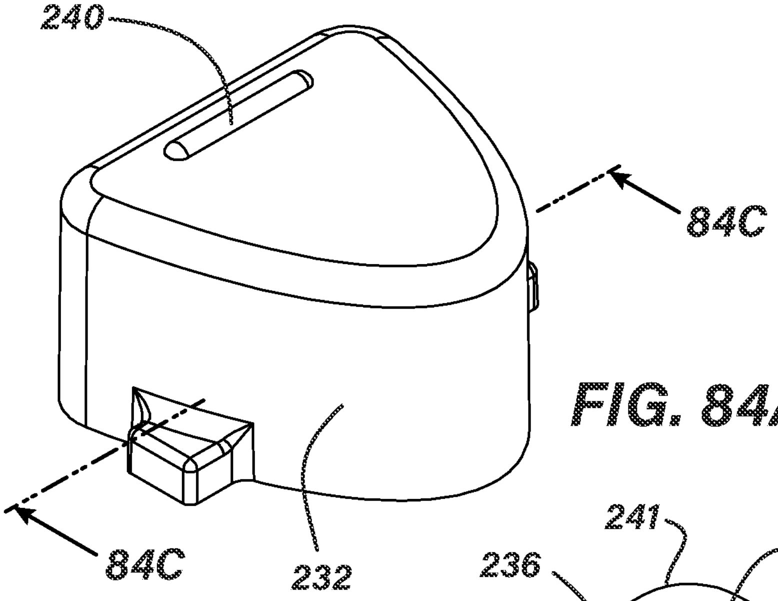
Figure 84B:
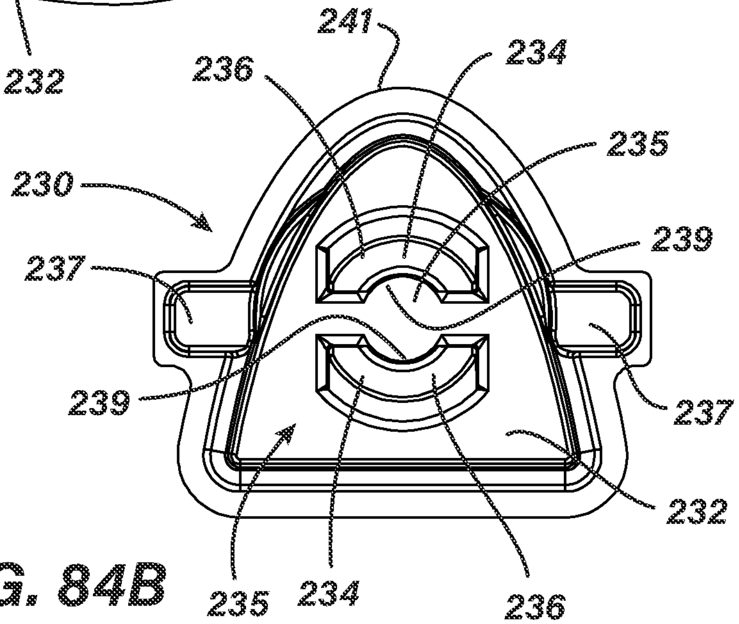
Figure 84C:
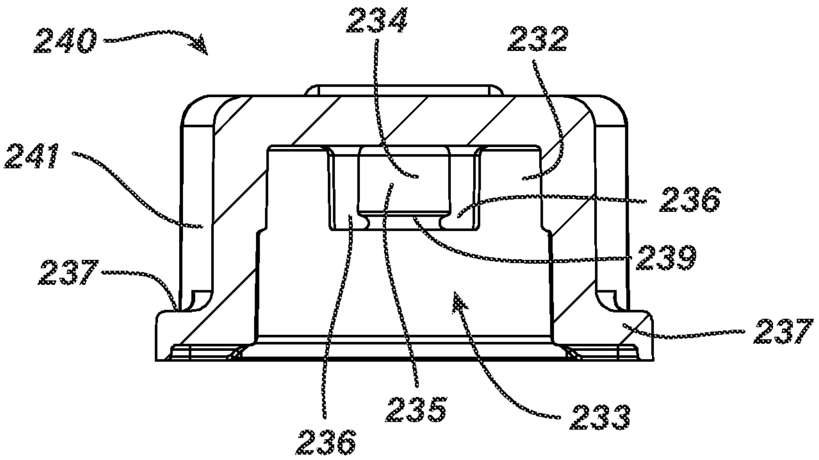

FIGS. 84A-84C show an alternatively shaped button cap 240, which comprises functionally identical structure within the interior space 232 bounded by the alternatively shaped overhanging sides 241. As shown in the figures, the alternatively shaped button cap 240 identically implements a snap ring 233 within the interior space 232 of the button cap 240. The snap ring 232 generally comprises spaced tabs 234 forming a central aperture 235 with an interiorly projecting foot 236 adapted to engage the keeper groove 191 at the top end 190 of the valve stem 188. Alignment and retention tabs 237 are also provided about the alternatively shaped overhanging sides 241. Any subset of the principal button caps 230, or particular implementation of an alternatively shaped button cap 240, may also include a tactile feature 242 for distinguishing or further distinguishing one or more of the button caps 230, 240 from others. As shown in FIGS. 84A and 84C, such a tactile feature 242 may, for example, comprise a raised ridge or like structure.

As more fully described herein, the alignment and retention tabs 237 for the alternatively shaped button caps 240 are cooperatively adapted with the tab guide slots 25 of the upper enclosure 22 for the handle body 10, as described for the principal button cap 230. However, the alignment and retention tabs 237 as project outwardly from alternatively shaped overhanging sides 241 need not be identically sized or shaped as compared to the principal button cap 230. Alignment and retention tabs 237 projecting from alternatively shaped overhanging sides 241 will generally vary as required to interface with or otherwise accommodate the alternatively shaped overhanging sides 241. That said, any particular implementation of an alternatively shaped button cap 240 is most preferably limited to shapes that do not compromise any cooperative adaptations of the button cap 240, as described with respect to the principal button cap 230.

Figure 86:
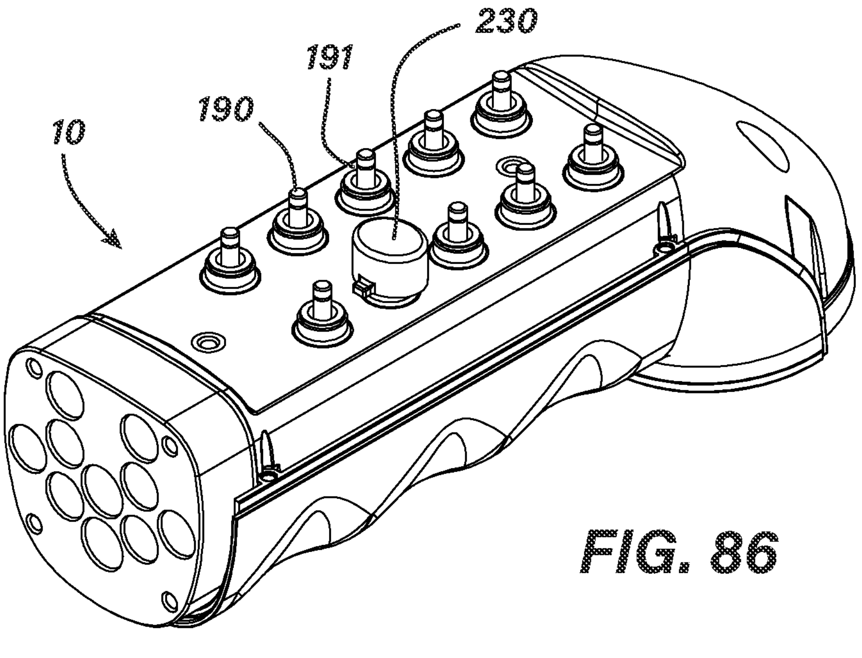
Figure 87:
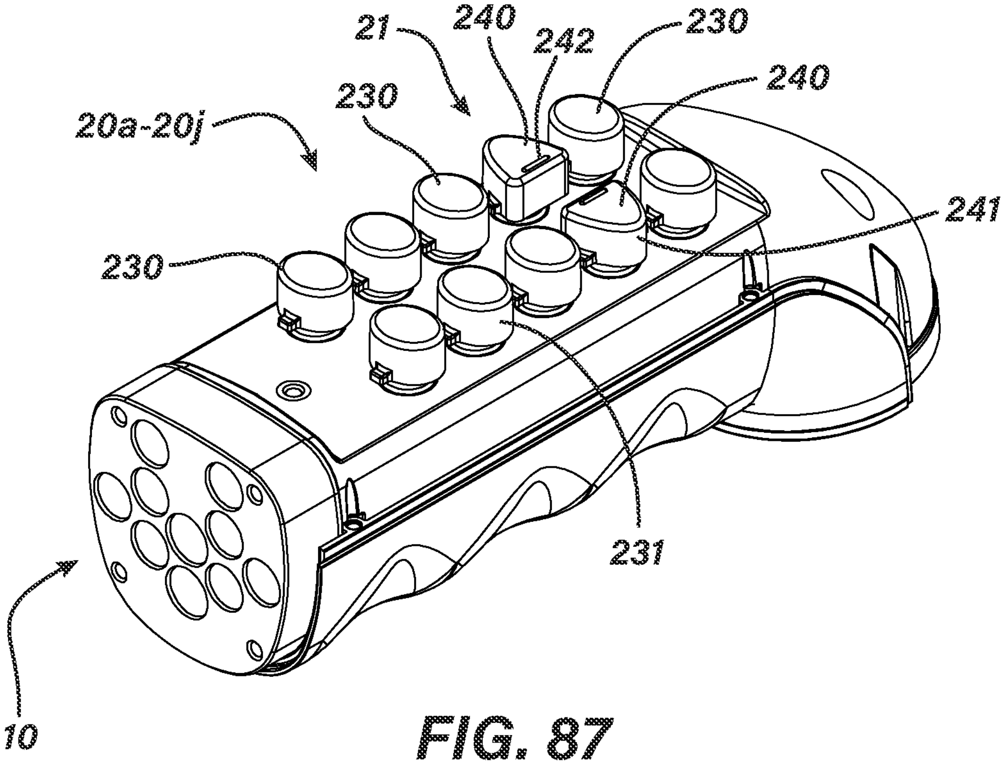

In a fifth stage of assembly of the hand-held beverage dispenser 5 illustrated in FIGS. 85-87, a selected button cap 230 is attached to the top end 190 of each valve stem 188. As shown in FIG. 85, a button cap 230 is attached to the top end 190 of the valve stem 188 protruding from the representative valve body 100*d* by simply axially aligning the central aperture 235 of the button cap 230 with the targeted valve body 100*d*, and pressing the button cap 230 downward over and about the top end 190 of the valve stem 188. Contact with the top end 190 of the valve stem 188 will cause the spaced tabs 234 of the button cap 230 to flex outward and slightly upward enabling the central aperture 235 to receive the top end 190 of the valve stem 188 as the button cap continues downward. Upon engagement of the interiorly projecting foot 236 of the button cap 230 with the keeper groove 191 about the top end 190 of the valve stem 188, the spaced tabs 234 will snap back into position, thereby initially securing the button cap 230 in place, as shown in FIG. 86. This process is repeated until a selected button cap 230 is applied to every flow control valve 185*a*-185*j*, as shown in FIG. 87. As also shown in FIG. 87, an alternatively shaped button cap 240 is applied to flow control valves 185*i*-185*j* of valve units 90*i*-90*j*, which as previously described each dispense diluents only, and for which it may be desired to more prominently distinguish the corresponding subset 21 of flow controls 20*i*-20*j*.

On completion of the fifth stage of assembly of the hand-held beverage dispenser, as described with reference to FIGS. 85-87, each flow control 20*a*-20*j* is fully implemented in the form of an actuator button for a respective one of the plurality of fully implemented flow control valves 185*a*-185*j*. As previously described, the exemplary implementation of each flow control 20*a*-20*j* for a respective flow control valve 185*a*-185*j* comprises an operable integration of a corresponding set of a button cap 230, 240, a valve stem 188 and a poppet spring 219, to form an actuator button for the respective flow control valve 185*a*-185*j*. The partially assembled hand-held beverage dispenser 5 is also ready for placement of the upper enclosure member 22.

Figure 88:
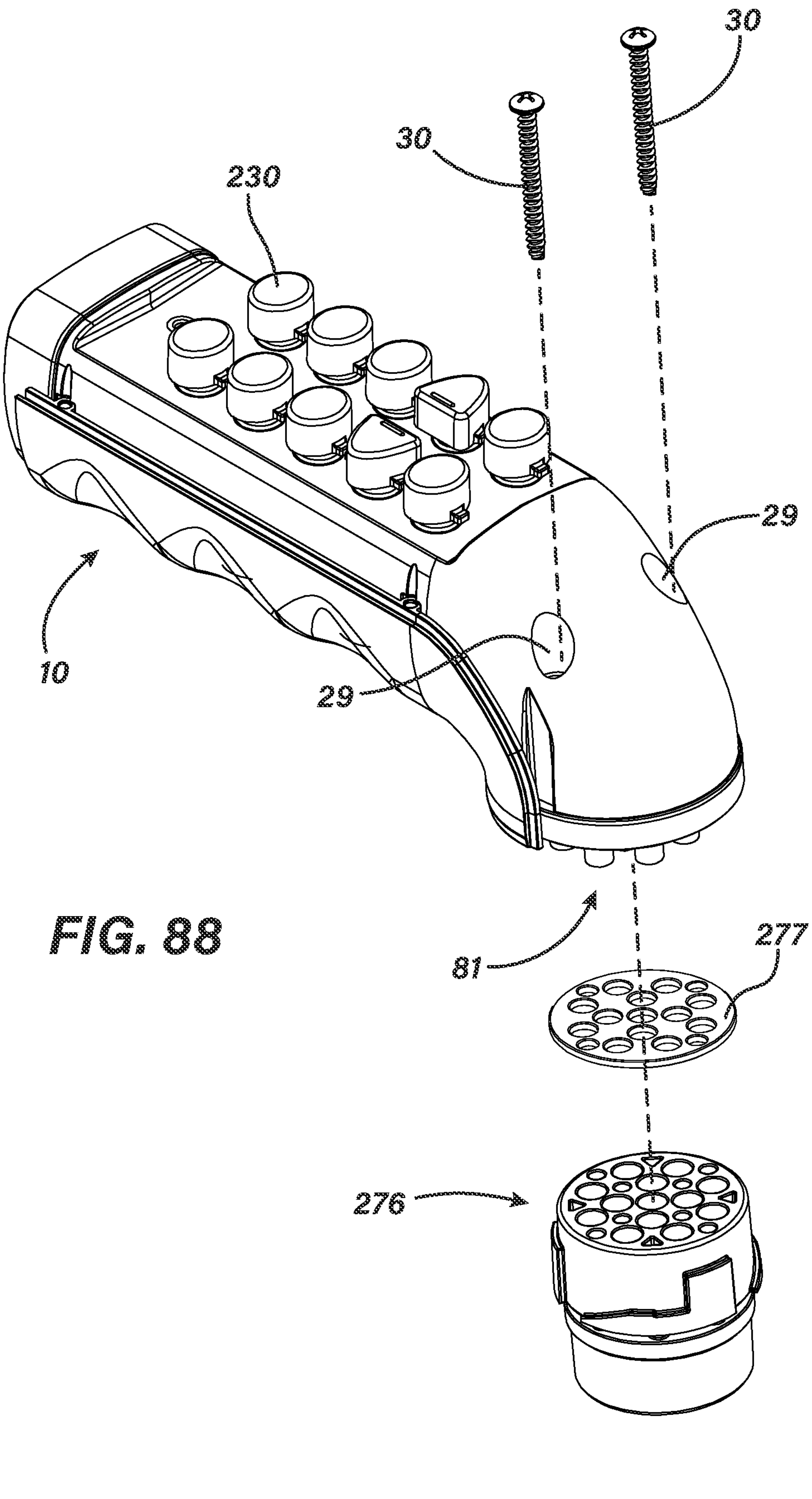

It is noted, however, that the exemplary hand-held beverage dispenser 5 of the preferred embodiment implements a full length upper enclosure member 22 and also provides for selective removability of the mixer subassembly 276 of a utilized post-mix type drink dispenser assembly 275. Because the exemplary preferred implementation of the latter feature requires removal of the upper enclosure member 22, a sixth stage of assembly of the hand-held beverage dispenser 5 contemplates attachment of a mixer subassembly 276 as required or otherwise desired. As particularly shown in FIG. 88, the mixer subassembly 276 and a rubber or like material seal 277 are attached about the previously provided connector tubes 265 and rods 266, and then secured in place with screws 30 running through mounting holes 29 provided therefor in the handle body 10. With the hand-held beverage dispenser 5 now assembled to the state depicted in FIG. 89, the upper enclosure member 22 is placed about and secured to the top 18 of the handle body 10 in a seventh stage of assembly of the hand-held beverage dispenser 5.

FIGS. 90-93 show a full length implementation of the upper enclosure member 22, as provided to enclose the top 18 of the handle body 10 of the hand-held beverage dispenser 5 and aspects of the ON-OFF flow controls 20*a*-20*j* at the top 18 of the handle body 10, as shown in FIG. 93. A pair of downwardly projecting bosses 26 are provided on the bottom side 23 of the upper enclosure member 22 to provide a desired spacing between the bottom side 23 of the upper enclosure member 22 and the top 18 of the handle body 10, and to prevent flexing or breakage of the readily removable and replaceable upper enclosure member 23 during attachment to the handle body 10. Mounting holes 27 for the upper enclosure member 22 are provided through the upper enclosure member 22 and into and through each provided boss 26. As best shown in FIGS. 92-93, the mounting holes are preferably countersunk through the upper enclosure member 22 to enable flush insertion of conventional mounting hardware for the upper enclosure member 22, such as, for example, screws 28 or the like, thereby ensuring that a user may comfortably grasp the handle body 10.

The provided upper enclosure member 22 is also specially adapted to retain each attached button cap 230, 240 of the ON-OFF flow controls 20*a*-20*j* operably in place in a fixed orientation, as previously noted, and to also guide the vertical translation of the button caps 230, 240 as the ON-OFF flow controls 20*a*-20*j* are actuated or released. As best shown in FIGS. 90-91, a button cap guide 24 for each implemented ON-OFF flow control 20*a*-20*j* projects downwardly from the bottom side 23 of the upper enclosure member 22, and is sized, shaped or otherwise adapted to allow passage of each particular button cap 230, 240 for which the particular upper enclosure member 22 is manufactured to support. Each of the downwardly projecting button cap guides 24 includes a pair of tab guide slots 25, which are sized, shaped and disposed about each button cap guide 24 to operatively receive the alignment and retention tabs 237 as provided about the button cap 230, 240 for which the particular button cap guide 24 has been adapted to receive.

In addition to traditional printed matter or coloring, the button caps 230, 240 may take any number of shapes, or be provided with any number of surface treatments, such as ridges, bumps, depressions or the like, as previously noted, or any other visually, tactilely or similarly readily perceptible features consistent with maintaining the previously described desired cooperative adaptations of the button caps 230, 240 with the upper enclosure member 22. As such, changing one button cap 230 for another of a differing shape, or other characteristic, is a simple matter of removing the upper enclosure member 22, removing a first button cover 230 from the valve body 100*a*-100*j* for which the change is desired, affixing a second button cover 240 of the desired shape, and replacing the removed upper enclosure member 22 with a different upper enclosure member 22 having button cap guides 24 corresponding to the substituted button cap 240. The convenience with which such a change may be made is of particular utility in the connection with the hand-held beverage dispenser 5 as preferably implemented according to the invention, where the on demand ability to select any available diluent for use with any valve unit 90*a*-90*j* only increases the likelihood that a user would change the beverage product dispensed through a particular valve unit 90*a*-90*h* which then also increases the likelihood that a user would also desire a change in shape of a button cap 230, 240 for a particular valve unit 90*a*-90*h*.

In any case, with a button cap 230, 240 attached to the top end 190 of each valve stem 188, as shown in FIG. 93, the hand-held beverage dispenser 5 is ready for placement of the upper enclosure member 22 in a seventh stage of assembly of the hand-held beverage dispenser 5. As illustrated in FIG. 93, the upper enclosure member is set in place on the top 18 of the handle body 10, taking care to ensure compatibility with any utilized alternatively shaped button caps 240, such as those provided for the subset 21 of ON-OFF flow controls 20*i*-20*j* implemented for actuating the flow control valves 185*i*-185*j* of the valve units 90*i*-90*j* configured to dispense a diluent only. The downwardly projecting button cap guides 24 at the bottom side 23 of the upper enclosure member 22 conformingly receive each button cap 230, 240. As each button cap 230, 240 is received within a corresponding button cap guide 24, the tab guide slots 25 disposed about the button cap guide 24 also capture the alignment and retention tabs 237 provided on the received button cap 230, 240. The upper enclosure member 22 is then conventionally attached to the top 18 of the handle body 10 by inserting the provided screws 28 through the mounting holes 27 and bosses 26 the upper enclosure member 22 and engaging the corresponding threaded holes 19 provided at the top 10 of the handle body 10, as shown in FIGS. 93 and 94A. On completion of the seventh stage of assembly of the hand-held beverage dispenser 5, as shown in FIGS. 94A-94B, the hand-held beverage dispenser 5 is fully assembled and ready for use.

If at any time in preparation for use or during deployment in use of the hand-held beverage dispenser 5 a then desired diluent is not already selected for use in connection with a particular ON-OFF flow control 20*a*-20*j*, a user or other party responsible for configuration of the hand-held beverage dispenser 5 may quickly and easily make the desired selection. What is more, the selection of a diluent may be made wherever the hand-held beverage dispenser 5 is found and without regard for the state of use in which it is found. To doubly ensure clarity, a selection of state for any diluent selector valve 130*a*-130*j* can be made at the location of a hand-held beverage dispenser 5 that is otherwise fully deployed in use, after which the hand-held beverage dispenser 5 can be returned to full service without priming, pressurization or any other preparatory action.

To make a new diluent selection in use of the hand-held beverage dispenser 5 for the beverage corresponding to the exemplary ON-OFF flow control 20*d* a user first removes the lower enclosure member 34 to expose the bottom 31 of the handle body 10, as previously described in detail with reference to FIGS. 77-78. In removing the lower enclosure member 34, the user gains access to the bottom side 161 of the closed bottom 151 of the open-topped cup 166 of the diluent selector valve 130*d* of the valve unit 90*d*, as particularly shown in FIGS. 68A-68B with the composite valve trim retaining member 245 operably secured in place. As is well understood in light of the foregoing detailed disclosures, diluent selector valve 130*d* corresponds to ON-OFF flow control 20*d*. The user, however, will generally have little if any knowledge of the internal arrangements of the hand-held beverage dispenser 5, but is instructed that the correct user interface for selection of one diluent or the other is located at the bottom 31 of the handle-body 10, and directly aligned below and with the ON-OFF flow control 20*d* of interest. Having thus identified the bottom side 161 of the exemplary diluent selector valve 130*d* as that of interest, the user utilizes the downwardly projecting stop post 160 provided along the chamfered bottom rim 159 as a readily visually perceptible indicium of alignment 173 for the open-topped cup 166 in conjunction with the particular adjacent indicia of alignment 257 on the bottom side 256 of the composite valve trim retaining member 245 to easily determine the diluent selection for the beverage product of interest corresponding to the ON-OFF flow control 20*d*.

In particular, the user will generally identify the desired diluent by reference to the particular indicia of alignment 257 on the bottom side 256 of the composite valve trim retaining member 245 about the diluent selector valve 130*d* of interest. For example, in the exemplary implementation the letter W indicates plain water, and the letter C indicates carbonated water. As previously described, the radial orientation of the open-topped cup 166, and thus the horizontally oriented notch 170 of the open-topped cup 166, determines whether the first diluent or the second diluent may flow into the valve unit 90*d* of interest. In the exemplary implementation of the hand-held beverage dispenser 5 according to the preferred embodiment, the open-topped cup 166 may take a first operable state in the radial orientation as shown in FIGS. 69A-69E, or a second operable state in the radial orientation as shown in FIGS. 70A-70E.

In the first operable state the downwardly projecting stop post 160 utilized as the indicium of alignment 173 for the open-topped cup 166 abuts a stop 252 defined by a first one of the two adjacent edge segments 251 of the composite valve trim retaining member 245. As illustrated in FIGS. 69A-69E, the downwardly projecting stop post 160 abuts a stop 252 directly adjacent a first one of the particular indicia of alignment 257 on the bottom side of the composite valve trim retaining member 245. As clearly illustrated in FIG. 68A corresponding to the first operable state, the user will readily identify and understand that for the ON-OFF flow control 20*d* of interest the hand-held beverage dispenser 5 of the present invention is configured in FIG. 68A to dispense carbonated water as a first diluent.

In the second operable state the downwardly projecting stop post 160 utilized as the indicium of alignment 173 for the open-topped cup 166 abuts a stop 252 defined by a second one of the two adjacent edge segments 251 of the composite valve trim retaining member 245. As illustrated in FIGS. 70A-70E, the downwardly projecting stop post 160 abuts a stop 252 directly adjacent a second one of the particular indicia of alignment 257 on the bottom side of the composite valve trim retaining member 245. As clearly illustrated in FIG. 68B corresponding to the second operable state, the user will readily identify and understand that for the ON-OFF flow control 20*d* of interest the hand-held beverage dispenser 5 of the present invention is configured in FIG. 68B to dispense plain water as a second diluent.

Able to readily and reliably identify the correct proper location for the downwardly projecting stop post 160, the user makes use of a standard slotted screwdriver or like implement to engage the blind slot 164 at the bottom side 161 of the open-topped cup 166 to effect a desired radial orientation of the open-topped cup 166, as previously described in detail. Having made the desired diluent selection, the user replaces the lower enclosure member 34, as previously described in detail. As also previously described in detail, the inventive failsafe as provided according to the preferred embodiment is fully functional within act of operably placing the lower enclosure member 34 without more. Accordingly, the user simply will not be able to replace the lower enclosure member 34 unless every diluent selector valve 130*a*-130*j* is at least in a proper operable configuration. With the lower enclosure member 34 operably in place over and about the properly configured diluent selector valves 130*a*-130*j* and before returning the hand-held beverage dispenser 5 to service, the user secures the replaced lower enclosure member 34 to the handle body 10 with, for example, the provided machine screws 44, as previously described in detail. In the act of securing the lower enclosure member 34 to the handle body 10, the inventive configuration lock according to the preferred embodiment is also fully functional without more.

FIGS. 95A-95E, 96A-96E, 97A-97E and 98A-98E, and various other figures as will be identified where they are found to be particularly instructive, illustrate the four major exemplary states of operation of the representative valve unit 90*d*, each of which is now described. In particular the following discussions will describe in detail various flow paths through the valve unit 90*d*; fluid flows within or relating to the valve unit 90*d*; relationships between the components of the valve unit 90*d* and other components of the piping system 65 specifically and/or the hand-held beverage dispenser 5 or even external components generally; and user interactions with the valve unit 90*d*. FIGS. 95A-95E illustrate a first state of operation of the integrated valve unit 90*d* as configured to utilize the first diluent while the ON-OFF flow control 20*d* is not actuated. 96A-96E illustrate a second state of operation of the integrated valve unit 90*d* as configured to utilize the first diluent while the ON-OFF flow control 20*d* is actuated. FIGS. 97A-97E illustrate a third state of operation of the integrated valve unit 90*d* as configured to utilize the second diluent while the ON-OFF flow control 20*d* is not actuated. FIGS. 98A-98E illustrate a fourth state of operation of the integrated valve unit 90*d* as configured to utilize the second diluent while the ON-OFF flow control 20*d* is actuated.

In the first state of operation of the integrated valve unit 90*d* as implemented in FIGS. 95A-95E, the diluent selector valve 130*d* is configured to select a first diluent, of a type known to a user, for use in dispensing a beverage product associated by the user with the representative ON-OFF flow control 20*d*. Although not necessarily known to the user, the user-selected diluent is supplied under pressure to the hand-held beverage dispenser 5 through the first diluent inlet 67 at the rear end 52 of the handle body 10. As also not necessarily known to the user, the representative ON-OFF flow control 20*d* establishes the state of the representative flow control valve 185*d* of valve unit 90*d*. As illustrated in the figures, the ON-OFF flow control 20*d* is not actuated or otherwise operated in the first state of operation of the integrated valve unit 90*d*, and thus, although not necessarily known to the user, the normally closed flow control valve 185*d* is not actuated, and therefore closed. Accordingly, beverage fluids, including a beverage product supplied under pressure to the hand-held beverage dispenser 5 through beverage product inlet 69*d* at the rear end 52 of the handle body 10, will not pass through the valve body 100*d* of the valve unit 90*d* or otherwise be dispensed from the hand-held beverage dispenser 5.

Selecting the first diluent for dispensing a beverage from the hand-held beverage dispenser 5 with ON-OFF flow control 20*d* causes the horizontally oriented notch 170 through the upper edge 169 of the cylindrical valve gate 167 of the open-topped cup 166 of the diluent selector valve 130*d* to operably align with the first diluent inlet port 116 of the valve body 100*d*, as particularly shown in FIG. 95B. As shown in FIGS. 95B and 95E, alignment in this first operable state of the diluent selector valve 130*d* creates an open flow path through the diluent selector valve 130*d* allowing the first diluent to flow from supply branch 72*d*, through the first diluent inlet port 116 of the valve body 100*d* and into the cylindrical chamber 139 of the open-topped cup 166, as operably received within the lower chamber 111 of the valve body 100*d*. Simultaneously, however, selection of the first diluent also causes an intact portion of the cylindrical valve gate 167 of the open-topped cup 166 of the diluent selector valve 130*d* to operably align with the second diluent inlet port 117 of the valve body 100*d*, as also particularly shown in FIG. 95B, which creates a flow blocking gate within the diluent selector valve 130*d*. Thus, in the first operable state of the diluent selector valve 130*d*, as is selected according to the second state of operation of the integrated valve unit 90*d*, flow of the second diluent from supply branch 75*d* is prevented by the diluent selector valve 130*d* from being introduced into the cylindrical chamber 139, as shown in FIGS. 95B and 95E.

In the previously defined first state of operation of the integrated valve unit 90*d*, a beverage product may be supplied under pressure from any suitable flow control assembly in fluid communication with the beverage product inlet 69*d* at the rear end 52 of the handle body 10. Through priming or prior use of the hand-held beverage dispenser 5, a supplied beverage product is conveyed through the dedicated beverage product supply conduit 76*d* between the beverage product inlet 69*d* and the beverage product inlet port 108 of the valve body 100*d* and introduced through the beverage product inlet port 108 to the intermediate chamber 106 of the valve body 100*d*. As particularly shown in FIGS. 26, 28 and 96D, the beverage product inlet port 108 introduces the beverage product into the intermediate chamber 106 upstream of the upper valve seat 109 for the flow control valve 185*d*.

As particularly shown in FIG. 95D, the flow control valve 185*d* is implemented as a coupled set of normally closed poppet-type valves, where an upper one of the poppet-type valves controls flow through the valve body 100*d* of a beverage product. In the at rest normally closed state of the flow control valve 185*d*, the poppet spring 219 at the bottom end 203 of the valve stem 188 applies an upward biasing force to the valve stem 188. The upward biasing force produced by the poppet spring 219, as may be joined by any additional upward forces produced by pressurized beverage fluids within the valve body 100*d*, holds the valve stem 188 of the flow control valve 185*d* in the uppermost position for the valve stem 188 within the valve body 100*d*. Accordingly, the upper reciprocating sealing member 205 carried by the valve stem 188 is also at an uppermost position within the valve body 100*d*, whereat the valve face 209 formed at the top surface 208 of the upper reciprocating sealing member 205 is sealingly engaged with the corresponding upper valve seat 109 provided within the valve body 100*d* for the at rest flow control valve 185*d*. At rest in this normally closed state of the flow control valve 185*d*, the flow control valve 185*d* prevents passage of beverage product from the intermediate chamber 106 to the upper chamber 104 of the valve body 100*d*.

Because in the defined first state of operation of the integrated valve unit 90*d* the ON-OFF flow control 20*d* is not actuated or otherwise operated, no sufficient downward force is applied to the valve stem 188 to overcome the upward biasing force applied to the bottom end 203 of the valve stem 188 by the provided poppet spring 219, and any additional upwardly applied fluid forces within the valve body 100*d*, to shift the valve stem 188, and thus the upper reciprocating sealing member 205 carried by the valve stem 188, downward within the valve body 100*d*. Accordingly, the valve face 209 formed at the top surface 208 of the upper reciprocating sealing member 205 remains sealingly engaged with the corresponding upper valve seat 109 provided within the valve body 100*d* for the at rest flow control valve 185*d*. Still at rest in the normally closed state of the flow control valve 185*d*, the flow control valve 185*d* continues to prevent passage of beverage product from the intermediate chamber 106 to the upper chamber 104 of the valve body 100*d*.

Concurrently with the supply of a beverage product to the valve body 100*d*, a first diluent may be supplied under pressure from any suitable flow control assembly in fluid communication with the first diluent inlet 67 at the rear end 52 of the handle body 10, as previously described. Through priming or prior use of the hand-held beverage dispenser 5, a supplied first diluent is conveyed through the common trunk 71 of the first diluent inlet manifold 70 and a dedicated valve supply branch 72*d* from the common trunk 71 between the first diluent inlet 67 and the first diluent inlet port 116 of the valve body 100*d*. Because in the defined first state of operation of the integrated valve unit 90*d* the diluent selector valve 130*d* is configured in a first operable state to select the first diluent, the diluent selector valve 130*d* establishes an open flow path through the diluent selector valve 130*d* between the first diluent inlet port 116 and the cylindrical chamber 139 of the open-topped cup 166, as operably received within the lower chamber 111 of the valve body 100*d*. Accordingly, the first diluent is further conveyed from the first diluent inlet port 116 of the valve body 100*d* and into the cylindrical chamber 139 of the open-topped cup 166. As particularly shown in FIGS. 26-27 and 95A-95B, the cooperatively adapted first diluent inlet port 116 and diluent selector valve 130*d* introduce the first diluent into the cylindrical chamber 139 upstream of the lower valve seat 115 for the flow control valve 185*d*. Simultaneously, an intact portion of the cylindrical valve gate 167 of the open-topped cup 166 sealingly obstructs the second diluent inlet port 117 of the valve body 100*d*, as particularly shown in FIG. 95B. Accordingly, the diluent selector valve 130*d* in the first operable state thereof prevents introduction to the cylindrical chamber 139 of any fluid flowing to or through the second inlet port 117.

A lower one of the poppet-type valves provided in implementation of the flow control valve 185*d* controls flow through the valve body 100*d* of a diluent, as particularly shown in FIG. 95D. In the at rest normally closed state of the flow control valve 185*d*, the poppet spring 219 at the bottom end 203 of the valve stem 188 applies an upward biasing force to the valve stem 188. The upward biasing force produced by the poppet spring 219, as may be joined by any additional upward forces produced by pressurized beverage fluids within the valve body 100*d*, holds the valve stem 188 of the flow control valve 185*d* in the uppermost position for the valve stem 188 within the valve body 100*d*. Accordingly, the lower reciprocating sealing member 213 carried by the valve stem 188 is also at an uppermost position within the valve body 100*d*, whereat the valve face 217 formed at the top surface 216 of the lower reciprocating sealing member 213 is sealingly engaged with the corresponding lower valve seat 115 provided within the valve body 100*d* for the at rest flow control valve 185*d*. At rest in this normally closed state of the flow control valve 185*d*, the flow control valve 185*d* prevents passage of diluent from the cylindrical chamber 139 of the open-topped cup 166, as operably received within the lower chamber 111 of the valve body 100*d*, to the intermediate chamber 106 of the valve body 100*d*.

Because in the defined first state of operation of the integrated valve unit 90*d* the ON-OFF flow control 20*d* is not actuated or otherwise operated, no sufficient downward force is applied to the valve stem 188 to overcome the upward biasing force applied to the bottom end 203 of the valve stem 188 by the provided poppet spring 219, and any additional upwardly applied fluid forces within the valve body 100*d*, to shift the valve stem 188, and thus the lower reciprocating sealing member 213 carried by the valve stem 188, downward within the valve body 100*d*. Accordingly, the valve face 217 formed at the top surface 216 of the lower reciprocating sealing member 213 remains sealingly engaged with the corresponding lower valve seat 115 provided within the valve body 100*d* for the at rest flow control valve 185*d*. Still at rest in the normally closed state of the flow control valve 185*d*, the flow control valve 185*d* continues to prevent passage of diluent from the cylindrical chamber 139 of the open-topped cup 166 to the intermediate chamber 106 of the valve body 100*d*.

In the second state of operation of the integrated valve unit 90*d* as implemented in FIGS. 96A-96E, the diluent selector valve 130*d* is configured to select a first diluent, of a type known to a user, for use in dispensing a beverage product associated by the user with the representative ON-OFF flow control 20*d*. Although not necessarily known to the user, the user-selected diluent is supplied under pressure to the hand-held beverage dispenser 5 through the first diluent inlet 67 at the rear end 52 of the handle body 10. As also not necessarily known to the user, the representative ON-OFF flow control 20*d* establishes the state of the representative flow control valve 185*d* of valve unit 90*d*. As illustrated in the figures, the ON-OFF flow control 20*d* is actuated or otherwise operated in the second state of operation of the integrated valve unit 90*d*, and thus, although not necessarily known to the user, the normally closed flow control valve 185*d* is actuated, and therefore open. Accordingly, beverage fluids, including a beverage product supplied under pressure to the hand-held beverage dispenser 5 through beverage product inlet 69*d* at the rear end 52 of the handle body 10, pass through the valve body 100*d* of the valve unit 90*d* to be mixed together and dispensed from the hand-held beverage dispenser 5.

Selecting the first diluent for dispensing a beverage from the hand-held beverage dispenser 5 with ON-OFF flow control 20*d* causes the horizontally oriented notch 170 through the upper edge 169 of the cylindrical valve gate 167 of the open-topped cup 166 of the diluent selector valve 130*d* to operably align with the first diluent inlet port 116 of the valve body 100*d*, as particularly shown in FIG. 96B. As shown in FIGS. 96B and 96E, alignment in this first operable state of the diluent selector valve 130*d* creates an open flow path through the diluent selector valve 130*d* allowing the first diluent to flow from supply branch 72*d*, through the first diluent inlet port 116 of the valve body 100*d* and into the cylindrical chamber 139 of the open-topped cup 166, as operably received within the lower chamber 111 of the valve body 100*d*. Simultaneously, however, selection of the first diluent also causes an intact portion of the cylindrical valve gate 167 of the open-topped cup 166 of the diluent selector valve 130*d* to operably align with the second diluent inlet port 117 of the valve body 100*d*, as also particularly shown in FIG. 96B, which creates a flow blocking gate within the diluent selector valve 130*d*. Thus, in the first operable state of the diluent selector valve 130*d*, as is selected according to the second state of operation of the integrated valve unit 90*d*, flow of the second diluent from supply branch 75*d* is prevented by the diluent selector valve 130*d* from being introduced into the cylindrical chamber 139, as shown in FIGS. 96B and 96E.

In the previously defined second state of operation of the integrated valve unit 90*d*, a beverage product may be supplied under pressure from any suitable flow control assembly in fluid communication with the beverage product inlet 69*d* at the rear end 52 of the handle body 10. Through priming or prior use of the hand-held beverage dispenser 5, a supplied beverage product is conveyed through the dedicated beverage product supply conduit 76*d* between the beverage product inlet 69*d* and the beverage product inlet port 108 of the valve body 100*d* and introduced through the beverage product inlet port 108 to the intermediate chamber 106 of the valve body 100*d*. As particularly shown in FIGS. 26, 28 and 96D, the beverage product inlet port 108 introduces the beverage product into the intermediate chamber 106 upstream of the upper valve seat 109 for the flow control valve 185*d*.

As particularly shown in FIG. 96D, the flow control valve 185*d* is implemented as a coupled set of normally closed poppet-type valves, where an upper one of the poppet-type valves controls flow through the valve body 100*d* of a beverage product. In the at rest normally closed state of the flow control valve 185*d*, the poppet spring 219 at the bottom end 203 of the valve stem 188 applies an upward biasing force to the valve stem 188. The upward biasing force produced by the poppet spring 219, as may be joined by any additional upward forces produced by pressurized beverage fluids within the valve body 100*d*, holds the valve stem 188 of the flow control valve 185*d* in the uppermost position for the valve stem 188 within the valve body 100*d*. Accordingly, the upper reciprocating sealing member 205 carried by the valve stem 188 is also at an uppermost position within the valve body 100*d*, whereat the valve face 209 formed at the top surface 208 of the upper reciprocating sealing member 205 is sealingly engaged with the corresponding upper valve seat 109 provided within the valve body 100*d* for the at rest flow control valve 185*d*. At rest in this normally closed state of the flow control valve 185*d*, the flow control valve 185*d* prevents passage of beverage product from the intermediate chamber 106 to the upper chamber 104 of the valve body 100*d*.

Because in the defined second state of operation of the integrated valve unit 90*d* the ON-OFF flow control 20*d* is actuated or otherwise operated, a sufficient downward force applied to the valve stem 188 overcomes the upward biasing force applied to the bottom end 203 of the valve stem 188 by the provided poppet spring 219, and any additional upwardly applied fluid forces within the valve body 100*d*, to shift the valve stem 188, and thus the upper reciprocating sealing member 205 carried by the valve stem 188, downward within the valve body 100*d*, as shown in FIGS. 96A and 96D. As the valve stem 188 and thus the upper reciprocating sealing member 205 shift downward, flow from the intermediate chamber 106 to the upper chamber 104 of the valve body 100*d* is immediately enabled, whereby beverage product immediately flows from the intermediate chamber 106 to the upper chamber 104. As the valve stem 188 and the upper reciprocating sealing member 205 continue to shift the short distance downward to reach maximum displacement, as shown in FIGS. 96A and 96D, the flow of beverage product quickly reaches maximum rate. In any case, the beverage product flowing into the upper chamber 104 passes unobstructed from the upper chamber 104 through the beverage product outlet port 105 of the valve body 100*d*, and is conveyed through the dedicated beverage dispensing conduit 80*d* between the beverage product outlet port 105 and the beverage product outlet 83*d* at the bottom 31 and adjacent the forward end 48 of the handle body 10. The beverage product is then there conducted into and through the post-mix type drink dispenser assembly 275, where, in accordance with the second state of operation of the integrated valve unit 90*d*, the beverage product is mixed together with the user-selected first diluent as they are dispensed together into a beverage vessel, in a manner well known to those of ordinary skill in the relevant arts.

Concurrently with the supply of a beverage product to the valve body 100*d*, a first diluent may be supplied under pressure from any suitable flow control assembly in fluid communication with the first diluent inlet 67 at the rear end 52 of the handle body 10, as previously described. Through priming or prior use of the hand-held beverage dispenser 5, a supplied first diluent is conveyed through the common trunk 71 of the first diluent inlet manifold 70 and a dedicated valve supply branch 72*d* from the common trunk 71 between the first diluent inlet 67 and the first diluent inlet port 116 of the valve body 100*d*. Because in the defined second state of operation of the integrated valve unit 90*d* the diluent selector valve 130*d* is configured in a first operable state to select the first diluent, the diluent selector valve 130*d* establishes an open flow path through the diluent selector valve 130*d* between the first diluent inlet port 116 and the cylindrical chamber 139 of the open-topped cup 166, as operably received within the lower chamber 111 of the valve body 100*d*. Accordingly, the first diluent is further conveyed from the first diluent inlet port 116 of the valve body 100*d* and into the cylindrical chamber 139 of the open-topped cup 166. As particularly shown in FIGS. 26-27 and 96A-96B, the cooperatively adapted first diluent inlet port 116 and diluent selector valve 130*d* introduce the first diluent into the cylindrical chamber 139 upstream of the lower valve seat 115 for the flow control valve 185*d*. Simultaneously, an intact portion of the cylindrical valve gate 167 of the open-topped cup 166 sealingly obstructs the second diluent inlet port 117 of the valve body 100*d*, as particularly shown in FIG. 96B. Accordingly, the diluent selector valve 130*d* in the first operable state thereof prevents introduction to the cylindrical chamber 139 of any fluid flowing to or through the second inlet port 117.

A lower one of the poppet-type valves provided in implementation of the flow control valve 185*d* controls flow through the valve body 100*d* of a diluent, as particularly shown in FIG. 96D. In the at rest normally closed state of the flow control valve 185*d*, the poppet spring 219 at the bottom end 203 of the valve stem 188 applies an upward biasing force to the valve stem 188. The upward biasing force produced by the poppet spring 219, as may be joined by any additional upward forces produced by pressurized beverage fluids within the valve body 100*d*, holds the valve stem 188 of the flow control valve 185*d* in the uppermost position for the valve stem 188 within the valve body 100*d*. Accordingly, the lower reciprocating sealing member 213 carried by the valve stem 188 is also at an uppermost position within the valve body 100*d*, whereat the valve face 217 formed at the top surface 216 of the lower reciprocating sealing member 213 is sealingly engaged with the corresponding lower valve seat 115 provided within the valve body 100*d* for the at rest flow control valve 185*d*. At rest in this normally closed state of the flow control valve 185*d*, the flow control valve 185*d* prevents passage of diluent from the cylindrical chamber 139 of the open-topped cup 166, as operably received within the lower chamber 111 of the valve body 100*d*, to the intermediate chamber 106 of the valve body 100*d*.

Because in the defined second state of operation of the integrated valve unit 90*d* the ON-OFF flow control 20*d* is actuated or otherwise operated, a sufficient downward force applied to the valve stem 188 overcomes the upward biasing force applied to the bottom end 203 of the valve stem 188 by the provided poppet spring 219, and any additional upwardly applied fluid forces within the valve body 100*d*, to shift the valve stem 188, and thus the lower reciprocating sealing member 213 carried by the valve stem 188, downward within the valve body 100*d*, as shown in FIGS. 96A and 96D. As the valve stem 188 and thus the lower reciprocating sealing member 213 shift downward, flow from the cylindrical chamber 139 of the open-topped cup 166 to the intermediate chamber of the valve body 100*d* is immediately enabled, whereby the first diluent immediately flows from the cylindrical chamber 139 to the intermediate chamber 106. As the valve stem 188 and the lower reciprocating sealing member 213 continue to shift the short distance downward to reach maximum displacement, as shown in FIGS. 96A and 96D, the flow of the first diluent quickly reaches maximum rate. In any case, the first diluent flowing into the intermediate chamber 106 passes unobstructed from the intermediate chamber 106 through the diluent outlet port 110 of the valve body 100*d*, and is conveyed through the dedicated valve dispense branch 79*d* to the common trunk 78 and the common trunk 78 of the common diluents outlet manifold 77 between the diluent outlet port 110 and the single common diluents outlet 82 at the bottom 31 and adjacent the forward end 48 of the handle body 10. The first diluent is then there conducted into and through the post-mix type drink dispenser assembly 275, where the user-selected first diluent is mixed together with the beverage product as they are dispensed together into a beverage vessel, in a manner well known to those of ordinary skill in the relevant arts.

In the third state of operation of the integrated valve unit 90*d* as implemented in FIGS. 97A-97E, the diluent selector valve 130*d* is configured to select a second diluent, of a type known to a user, for use in dispensing a beverage product associated by the user with the representative ON-OFF flow control 20*d*. Although not necessarily known to the user, the user-selected diluent is supplied under pressure to the hand-held beverage dispenser 5 through the second diluent inlet 68 at the rear end 52 of the handle body 10. As also not necessarily known to the user, the representative ON-OFF flow control 20*d* establishes the state of the representative flow control valve 185*d* of valve unit 90*d*. As illustrated in the figures, the ON-OFF flow control 20*d* is not actuated or otherwise operated in the third state of operation of the integrated valve unit 90*d*, and thus, although not necessarily known to the user, the normally closed flow control valve 185*d* is not actuated, and therefore closed. Accordingly, beverage fluids, including a beverage product supplied under pressure to the hand-held beverage dispenser 5 through beverage product inlet 69*d* at the rear end 52 of the handle body 10, will not pass through the valve body 100*d* of the valve unit 90*d* or otherwise be dispensed from the hand-held beverage dispenser 5.

Selecting the second diluent for dispensing a beverage from the hand-held beverage dispenser 5 with ON-OFF flow control 20*d* causes the horizontally oriented notch 170 through the upper edge 169 of the cylindrical valve gate 167 of the open-topped cup 166 of the diluent selector valve 130*d* to operably align with the second diluent inlet port 117 of the valve body 100*d*, as particularly shown in FIG. 97B. As shown in FIGS. 97B and 97E, alignment in this second operable state of the diluent selector valve 130*d* creates an open flow path through the diluent selector valve 130*d* allowing the second diluent to flow from supply branch 75*d*, through the second diluent inlet port 117 of the valve body 100*d* and into the cylindrical chamber 139 of the open-topped cup 166, as operably received within the lower chamber 111 of the valve body 100*d*. Simultaneously, however, selection of the second diluent also causes an intact portion of the cylindrical valve gate 167 of the open-topped cup 166 of the diluent selector valve 130*d* to operably align with the first diluent inlet port 116 of the valve body 100*d*, as also particularly shown in FIG. 97B, which creates a flow blocking gate within the diluent selector valve 130*d*. Thus, in the second operable state of the diluent selector valve 130*d*, as is selected according to the third state of operation of the integrated valve unit 90*d*, flow of the first diluent from supply branch 72*d* is prevented by the diluent selector valve 130*d* from being introduced into the cylindrical chamber 139, as shown in FIGS. 97B and 97E.

In the previously defined third state of operation of the integrated valve unit 90*d*, a beverage product may be supplied under pressure from any suitable flow control assembly in fluid communication with the beverage product inlet 69*d* at the rear end 52 of the handle body 10. Through priming or prior use of the hand-held beverage dispenser 5, a supplied beverage product is conveyed through the dedicated beverage product supply conduit 76*d* between the beverage product inlet 69*d* and the beverage product inlet port 108 of the valve body 100*d* and introduced through the beverage product inlet port 108 to the intermediate chamber 106 of the valve body 100*d*. As particularly shown in FIGS. 26, 28 and 97D, the beverage product inlet port 108 introduces the beverage product into the intermediate chamber 106 upstream of the upper valve seat 109 for the flow control valve 185*d*.

As particularly shown in FIG. 96D, the flow control valve 185*d* is implemented as a coupled set of normally closed poppet-type valves, where an upper one of the poppet-type valves controls flow through the valve body 100*d* of a beverage product. In the at rest normally closed state of the flow control valve 185*d*, the poppet spring 219 at the bottom end 203 of the valve stem 188 applies an upward biasing force to the valve stem 188. The upward biasing force produced by the poppet spring 219, as may be joined by any additional upward forces produced by pressurized beverage fluids within the valve body 100*d*, holds the valve stem 188 of the flow control valve 185*d* in the uppermost position for the valve stem 188 within the valve body 100*d*. Accordingly, the upper reciprocating sealing member 205 carried by the valve stem 188 is also at an uppermost position within the valve body 100*d*, whereat the valve face 209 formed at the top surface 208 of the upper reciprocating sealing member 205 is sealingly engaged with the corresponding upper valve seat 109 provided within the valve body 100*d* for the at rest flow control valve 185*d*. At rest in this normally closed state of the flow control valve 185*d*, the flow control valve 185*d* prevents passage of beverage product from the intermediate chamber 106 to the upper chamber 104 of the valve body 100*d*.

Because in the defined third state of operation of the integrated valve unit 90*d* the ON-OFF flow control 20*d* is not actuated or otherwise operated, no sufficient downward force is applied to the valve stem 188 to overcome the upward biasing force applied to the bottom end 203 of the valve stem 188 by the provided poppet spring 219, and any additional upwardly applied fluid forces within the valve body 100*d*, to shift the valve stem 188, and thus the upper reciprocating sealing member 205 carried by the valve stem 188, downward within the valve body 100*d*. Accordingly, the valve face 209 formed at the top surface 208 of the upper reciprocating sealing member 205 remains sealingly engaged with the corresponding upper valve seat 109 provided within the valve body 100*d* for the at rest flow control valve 185*d*. Still at rest in the normally closed state of the flow control valve 185*d*, the flow control valve 185*d* continues to prevent passage of beverage product from the intermediate chamber 106 to the upper chamber 104 of the valve body 100*d*.

Concurrently with the supply of a beverage product to the valve body 100*d*, a second diluent may be supplied under pressure from any suitable flow control assembly in fluid communication with the second diluent inlet 68 at the rear end 52 of the handle body 10, as previously described. Through priming or prior use of the hand-held beverage dispenser 5, a supplied second diluent is conveyed through the common trunk 74 of the second diluent inlet manifold 73 and a dedicated valve supply branch 75*d* from the common trunk 74 between the second diluent inlet 68 and the second diluent inlet port 117 of the valve body 100*d*. Because in the defined third state of operation of the integrated valve unit 90*d* the diluent selector valve 130*d* is configured in a second operable state to select the second diluent, the diluent selector valve 130*d* establishes an open flow path through the diluent selector valve 130*d* between the second diluent inlet port 117 and the cylindrical chamber 139 of the open-topped cup 166, as operably received within the lower chamber 111 of the valve body 100*d*. Accordingly, the second diluent is further conveyed from the second diluent inlet port 117 of the valve body 100*d* and into the cylindrical chamber 139 of the open-topped cup 166. As particularly shown in FIGS. 26, 28 and 97A-97B, the cooperatively adapted second diluent inlet port 117 and diluent selector valve 130*d* introduce the second diluent into the cylindrical chamber 139 upstream of the lower valve seat 115 for the flow control valve 185*d*. Simultaneously, an intact portion of the cylindrical valve gate 167 of the open-topped cup 166 sealingly obstructs the first diluent inlet port 116 of the valve body 100*d*, as particularly shown in FIG. 97B. Accordingly, the diluent selector valve 130*d* in the third operable state thereof prevents introduction to the cylindrical chamber 139 of any fluid flowing to or through the first inlet port 116.

A lower one of the poppet-type valves provided in implementation of the flow control valve 185*d* controls flow through the valve body 100*d* of a diluent, as particularly shown in FIG. 97D. In the at rest normally closed state of the flow control valve 185*d*, the poppet spring 219 at the bottom end 203 of the valve stem 188 applies an upward biasing force to the valve stem 188. The upward biasing force produced by the poppet spring 219, as may be joined by any additional upward forces produced by pressurized beverage fluids within the valve body 100*d*, holds the valve stem 188 of the flow control valve 185*d* in the uppermost position for the valve stem 188 within the valve body 100*d*. Accordingly, the lower reciprocating sealing member 213 carried by the valve stem 188 is also at an uppermost position within the valve body 100*d*, whereat the valve face 217 formed at the top surface 216 of the lower reciprocating sealing member 213 is sealingly engaged with the corresponding lower valve seat 115 provided within the valve body 100*d* for the at rest flow control valve 185*d*. At rest in this normally closed state of the flow control valve 185*d*, the flow control valve 185*d* prevents passage of diluent from the cylindrical chamber 139 of the open-topped cup 166, as operably received within the lower chamber 111 of the valve body 100*d*, to the intermediate chamber 106 of the valve body 100*d*.

Because in the defined third state of operation of the integrated valve unit 90*d* the ON-OFF flow control 20*d* is not actuated or otherwise operated, no sufficient downward force is applied to the valve stem 188 to overcome the upward biasing force applied to the bottom end 203 of the valve stem 188 by the provided poppet spring 219, and any additional upwardly applied fluid forces within the valve body 100*d*, to shift the valve stem 188, and thus the lower reciprocating sealing member 213 carried by the valve stem 188, downward within the valve body 100*d*. Accordingly, the valve face 217 formed at the top surface 216 of the lower reciprocating sealing member 213 remains sealingly engaged with the corresponding lower valve seat 115 provided within the valve body 100*d* for the at rest flow control valve 185*d*. Still at rest in the normally closed state of the flow control valve 185*d*, the flow control valve 185*d* continues to prevent passage of diluent from the cylindrical chamber 139 of the open-topped cup 166 to the intermediate chamber 106 of the valve body 100*d*.

In the fourth state of operation of the integrated valve unit 90*d* as implemented in FIGS. 98A-98E, the diluent selector valve 130*d* is configured to select a second diluent, of a type known to a user, for use in dispensing a beverage product associated by the user with the representative ON-OFF flow control 20*d*. Although not necessarily known to the user, the user-selected diluent is supplied under pressure to the hand-held beverage dispenser 5 through the second diluent inlet 68 at the rear end 52 of the handle body 10. As also not necessarily known to the user, the representative ON-OFF flow control 20*d* establishes the state of the representative flow control valve 185*d* of valve unit 90*d*. As illustrated in the figures, the ON-OFF flow control 20*d* is actuated or otherwise operated in the second state of operation of the integrated valve unit 90*d*, and thus, although not necessarily known to the user, the normally closed flow control valve 185*d* is actuated, and therefore open. Accordingly, beverage fluids, including a beverage product supplied under pressure to the hand-held beverage dispenser 5 through beverage product inlet 69*d* at the rear end 52 of the handle body 10, pass through the valve body 100*d* of the valve unit 90*d* to be mixed together and dispensed from the hand-held beverage dispenser 5.

Selecting the second diluent for dispensing a beverage from the hand-held beverage dispenser 5 with ON-OFF flow control 20*d* causes the horizontally oriented notch 170 through the upper edge 169 of the cylindrical valve gate 167 of the open-topped cup 166 of the diluent selector valve 130*d* to operably align with the second diluent inlet port 117 of the valve body 100*d*, as particularly shown in FIG. 98B. As shown in FIGS. 98B and 98E, alignment in this second operable state of the diluent selector valve 130*d* creates an open flow path through the diluent selector valve 130*d* allowing the second diluent to flow from supply branch 75*d*, through the second diluent inlet port 117 of the valve body 100*d* and into the cylindrical chamber 139 of the open-topped cup 166, as operably received within the lower chamber 111 of the valve body 100*d*. Simultaneously, however, selection of the second diluent also causes an intact portion of the cylindrical valve gate 167 of the open-topped cup 166 of the diluent selector valve 130*d* to operably align with the first diluent inlet port 116 of the valve body 100*d*, as also particularly shown in FIG. 98B, which creates a flow blocking gate within the diluent selector valve 130*d*. Thus, in the second operable state of the diluent selector valve 130*d*, as is selected according to the fourth state of operation of the integrated valve unit 90*d*, flow of the first diluent from supply branch 72*d* is prevented by the diluent selector valve 130*d* from being introduced into the cylindrical chamber 139, as shown in FIGS. 98B and 98E.

In the previously defined fourth state of operation of the integrated valve unit 90*d*, a beverage product may be supplied under pressure from any suitable flow control assembly in fluid communication with the beverage product inlet 69*d* at the rear end 52 of the handle body 10. Through priming or prior use of the hand-held beverage dispenser 5, a supplied beverage product is conveyed through the dedicated beverage product supply conduit 76*d* between the beverage product inlet 69*d* and the beverage product inlet port 108 of the valve body 100*d* and introduced through the beverage product inlet port 108 to the intermediate chamber 106 of the valve body 100*d*. As particularly shown in FIGS. 26, 28 and 98D, the beverage product inlet port 108 introduces the beverage product into the intermediate chamber 106 upstream of the upper valve seat 109 for the flow control valve 185*d*.

As particularly shown in FIG. 98D, the flow control valve 185*d* is implemented as a coupled set of normally closed poppet-type valves, where an upper one of the poppet-type valves controls flow through the valve body 100*d* of a beverage product. In the at rest normally closed state of the flow control valve 185*d*, the poppet spring 219 at the bottom end 203 of the valve stem 188 applies an upward biasing force to the valve stem 188. The upward biasing force produced by the poppet spring 219, as may be joined by any additional upward forces produced by pressurized beverage fluids within the valve body 100*d*, holds the valve stem 188 of the flow control valve 185*d* in the uppermost position for the valve stem 188 within the valve body 100*d*. Accordingly, the upper reciprocating sealing member 205 carried by the valve stem 188 is also at an uppermost position within the valve body 100*d*, whereat the valve face 209 formed at the top surface 208 of the upper reciprocating sealing member 205 is sealingly engaged with the corresponding upper valve seat 109 provided within the valve body 100*d* for the at rest flow control valve 185*d*. At rest in this normally closed state of the flow control valve 185*d*, the flow control valve 185*d* prevents passage of beverage product from the intermediate chamber 106 to the upper chamber 104 of the valve body 100*d*.

Because in the defined fourth state of operation of the integrated valve unit 90*d* the ON-OFF flow control 20*d* is actuated or otherwise operated, a sufficient downward force applied to the valve stem 188 overcomes the upward biasing force applied to the bottom end 203 of the valve stem 188 by the provided poppet spring 219, and any additional upwardly applied fluid forces within the valve body 100*d*, to shift the valve stem 188, and thus the upper reciprocating sealing member 205 carried by the valve stem 188, downward within the valve body 100*d*, as shown in FIGS. 98A and 98D. As the valve stem 188 and thus the upper reciprocating sealing member 205 shift downward, flow from the intermediate chamber 106 to the upper chamber 104 of the valve body 100*d* is immediately enabled, whereby beverage product immediately flows from the intermediate chamber 106 to the upper chamber 104. As the valve stem 188 and the upper reciprocating sealing member 205 continue to shift the short distance downward to reach maximum displacement, as shown in FIGS. 98A and 98D, the flow of beverage product quickly reaches maximum rate. In any case, the beverage product flowing into the upper chamber 104 passes unobstructed from the upper chamber 104 through the beverage product outlet port 105 of the valve body 100*d*, and is conveyed through the dedicated beverage dispensing conduit 80*d* between the beverage product outlet port 105 and the beverage product outlet 83*d* at the bottom 31 and adjacent the forward end 48 of the handle body 10. The beverage product is then there conducted into and through the post-mix type drink dispenser assembly 275, where, in accordance with the fourth state of operation of the integrated valve unit 90*d*, the beverage product is mixed together with the user-selected second diluent as they are dispensed together into a beverage vessel, in a manner well known to those of ordinary skill in the relevant arts.

Concurrently with the supply of a beverage product to the valve body 100*d*, a second diluent may be supplied under pressure from any suitable flow control assembly in fluid communication with the second diluent inlet 68 at the rear end 52 of the handle body 10, as previously described. Through priming or prior use of the hand-held beverage dispenser 5, a supplied second diluent is conveyed through the common trunk 74 of the second diluent inlet manifold 73 and a dedicated valve supply branch 75*d* from the common trunk 74 between the second diluent inlet 68 and the second diluent inlet port 117 of the valve body 100*d*. Because in the defined fourth state of operation of the integrated valve unit 90*d* the diluent selector valve 130*d* is configured in a second operable state to select the second diluent, the diluent selector valve 130*d* establishes an open flow path through the diluent selector valve 130*d* between the second diluent inlet port 117 and the cylindrical chamber 139 of the open-topped cup 166, as operably received within the lower chamber 111 of the valve body 100*d*. Accordingly, the second diluent is further conveyed from the second diluent inlet port 117 of the valve body 100*d* and into the cylindrical chamber 139 of the open-topped cup 166. As particularly shown in FIGS. 26, 28 and 98A-98B, the cooperatively adapted second diluent inlet port 117 and diluent selector valve 130*d* introduce the second diluent into the cylindrical chamber 139 upstream of the lower valve seat 115 for the flow control valve 185*d*. Simultaneously, an intact portion of the cylindrical valve gate 167 of the open-topped cup 166 sealingly obstructs the first diluent inlet port 116 of the valve body 100*d*, as particularly shown in FIG. 98B. Accordingly, the diluent selector valve 130*d* in the third operable state thereof prevents introduction to the cylindrical chamber 139 of any fluid flowing to or through the first inlet port 116.

A lower one of the poppet-type valves provided in implementation of the flow control valve 185*d* controls flow through the valve body 100*d* of a diluent, as particularly shown in FIG. 98D. In the at rest normally closed state of the flow control valve 185*d*, the poppet spring 219 at the bottom end 203 of the valve stem 188 applies an upward biasing force to the valve stem 188. The upward biasing force produced by the poppet spring 219, as may be joined by any additional upward forces produced by pressurized beverage fluids within the valve body 100*d*, holds the valve stem 188 of the flow control valve 185*d* in the uppermost position for the valve stem 188 within the valve body 100*d*. Accordingly, the lower reciprocating sealing member 213 carried by the valve stem 188 is also at an uppermost position within the valve body 100*d*, whereat the valve face 217 formed at the top surface 216 of the lower reciprocating sealing member 213 is sealingly engaged with the corresponding lower valve seat 115 provided within the valve body 100*d* for the at rest flow control valve 185*d*. At rest in this normally closed state of the flow control valve 185*d*, the flow control valve 185*d* prevents passage of diluent from the cylindrical chamber 139 of the open-topped cup 166, as operably received within the lower chamber 111 of the valve body 100*d*, to the intermediate chamber 106 of the valve body 100*d*.

Because in the defined fourth state of operation of the integrated valve unit 90*d* the ON-OFF flow control 20*d* is actuated or otherwise operated, a sufficient downward force applied to the valve stem 188 overcomes the upward biasing force applied to the bottom end 203 of the valve stem 188 by the provided poppet spring 219, and any additional upwardly applied fluid forces within the valve body 100*d*, to shift the valve stem 188, and thus the lower reciprocating sealing member 213 carried by the valve stem 188, downward within the valve body 100*d*, as shown in FIGS. 98A and 98D. As the valve stem 188 and thus the lower reciprocating sealing member 213 shift downward, flow from the cylindrical chamber 139 of the open-topped cup 166 to the intermediate chamber of the valve body 100*d* is immediately enabled, whereby the first diluent immediately flows from the cylindrical chamber 139 to the intermediate chamber 106. As the valve stem 188 and the lower reciprocating sealing member 213 continue to shift the short distance downward to reach maximum displacement, as shown in FIGS. 98A and 98D, the flow of the first diluent quickly reaches maximum rate. In any case, the first diluent flowing into the intermediate chamber 106 passes unobstructed from the intermediate chamber 106 through the diluent outlet port 110 of the valve body 100*d*, and is conveyed through the dedicated valve dispense branch 79*d* to the common trunk 78 and the common trunk 78 of the common diluents outlet manifold 77 between the diluent outlet port 110 and the single common diluents outlet 82 at the bottom 31 and adjacent the forward end 48 of the handle body 10. The first diluent is then there conducted into and through the post-mix type drink dispenser assembly 275, where the user-selected second diluent is mixed together with the beverage product as they are dispensed together into a beverage vessel, in a manner well known to those of ordinary skill in the relevant arts.

Supplemental to the many foregoing detailed descriptions of various user interactions with the preferred implementation of the hand-held beverage dispenser 5 according to the second embodiment, the manner of use for the hand-held beverage dispenser 5 is now set forth end-to-end. Preparatory steps for deployment and use of the hand-held beverage dispenser 5, include identifying and providing a suitable post-mix type drink dispenser assembly 275, as is capable of properly dispensing the desired complement of post-mix beverages; identifying and providing a suitable flow control assembly, consistent with the intended beverage complement; and identifying and providing such related components as carbonators or cooling systems, and may be required for the intended service. In any case, the final preparatory steps include installation, if necessary, of the "back-room" components, such as bag-in-box systems, point-of-use components, such as a manifold system, and provision of connecting tubulars. Each of these preparatory steps, however, is well within the ordinary skill in the relevant arts, and may readily be accomplished by those new to the arts with the assistance of installation technicians, restaurant consultants, and the like.

With the supporting components readied, a first step prior to use of the hand-held beverage dispenser 5 is to connect the handle body 10 to a flow control assembly adapted to supply at least one pressurized beverage product and a plurality of pressurized diluents at appropriately regulated flow rates. As is well known to those of ordinary skill in the relevant arts, any of the many commercially available flow control assemblies is connected to the hand-held beverage dispenser 5 through a multiplicity of individual fluid lines conventionally mated with the fluid inlets 66 provided at the rear end 52 of the handle body 10. As will be appreciated by those of ordinary skill in the relevant arts, the individual fluid lines through which the flow control assembly will supply pressurized fluids at appropriate flow rates, should include a plurality of beverage product lines for connection to the beverage product inlets 69*a*-69*h*, as well as at least two diluent lines for connection to the first diluent inlet 67 and the second diluent inlet 68. At the other end, a suitable post-mix type drink dispenser assembly 275, as will be dependently coupled to the bottom 31 of the handle body 10 at a location adjacent the forward end 48 of the handle body 10, should be installed by a preferably skilled person. For end use, however, an appropriate nozzle housing 280 for the mixer 276 of the post-mix type drink dispenser assembly 275 should be twisted on. As is well known to those of ordinary skill in the relevant arts, the nozzle housing 280 for the mixer 276 of the implemented post-mix type drink dispenser assembly 275 is readily removable to facilitate periodic cleaning of the post-mix type drink dispenser assembly 275.

With the hand-held beverage dispenser 5 installed for use, and beverage products and diluents made available through connecting tubulars, the very simple end use of the hand-held beverage dispenser 5 relies entirely on single-button, ON-OFF type operation. As has been described, a plurality of ON-OFF flow controls 20*a*-20*j* is familiarly accessed at the top 18 of the handle body 10 of the hand-held beverage dispenser 5, and the flow controls are 20*a*-20*j* usually actuated by a simple thumb press, as is very familiar to those of ordinary skill in the relevant arts as well as to service industry employees in general.

In use of the inventive diluent selection features of the present invention, the fluid inlets 66 of the hand-held beverage dispenser 5 are conventionally placed, or assigned for placement, in fluid communication with outlets from a flow control assembly or any other like source of at least one flow regulated pressurized beverage product and a plurality of flow regulated pressurized diluents. The end-user charged with configuration or reconfiguration of the hand-held beverage dispenser 5 will then, for at least each of the provided beverage products, utilize a corresponding one of the inventively implemented diluent selector valves 130*a*-130*h* to select one of the plurality of diluents for dispensing with the corresponding beverage product. The end-user may also, however, similarly set up the diluent selector valve 130*i*-130*j* implemented in connection with the either or both of the previously described diluents only valve units 90*i*-90*j*. If desired and not yet completed, the end-user charged with configuration or reconfiguration of the hand-held beverage dispenser 5 will often also attach or otherwise place a suitable post-mix type drink dispenser assembly 275, such as are well known in the relevant arts, in fluid communication with the fluid outlets 81 from the hand-held beverage dispenser 5.

As has been described in detail herein, and with reference to the described exemplary implementation, the foregoing diluent selections are readily made as follows: (1) the user disassembles the lower enclosure member 34 from the bottom 31 of the handle body 10 by removing the mounting screws 44 and pulling away the lower enclosure member 34; (2) the user will identify the desired diluent by for example, the letter W for plain water, or the letter C for carbonated water, and will simply rotate the diluent selector to point the arrowhead to the desired diluent, such as, for example, to the letter C to select carbonated water; and (3) once any desired change is made to the diluent selector valve 130*a*-130*j* the user will reassemble the lower enclosure member 34 with the bottom 31 of the handle body 10 conventionally using the earlier removed screws.

With the hand-held beverage dispenser 5 deployed for operation as described, and the desired diluents selected, the end-user will depress, or otherwise operate, one of the ON-OFF flow controls 20*a*-20*h* to actuate the corresponding flow control valve 185*a*-185*h*, and dispense a desired beverage product with its selected diluent. Additionally, certain ON-OFF flow controls 20*i*-20*j* may correspond to flow control valves 185*i*-185*j* that are implemented in valve bodies 90*i*-90*j* adapted to dispense a diluent alone.

The invention claimed is:

1. A valve arrangement for selectively establishing beverage fluid flow paths through a hand-held beverage dispenser, said valve arrangement comprising:

a valve unit including a composite valve trim assembly substantially contained within a hand-held beverage dispenser;

a plurality of flow paths to said valve unit and a fixed flow path from said valve unit;

wherein said composite valve trim assembly is adapted to:

establish passage into said valve unit of a user selectable one of said plurality of flow paths;

block passage into said valve unit of each said plurality of flow paths other than said one of said plurality of flow paths; and establish passage from said one of said plurality of flow paths to said fixed flow path from said valve unit; and wherein establishment of passage into said valve unit of a user selectable one of said plurality of flow paths is functionally independent of establishment of passage to said fixed flow path of said one of said plurality of flow paths.

2. The valve arrangement as recited in claim 1, wherein said composite valve trim assembly implements a poppet-type valve adapted to establish passage from said one of said plurality of flow paths to said fixed flow path from said valve unit.

3. The valve arrangement as recited in claim 1, said valve arrangement further comprising:

a dedicated flow path to said valve unit and a dedicated flow path from said valve unit; and wherein said composite valve trim assembly is adapted to establish passage from said dedicated flow path to said valve unit to said dedicated flow path from said valve unit.

4. The valve arrangement as recited in claim 3, wherein said composite valve trim assembly implements a gate valve adapted to establish passage into said valve unit of a user selectable one of said plurality of flow paths and block passage into said valve unit of each said plurality of flow paths other than said one of said plurality of flow paths.

5. The valve arrangement as recited in claim 4, wherein said gate valve includes a cylindrical valve gate.

6. The valve arrangement as recited in claim 5, wherein said gate valve is rotationally operated.

7. The valve arrangement as recited in claim 4, wherein said composite valve trim assembly implements a linked set of poppet-type valves adapted to concurrently establish passage from said one of said plurality of flow paths to said fixed flow path from said valve unit and to establish passage from said dedicated flow path to said valve unit to said dedicated flow path from said valve unit.

8. The valve arrangement as recited in claim 3, wherein said composite valve trim assembly implements a linked set of poppet-type valves adapted to concurrently establish passage from said one of said plurality of flow paths to said fixed flow path from said valve unit and to establish passage from said dedicated flow path to said valve unit to said dedicated flow path from said valve unit.

9. A valve arrangement for selectively establishing beverage fluid flow paths through a hand-held beverage dispenser, said valve arrangement comprising:

a valve unit including a composite valve trim assembly substantially contained within a hand-held beverage dispenser;

a plurality of flow paths to said valve unit and a fixed flow path from said valve unit;

wherein said composite valve trim assembly implements a gate valve adapted to:

establish passage into said valve unit of a user selectable one of said plurality of flow paths; and block passage into said valve unit of each said plurality of flow paths other than said one of said plurality of flow paths;

wherein said composite valve trim assembly is adapted to establish passage from said one of said plurality of flow paths to said fixed flow path from said valve unit; and wherein establishment of passage into said valve unit of a user selectable one of said plurality of flow paths is functionally independent of establishment of passage to said fixed flow path of said one of said plurality of flow paths.

10. The valve arrangement as recited in claim 9, wherein said gate valve includes a cylindrical valve gate.

11. The valve arrangement as recited in claim 10, wherein said gate valve is rotationally operated.

12. The valve arrangement as recited in claim 9, wherein said composite valve trim assembly implements a poppet-type valve adapted to establish passage from said one of said plurality of flow paths to said fixed flow path from said valve unit.

* * * * *